United States Patent
Park et al.

(10) Patent No.: US 11,502,811 B2
(45) Date of Patent: Nov. 15, 2022

(54) AUTOMATIC ADAPTATION OF DATA SUBCARRIER SPACING NUMEROLOGY BASED ON SYNCHRONIZATION SIGNAL BLOCK TRANSMISSION

(71) Applicant: QUALCOMM Incorporated, San Diego, CA (US)

(72) Inventors: Sungwoo Park, San Diego, CA (US); Jing Sun, San Diego, CA (US); Wooseok Nam, San Diego, CA (US); Tao Luo, San Diego, CA (US); Xiaoxia Zhang, San Diego, CA (US); Zhifei Fan, San Diego, CA (US); Akula Reddy, San Diego, CA (US); Ahmed Abdelaziz Ibrahim Abdelaziz Zewail, San Diego, CA (US); Srinivas Yerramalli, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 141 days.

(21) Appl. No.: 17/019,978

(22) Filed: Sep. 14, 2020

(65) Prior Publication Data
US 2021/0119758 A1    Apr. 22, 2021

Related U.S. Application Data

(60) Provisional application No. 62/923,370, filed on Oct. 18, 2019.

(51) Int. Cl.
*H04L 12/28*    (2006.01)
*H04L 5/00*    (2006.01)
(Continued)

(52) U.S. Cl.
CPC .......... *H04L 5/0094* (2013.01); *H04L 5/0092* (2013.01); *H04W 56/001* (2013.01);
(Continued)

(58) Field of Classification Search
CPC ....................................................... H04L 12/28
(Continued)

(56) References Cited

U.S. PATENT DOCUMENTS

| 2017/0238304 A1 | 8/2017 | Ling et al. |
| 2018/0110019 A1 | 4/2018 | Ly et al. |
| 2020/0259683 A1* | 8/2020 | Manolakos ........... G01S 13/765 |

FOREIGN PATENT DOCUMENTS

WO   WO-2019094818 A1    5/2019

OTHER PUBLICATIONS

International Search Report and Written Opinion—PCT/US2020/050870—ISA/EPO—Dec. 21, 2020.
(Continued)

*Primary Examiner* — Dang T Ton
(74) *Attorney, Agent, or Firm* — Dalei Dong; Holland & Hart LLP

(57) ABSTRACT

Subcarrier spacing (SCS) for data may be adapted or dynamically configured based on the occurrence or presence of a synchronization signal block (SSB) transmission. For example, during a SSB transmission, the SCS of data may be automatically switched from some default data SCS to a second SCS (e.g., the SCS of the SSB) to allow for frequency division multiplexing (FDM) of data and SSB where the data and SSB use the same numerology. As such, communicating devices (e.g., a base station and a user equipment (UE)) may identify some location or configuration for a SSB, and may determine a second subcarrier spacing (e.g., a subcarrier spacing associated with the SSB) such that the SCS of data may be adapted to the second subcarrier spacing during the FDM of the SSB and the data. The SSB and data may thus be contemporaneously transmitted or received using the second SCS.

28 Claims, 23 Drawing Sheets

(51) Int. Cl.
*H04W 56/00* (2009.01)
*H04W 72/04* (2009.01)

(52) U.S. Cl.
CPC ..... *H04W 72/042* (2013.01); *H04W 72/0446* (2013.01); *H04W 72/0453* (2013.01)

(58) Field of Classification Search
USPC ........................................................ 370/329
See application file for complete search history.

(56) References Cited

OTHER PUBLICATIONS

NTT DOCOMO INC: "Discussion on Remaining Details on SS Block and SS Burst Set Design", 3GPP TSG RAN WG1 Meeting #90, 3GPP Draft, R1-1713895_Discussion on Remaining Details on SS Block and SS Burst Set Design_Final, 3rd Generation Partnership Project (3GPP), Mobile Competence Centre, 650, Route Des Lucioles, F-0692, vol. RAN WG1, No. Prague, Czech Republic, Aug. 21-Aug. 25, 2017, Aug. 20, 2017, XP051316687, 5 Pages, Retrieved from the Internet: URL: http://www.3gpp.org/ftp/Meetings_3GPP_SYNC/RAN1/Docs/ [retrieved on Aug. 20, 2017].

* cited by examiner

AUTOMATIC ADAPTATION OF DATA SUBCARRIER SPACING NUMEROLOGY BASED ON SYNCHRONIZATION SIGNAL BLOCK TRANSMISSION

CROSS REFERENCE

The present application for patent claims the benefit of U.S. Provisional Patent Application No. 62/923,370 by PARK et al., entitled "AUTOMATIC ADAPTATION OF DATA SUBCARRIER SPACING NUMEROLOGY BASED ON SYNCHRONIZATION SIGNAL BLOCK TRANSMISSION," filed Oct. 18, 2019, assigned to the assignee hereof, and which is hereby incorporated by reference in its entirety.

FIELD OF DISCLOSURE

The present disclosure, for example, relates to wireless communications systems, including automatic adaptation of data subcarrier spacing (SCS) based on synchronization signal block (SSB) transmission.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform spread orthogonal frequency division multiplexing (DFT-S-OFDM). A wireless multiple-access communications system may include a number of base stations or network access nodes, each simultaneously supporting communication for multiple communication devices, which may be otherwise known as user equipment (UE).

A base station may communicate with one or more other base stations, and one or more UEs. In some examples of a wireless communications system, a base station and a UE may synchronize communications, or establish a connection, or both, using one or more synchronization signal blocks (SSBs).

SUMMARY

The described techniques relate to improved methods, systems, devices, and apparatuses that support automatic adaptation of data subcarrier spacing (SCS) based on synchronization signal block (SSB) transmission. For example, the described techniques provide for adaptation or dynamic configuration of SCS for data based on the occurrence or presence of a SSB transmission. For example, during a SSB transmission, the SCS of data may be automatically switched from some default SCS (e.g., some default data SCS) to a second SCS (e.g., the SCS of the SSB) to provide for improved frequency division multiplexing (FDM) of data and SSB (e.g., to allow for FDM of data and SSB where the data and SSB use the same numerology). As such, communicating devices (e.g., a base station and a user equipment (UE)) may identify some location or configuration for a SSB and may determine a second SCS (e.g., a SCS associated with the SSB) such that the SCS of data may be adapted to the second SCS during the FDM of the SSB and the data. The SSB and data may thus be contemporaneously transmitted or received using the second SCS.

A method of wireless communication at a UE is described. The method may include receiving first data information transmitted using a first SCS, receiving downlink signaling including an indication of a synchronization signal in a first bandwidth part (BWP), determining a second SCS based on the indication, and contemporaneously receiving the synchronization signal and second data information transmitted using the determined second SCS.

Some examples of the method described herein may further include operations, features, means, or instructions for configuring a modem of the UE from using the first SCS to using the determined second SCS based on the indication, where the synchronization signal and the second data information may be contemporaneously received based on the configuring. In some examples of the method described herein, configuring the modem from using the first SCS to using the determined second SCS may include operations, features, means, or instructions for configuring the modem from using the first SCS to using the determined second SCS within the first BWP, where the first data information, the synchronization signal, and the second data information may be received within the first BWP.

Some examples of the method described herein may further include operations, features, means, or instructions for determining a first location corresponding to the second data information based on the received downlink signaling, determining a second location corresponding to an uplink feedback occasion associated with the second data information, and generating an uplink feedback report for the first data information and the second data information, where the uplink feedback report may be generated based on the first SCS, or the second SCS, or both.

In some examples of the method described herein, the first location and the second location may be determined based on a first slot pattern defined according to the first SCS. In some examples of the method described herein, the first location and the second location may be determined based on a first slot pattern defined according to the determined second SCS. Some examples of the method described herein may further include operations, features, means, or instructions for determining a third location corresponding to the first data information, where the third location may be determined based on a second slot pattern defined according to the first SCS. In some examples of the method described herein, the uplink feedback report includes a hybrid automatic repeat request (HARQ)-acknowledgement (ACK) codebook.

Some examples of the method described herein may further include operations, features, means, or instructions for configuring the modem of the UE from monitoring a second BWP to monitoring the first BWP, where the first data information may be received via the second BWP, and the synchronization signal and the second data information may be received via the first BWP. Some examples of the method described herein may further include operations, features, means, or instructions for configuring the modem of the UE from monitoring the first BWP to monitoring the second BWP based on receiving the synchronization signal and the second data information, where third data information may be received via the first BWP.

In some examples of the method described herein, the configuring may be based on a time delay after the synchronization signal and the second data information may be received. In some examples of the method described herein, the downlink signaling includes an indication of the time delay. Some examples of the method described herein may further include operations, features, means, or instructions for receiving a configuration for the first BWP. In some examples of the method described herein, the configuration may be received via radio resource control (RRC) signaling or a medium access control element. In some examples of the method described herein, the first SCS may be associated with the second BWP and the determined second SCS may be associated with the first BWP.

Some examples of the method described herein may further include operations, features, means, or instructions for identifying a symbol boundary associated with the synchronization signal based on the indication, where the configuring occurs at the identified symbol boundary. Some examples of the method described herein may further include operations, features, means, or instructions for identifying a slot boundary associated with the synchronization signal based on the indication, where the configuring occurs at the identified slot boundary. In some examples of the method described herein, the slot boundary may be identified based on the determined second SCS. Some examples of the method described herein may further include operations, features, means, or instructions for identifying a SSB burst boundary associated with the synchronization signal based on the indication, where the configuring occurs at the identified SSB burst boundary.

Some examples of the method described herein may further include operations, features, means, or instructions for determining a temporal period to decode the synchronization signal and the second data information based on the first BWP and the determined SCS, where the synchronization signal and the data information may be received based on the determined temporal period. In some examples of the method described herein, the synchronization signal and the second data information may be received based on a FDM scheme. In some examples of the method described herein, the synchronization signal includes a SSB. In some examples of the method described herein, the second SCS includes a default SCS associated with the synchronization signal. In some examples of the method described herein, the receipt of the second data information may be temporally adjacent to the receipt of the first data information.

An apparatus for wireless communication at a UE is described. The apparatus may include a processor, memory coupled with the processor, and instructions stored in the memory. The instructions may be executable by the processor to cause the apparatus to receive first data information transmitted using a first SCS, receive downlink signaling including an indication of a synchronization signal in a first BWP, determine a second SCS based on the indication, and contemporaneously receive the synchronization signal and second data information transmitted using the determined second SCS.

Some examples of the apparatuses described herein may further include operations, features, means, or instructions for configuring a modem of the UE from using the first SCS to using the determined second SCS based on the indication, where the synchronization signal and the second data information may be contemporaneously received based on the configuring. In some examples of the apparatuses described herein, configuring the modem from using the first SCS to using the determined second SCS may include operations, features, means, or instructions for configuring the modem from using the first SCS to using the determined second SCS within the first BWP, where the first data information, the synchronization signal, and the second data information may be received within the first BWP.

Some examples of the apparatuses described herein may further include operations, features, means, or instructions for determining a first location corresponding to the second data information based on the received downlink signaling, determining a second location corresponding to an uplink feedback occasion associated with the second data information, and generating an uplink feedback report for the first data information and the second data information, where the uplink feedback report may be generated based on the first SCS, or the second SCS, or both. In some examples of the apparatuses described herein, the first location and the second location may be determined based on a first slot pattern defined according to the first SCS. In some examples of the apparatuses described herein, the first location and the second location may be determined based on a first slot pattern defined according to the determined second SCS.

Some examples of the apparatuses described herein may further include operations, features, means, or instructions for determining a third location corresponding to the first data information, where the third location may be determined based on a second slot pattern defined according to the first SCS. In some examples of the apparatuses described herein, the uplink feedback report includes a HARQ-ACK codebook. Some examples of the apparatuses described herein may further include operations, features, means, or instructions for configuring the modem of the UE from monitoring a second BWP to monitoring the first BWP, where the first data information may be received via the second BWP, and the synchronization signal and the second data information may be received via the first BWP.

Some examples of the apparatuses described herein may further include operations, features, means, or instructions for configuring the modem of the UE from monitoring the first BWP to monitoring the second BWP based on receiving the synchronization signal and the second data information, where third data information may be received via the first BWP. In some examples of the apparatuses described herein, the configuring may be based on a time delay after the synchronization signal and the second data information may be received. In some examples of the apparatuses described herein, the downlink signaling includes an indication of the time delay. Some examples of the apparatuses described herein may further include operations, features, means, or instructions for receiving a configuration for the first BWP. In some examples of the apparatuses described herein, the configuration may be received via RRC signaling or a medium access control element.

In some examples of the apparatuses described herein, the first SCS may be associated with the second BWP and the determined second SCS may be associated with the first BWP. Some examples of the apparatuses described herein may further include operations, features, means, or instructions for identifying a symbol boundary associated with the synchronization signal based on the indication, where the configuring occurs at the identified symbol boundary. Some examples of the apparatuses described herein may further include operations, features, means, or instructions for identifying a slot boundary associated with the synchronization signal based on the indication, where the configuring occurs at the identified slot boundary.

In some examples of the apparatuses described herein, the slot boundary may be identified based on the determined second SCS. Some examples of the apparatuses described herein may further include operations, features, means, or instructions for identifying a SSB burst boundary associated with the synchronization signal based on the indication, where the configuring occurs at the identified SSB burst boundary. Some examples of the apparatuses described herein may further include operations, features, means, or instructions for determining a temporal period to decode the synchronization signal and the second data information based on the first BWP and the determined SCS, where the synchronization signal and the data information may be received based on the determined temporal period.

In some examples of the apparatuses described herein, the synchronization signal and the second data information may be received based on a FDM scheme. In some examples of the apparatuses described herein, the synchronization signal includes a SSB. In some examples of the apparatuses described herein, the second SCS includes a default SCS associated with the synchronization signal. In some examples of the apparatuses described herein, the receipt of the second data information may be temporally adjacent to the receipt of the first data information.

Another apparatus for wireless communication at a UE is described. The apparatus may include means for receiving first data information transmitted using a first SCS, receiving downlink signaling including an indication of a synchronization signal in a first BWP, determining a second SCS based on the indication, and contemporaneously receiving the synchronization signal and second data information transmitted using the determined second SCS.

Some examples of the apparatuses described herein may further include operations, features, means, or instructions for configuring a modem of the UE from using the first SCS to using the determined second SCS based on the indication, where the synchronization signal and the second data information may be contemporaneously received based on the configuring. In some examples of the apparatuses described herein, configuring the modem from using the first SCS to using the determined second SCS may include operations, features, means, or instructions for configuring the modem from using the first SCS to using the determined second SCS within the first BWP, where the first data information, the synchronization signal, and the second data information may be received within the first BWP.

Some examples of the apparatuses described herein may further include operations, features, means, or instructions for determining a first location corresponding to the second data information based on the received downlink signaling, determining a second location corresponding to an uplink feedback occasion associated with the second data information, and generating an uplink feedback report for the first data information and the second data information, where the uplink feedback report may be generated based on the first SCS, or the second SCS, or both. In some examples of the apparatuses described herein, the first location and the second location may be determined based on a first slot pattern defined according to the first SCS. In some examples of the apparatuses described herein, the first location and the second location may be determined based on a first slot pattern defined according to the determined second SCS.

Some examples of the apparatuses described herein may further include operations, features, means, or instructions for determining a third location corresponding to the first data information, where the third location may be determined based on a second slot pattern defined according to the first SCS. In some examples of the apparatuses described herein, the uplink feedback report includes a HARQ-ACK codebook. Some examples of the apparatuses described herein may further include operations, features, means, or instructions for configuring the modem of the UE from monitoring a second BWP to monitoring the first BWP, where the first data information may be received via the second BWP, and the synchronization signal and the second data information may be received via the first BWP.

Some examples of the apparatuses described herein may further include operations, features, means, or instructions for configuring the modem of the UE from monitoring the first BWP to monitoring the second BWP based on receiving the synchronization signal and the second data information, where third data information may be received via the first BWP. In some examples of the apparatuses described herein, the configuring may be based on a time delay after the synchronization signal and the second data information may be received.

In some examples of the apparatuses described herein, the downlink signaling includes an indication of the time delay. Some examples of the apparatuses described herein may further include operations, features, means, or instructions for receiving a configuration for the first BWP. In some examples of the apparatuses described herein, the configuration may be received via RRC signaling or a medium access control element. In some examples of the apparatuses described herein, the first SCS may be associated with the second BWP and the determined second SCS may be associated with the first BWP.

Some examples of the apparatuses described herein may further include operations, features, means, or instructions for identifying a symbol boundary associated with the synchronization signal based on the indication, where the configuring occurs at the identified symbol boundary. Some examples of the apparatuses described herein may further include operations, features, means, or instructions for identifying a slot boundary associated with the synchronization signal based on the indication, where the configuring occurs at the identified slot boundary. In some examples of the apparatuses described herein, the slot boundary may be identified based on the determined second SCS. Some examples of the apparatuses described herein may further include operations, features, means, or instructions for identifying a SSB burst boundary associated with the synchronization signal based on the indication, where the configuring occurs at the identified SSB burst boundary.

Some examples of the apparatuses described herein may further include operations, features, means, or instructions for determining a temporal period to decode the synchronization signal and the second data information based on the first BWP and the determined SCS, where the synchronization signal and the data information may be received based on the determined temporal period. In some examples of the apparatuses described herein, the synchronization signal and the second data information may be received based on a FDM scheme. In some examples of the apparatuses described herein, the synchronization signal includes a SSB. In some examples of the apparatuses described herein, the second SCS includes a default SCS associated with the synchronization signal. In some examples of the apparatuses described herein, the receipt of the second data information may be temporally adjacent to the receipt of the first data information.

A non-transitory computer-readable medium storing code for wireless communication at a UE is described. The code may include instructions executable by a processor to receive first data information transmitted using a first SCS, receive downlink signaling including an indication of a synchronization signal in a first BWP, determine a second SCS based on the indication, and contemporaneously receive the synchronization signal and second data information transmitted using the determined second SCS.

Some examples of the non-transitory computer-readable medium described herein may further include operations, features, means, or instructions for configuring a modem of the UE from using the first SCS to using the determined second SCS based on the indication, where the synchronization signal and the second data information may be contemporaneously received based on the configuring. In some examples of the non-transitory computer-readable medium described herein, configuring the modem from using the first SCS to using the determined second SCS may include operations, features, means, or instructions for configuring the modem from using the first SCS to using the determined second SCS within the first BWP, where the first data information, the synchronization signal, and the second data information may be received within the first BWP.

Some examples of the non-transitory computer-readable medium described herein may further include operations, features, means, or instructions for determining a first location corresponding to the second data information based on the received downlink signaling, determining a second location corresponding to an uplink feedback occasion associated with the second data information, and generating an uplink feedback report for the first data information and the second data information, where the uplink feedback report may be generated based on the first SCS, or the second SCS, or both.

In some examples of the non-transitory computer-readable medium described herein, the first location and the second location may be determined based on a first slot pattern defined according to the first SCS. In some examples of the non-transitory computer-readable medium described herein, the first location and the second location may be determined based on a first slot pattern defined according to the determined second SCS. Some examples of the non-transitory computer-readable medium described herein may further include operations, features, means, or instructions for determining a third location corresponding to the first data information, where the third location may be determined based on a second slot pattern defined according to the first SCS. In some examples of the non-transitory computer-readable medium described herein, the uplink feedback report includes a HARQ-ACK codebook.

Some examples of the non-transitory computer-readable medium described herein may further include operations, features, means, or instructions for configuring the modem of the UE from monitoring a second BWP to monitoring the first BWP, where the first data information may be received via the second BWP, and the synchronization signal and the second data information may be received via the first BWP. Some examples of the non-transitory computer-readable medium described herein may further include operations, features, means, or instructions for configuring the modem of the UE from monitoring the first BWP to monitoring the second BWP based on receiving the synchronization signal and the second data information, where third data information may be received via the first BWP.

In some examples of the non-transitory computer-readable medium described herein, the configuring may be based on a time delay after the synchronization signal and the second data information may be received. In some examples of the non-transitory computer-readable medium described herein, the downlink signaling includes an indication of the time delay. Some examples of the non-transitory computer-readable medium described herein may further include operations, features, means, or instructions for receiving a configuration for the first BWP. In some examples of the non-transitory computer-readable medium described herein, the configuration may be received via RRC signaling or a medium access control element. In some examples of the non-transitory computer-readable medium described herein, the first SCS may be associated with the second BWP and the determined second SCS may be associated with the first BWP.

Some examples of the non-transitory computer-readable medium described herein may further include operations, features, means, or instructions for identifying a symbol boundary associated with the synchronization signal based on the indication, where the configuring occurs at the identified symbol boundary. Some examples of the non-transitory computer-readable medium described herein may further include operations, features, means, or instructions for identifying a slot boundary associated with the synchronization signal based on the indication, where the configuring occurs at the identified slot boundary. In some examples of the non-transitory computer-readable medium described herein, the slot boundary may be identified based on the determined second SCS. Some examples of the non-transitory computer-readable medium described herein may further include operations, features, means, or instructions for identifying a SSB burst boundary associated with the synchronization signal based on the indication, where the configuring occurs at the identified SSB burst boundary.

Some examples of the non-transitory computer-readable medium described herein may further include operations, features, means, or instructions for determining a temporal period to decode the synchronization signal and the second data information based on the first BWP and the determined SCS, where the synchronization signal and the data information may be received based on the determined temporal period. In some examples of the non-transitory computer-readable medium described herein, the synchronization signal and the second data information may be received based on a FDM scheme. In some examples of the non-transitory computer-readable medium described herein, the synchronization signal includes a SSB. In some examples of the non-transitory computer-readable medium described herein, the second SCS includes a default SCS associated with the synchronization signal. In some examples of the non-transitory computer-readable medium described herein, the receipt of the second data information may be temporally adjacent to the receipt of the first data information.

A method of wireless communication at a base station is described. The method may include transmitting first data information using a first SCS, transmitting downlink signaling including a first indication of a synchronization signal in a first BWP, determining a second SCS based on the indication, and contemporaneously transmitting the synchronization signal and second data information using the determined second SCS.

Some examples of the method described herein may further include operations, features, means, or instructions for configuring a modem of the base station from using the first SCS to using the determined second SCS based on the indication, where the synchronization signal and the second data information may be contemporaneously transmitted based on the configuring. In some examples of the method described herein, configuring the modem from using the first SCS to using the determined second SCS may include operations, features, means, or instructions for configuring the modem from using the first SCS to using the determined second SCS within the first BWP, where the first data information, the synchronization signal, and the second data information may be transmitted within the first BWP.

Some examples of the method described herein may further include operations, features, means, or instructions for transmitting a second indication of a first location corresponding to the second data information based on the transmitted downlink signaling, transmitting a third indication of a second location corresponding to an uplink feedback occasion associated with the second data information, and receiving an uplink feedback report for the first data information and the second data information, where the uplink feedback report may be received based on the first SCS, or the second SCS, or both. In some examples of the method described herein, the first location and the second location may be based on a first slot pattern defined according to the first SCS. In some examples of the method described herein, the first location and the second location may be determined based on a first slot pattern defined according to the determined second SCS.

Some examples of the method described herein may further include operations, features, means, or instructions for transmitting a fourth indication of a third location corresponding to the first data information, where the third location may be based on a second slot pattern defined according to the first SCS. In some examples of the method described herein, the uplink feedback report includes a HARQ-ACK codebook. Some examples of the method described herein may further include operations, features, means, or instructions for configuring the modem from activating a second BWP to activating the first BWP, where the first data information may be transmitted via the second BWP, and the synchronization signal and the second data information may be transmitted via the first BWP.

Some examples of the method described herein may further include operations, features, means, or instructions for configuring the modem from activating the first BWP to activating the second BWP based on transmitting the synchronization signal and the second data information, and transmitting third data information via the first BWP. Some examples of the method described herein may further include operations, features, means, or instructions for determining a time delay after the synchronization signal and the second data information, where the configuring may be based on the time delay. In some examples of the method described herein, the time delay may be determined based on a processing time associated with HARQ-ACK feedback.

In some examples of the method described herein, the downlink signaling includes an indication of the time delay. Some examples of the method described herein may further include operations, features, means, or instructions for transmitting a configuration for the first BWP. In some examples of the method described herein, the configuration may be transmitted via RRC signaling or a medium access control element. In some examples of the method described herein, the first SCS may be associated with the second BWP and the determined second SCS may be associated with the first BWP. Some examples of the method described herein may further include operations, features, means, or instructions for identifying a symbol boundary associated with the synchronization signal based on the indication, where the configuring occurs at the identified symbol boundary.

Some examples of the method described herein may further include operations, features, means, or instructions for identifying a slot boundary associated with the synchronization signal based on the indication, where the configuring occurs at the identified slot boundary. In some examples of the method described herein, the slot boundary may be identified based on the determined second SCS. Some examples of the method described herein may further include operations, features, means, or instructions for identifying a SSB burst boundary associated with the synchronization signal based on the indication, where the configuring occurs at the identified SSB burst boundary. Some examples of the method described herein may further include operations, features, means, or instructions for determining a temporal period to transmit the synchronization signal and the second data information based on the first BWP and the determined SCS, where the synchronization signal and the data information may be transmitted based on the determined temporal period.

In some examples of the method described herein, the synchronization signal and the second data information may be received based on a FDM scheme. In some examples of the method described herein, the synchronization signal includes a SSB. In some examples of the method described herein, the second SCS includes a default SCS associated with the synchronization signal. In some examples of the method described herein, the transmission of the second data information may be temporally adjacent to the transmission of the first data information.

An apparatus for wireless communication at a base station is described. The apparatus may include a processor, memory coupled with the processor, and instructions stored in the memory. The instructions may be executable by the processor to cause the apparatus to transmit first data information using a first SCS, transmit downlink signaling including a first indication of a synchronization signal in a first BWP, determine a second SCS based on the indication, and contemporaneously transmit the synchronization signal and second data information using the determined second SCS.

Some examples of the apparatuses described herein may further include operations, features, means, or instructions for configuring a modem of the base station from using the first SCS to using the determined second SCS based on the indication, where the synchronization signal and the second data information may be contemporaneously transmitted based on the configuring. In some examples of the apparatuses described herein, configuring the modem from using the first SCS to using the determined second SCS may include operations, features, means, or instructions for configuring the modem from using the first SCS to using the determined second SCS within the first BWP, where the first data information, the synchronization signal, and the second data information may be transmitted within the first BWP.

Some examples of the apparatuses described herein may further include operations, features, means, or instructions for transmitting a second indication of a first location corresponding to the second data information based on the transmitted downlink signaling, transmitting a third indication of a second location corresponding to an uplink feedback occasion associated with the second data information, and receiving an uplink feedback report for the first data information and the second data information, where the uplink feedback report may be received based on the first SCS, or the second SCS, or both. In some examples of the apparatuses described herein, the first location and the second location may be based on a first slot pattern defined according to the first SCS.

In some examples of the apparatuses described herein, the first location and the second location may be determined based on a first slot pattern defined according to the determined second SCS. Some examples of the apparatuses described herein may further include operations, features, means, or instructions for transmitting a fourth indication of a third location corresponding to the first data information, where the third location may be based on a second slot pattern defined according to the first SCS. In some examples of the apparatuses described herein, the uplink feedback report includes a HARQ-ACK codebook. Some examples of the apparatuses described herein may further include operations, features, means, or instructions for configuring the modem from activating a second BWP to activating the first BWP, where the first data information may be transmitted via the second BWP, and the synchronization signal and the second data information may be transmitted via the first BWP.

Some examples of the apparatuses described herein may further include operations, features, means, or instructions for configuring the modem from activating the first BWP to activating the second BWP based on transmitting the synchronization signal and the second data information, and transmitting third data information via the first BWP. Some examples of the apparatuses described herein may further include operations, features, means, or instructions for determining a time delay after the synchronization signal and the second data information, where the configuring may be based on the time delay. In some examples of the apparatuses described herein, the time delay may be determined based on a processing time associated with HARQ-ACK feedback. In some examples of the apparatuses described herein, the downlink signaling includes an indication of the time delay.

Some examples of the apparatuses described herein may further include operations, features, means, or instructions for transmitting a configuration for the first BWP. In some examples of the apparatuses described herein, the configuration may be transmitted via RRC signaling or a medium access control element. In some examples of the apparatuses described herein, the first SCS may be associated with the second BWP and the determined second SCS may be associated with the first BWP. Some examples of the apparatuses described herein may further include operations, features, means, or instructions for identifying a symbol boundary associated with the synchronization signal based on the indication, where the configuring occurs at the identified symbol boundary. Some examples of the apparatuses described herein may further include operations, features, means, or instructions for identifying a slot boundary associated with the synchronization signal based on the indication, where the configuring occurs at the identified slot boundary.

In some examples of the apparatuses described herein, the slot boundary may be identified based on the determined second SCS. Some examples of the apparatuses described herein may further include operations, features, means, or instructions for identifying a SSB burst boundary associated with the synchronization signal based on the indication, where the configuring occurs at the identified SSB burst boundary. Some examples of the apparatuses described herein may further include operations, features, means, or instructions for determining a temporal period to transmit the synchronization signal and the second data information based on the first BWP and the determined SCS, where the synchronization signal and the data information may be transmitted based on the determined temporal period.

In some examples of the apparatuses described herein, the synchronization signal and the second data information may be received based on a FDM scheme. In some examples of the apparatuses described herein, the synchronization signal includes a SSB. In some examples of the apparatuses described herein, the second SCS includes a default SCS associated with the synchronization signal. In some examples of the apparatuses described herein, the transmission of the second data information may be temporally adjacent to the transmission of the first data information.

Another apparatus for wireless communication at a base station is described. The apparatus may include means for transmitting first data information using a first SCS, transmitting downlink signaling including a first indication of a synchronization signal in a first BWP, determining a second SCS based on the indication, and contemporaneously transmitting the synchronization signal and second data information using the determined second SCS.

Some examples of the apparatuses described herein may further include operations, features, means, or instructions for configuring a modem of the base station from using the first SCS to using the determined second SCS based on the indication, where the synchronization signal and the second data information may be contemporaneously transmitted based on the configuring. In some examples of the apparatuses described herein, configuring the modem from using the first SCS to using the determined second SCS may include operations, features, means, or instructions for configuring the modem from using the first SCS to using the determined second SCS within the first BWP, where the first data information, the synchronization signal, and the second data information may be transmitted within the first BWP.

Some examples of the apparatuses described herein may further include operations, features, means, or instructions for transmitting a second indication of a first location corresponding to the second data information based on the transmitted downlink signaling, transmitting a third indication of a second location corresponding to an uplink feedback occasion associated with the second data information, and receiving an uplink feedback report for the first data information and the second data information, where the uplink feedback report may be received based on the first SCS, or the second SCS, or both. In some examples of the apparatuses described herein, the first location and the second location may be based on a first slot pattern defined according to the first SCS. In some examples of the apparatuses described herein, the first location and the second location may be determined based on a first slot pattern defined according to the determined second SCS.

Some examples of the apparatuses described herein may further include operations, features, means, or instructions for transmitting a fourth indication of a third location corresponding to the first data information, where the third location may be based on a second slot pattern defined according to the first SCS. In some examples of the apparatuses described herein, the uplink feedback report includes a HARQ-ACK codebook. Some examples of the apparatuses described herein may further include operations, features, means, or instructions for configuring the modem from activating a second BWP to activating the first BWP, where the first data information may be transmitted via the second BWP, and the synchronization signal and the second data information may be transmitted via the first BWP. Some examples of the apparatuses described herein may further include operations, features, means, or instructions for configuring the modem from activating the first BWP to activating the second BWP based on transmitting the synchronization signal and the second data information, and transmitting third data information via the first BWP.

Some examples of the apparatuses described herein may further include operations, features, means, or instructions for determining a time delay after the synchronization signal and the second data information, where the configuring may be based on the time delay. In some examples of the apparatuses described herein, the time delay may be determined based on a processing time associated with HARQ-ACK feedback. In some examples of the apparatuses described herein, the downlink signaling includes an indication of the time delay. Some examples of the apparatuses described herein may further include operations, features, means, or instructions for transmitting a configuration for the first BWP. In some examples of the apparatuses described herein, the configuration may be transmitted via RRC signaling or a medium access control element.

In some examples of the apparatuses described herein, the first SCS may be associated with the second BWP and the determined second SCS may be associated with the first BWP. Some examples of the apparatuses described herein may further include operations, features, means, or instructions for identifying a symbol boundary associated with the synchronization signal based on the indication, where the configuring occurs at the identified symbol boundary. Some examples of the apparatuses described herein may further include operations, features, means, or instructions for identifying a slot boundary associated with the synchronization signal based on the indication, where the configuring occurs at the identified slot boundary.

In some examples of the apparatuses described herein, the slot boundary may be identified based on the determined second SCS. Some examples of the apparatuses described herein may further include operations, features, means, or instructions for identifying a SSB burst boundary associated with the synchronization signal based on the indication, where the configuring occurs at the identified SSB burst boundary. Some examples of the apparatuses described herein may further include operations, features, means, or instructions for determining a temporal period to transmit the synchronization signal and the second data information based on the first BWP and the determined SCS, where the synchronization signal and the data information may be transmitted based on the determined temporal period.

In some examples of the apparatuses described herein, the synchronization signal and the second data information may be received based on a FDM scheme. In some examples of the apparatuses described herein, the synchronization signal includes a SSB. In some examples of the apparatuses described herein, the second SCS includes a default SCS associated with the synchronization signal. In some examples of the apparatuses described herein, the transmission of the second data information may be temporally adjacent to the transmission of the first data information.

A non-transitory computer-readable medium storing code for wireless communication at a base station is described. The code may include instructions executable by a processor to transmit first data information using a first SCS, transmit downlink signaling including a first indication of a synchronization signal in a first BWP, determine a second SCS based on the indication, and contemporaneously transmit the synchronization signal and second data information using the determined second SCS.

Some examples of the non-transitory computer-readable medium described herein may further include operations, features, means, or instructions for configuring a modem of the base station from using the first SCS to using the determined second SCS based on the indication, where the synchronization signal and the second data information may be contemporaneously transmitted based on the configuring. In some examples of the non-transitory computer-readable medium described herein, configuring the modem from using the first SCS to using the determined second SCS may include operations, features, means, or instructions for configuring the modem from using the first SCS to using the determined second SCS within the first BWP, where the first data information, the synchronization signal, and the second data information may be transmitted within the first BWP.

Some examples of the non-transitory computer-readable medium described herein may further include operations, features, means, or instructions for transmitting a second indication of a first location corresponding to the second data information based on the transmitted downlink signaling, transmitting a third indication of a second location corresponding to an uplink feedback occasion associated with the second data information, and receiving an uplink feedback report for the first data information and the second data information, where the uplink feedback report may be received based on the first SCS, or the second SCS, or both.

In some examples of the non-transitory computer-readable medium described herein, the first location and the second location may be based on a first slot pattern defined according to the first SCS. In some examples of the non-transitory computer-readable medium described herein, the first location and the second location may be determined based on a first slot pattern defined according to the determined second SCS. Some examples of the non-transitory computer-readable medium described herein may further include operations, features, means, or instructions for transmitting a fourth indication of a third location corresponding to the first data information, where the third location may be based on a second slot pattern defined according to the first SCS.

In some examples of the non-transitory computer-readable medium described herein, the uplink feedback report includes a HARQ-ACK codebook. Some examples of the non-transitory computer-readable medium described herein may further include operations, features, means, or instructions for configuring the modem from activating a second BWP to activating the first BWP, where the first data information may be transmitted via the second BWP, and the synchronization signal and the second data information may be transmitted via the first BWP. Some examples of the non-transitory computer-readable medium described herein may further include operations, features, means, or instructions for configuring the modem from activating the first BWP to activating the second BWP based on transmitting the synchronization signal and the second data information, and transmitting third data information via the first BWP.

Some examples of the non-transitory computer-readable medium described herein may further include operations, features, means, or instructions for determining a time delay after the synchronization signal and the second data information, where the configuring may be based on the time delay. In some examples of the non-transitory computer-readable medium described herein, the time delay may be determined based on a processing time associated with HARQ-ACK feedback. In some examples of the non-transitory computer-readable medium described herein, the downlink signaling includes an indication of the time delay.

Some examples of the non-transitory computer-readable medium described herein may further include operations, features, means, or instructions for transmitting a configuration for the first BWP. In some examples of the non-transitory computer-readable medium described herein, the configuration may be transmitted via RRC signaling or a medium access control element. In some examples of the non-transitory computer-readable medium described herein, the first SCS may be associated with the second BWP and the determined second SCS may be associated with the first BWP. Some examples of the non-transitory computer-readable medium described herein may further include operations, features, means, or instructions for identifying a symbol boundary associated with the synchronization signal based on the indication, where the configuring occurs at the identified symbol boundary.

Some examples of the non-transitory computer-readable medium described herein may further include operations, features, means, or instructions for identifying a slot boundary associated with the synchronization signal based on the indication, where the configuring occurs at the identified slot boundary. In some examples of the non-transitory computer-readable medium described herein, the slot boundary may be identified based on the determined second SCS. Some examples of the non-transitory computer-readable medium described herein may further include operations, features, means, or instructions for identifying a SSB burst boundary associated with the synchronization signal based on the indication, where the configuring occurs at the identified SSB burst boundary. Some examples of the non-transitory computer-readable medium described herein may further include operations, features, means, or instructions for determining a temporal period to transmit the synchronization signal and the second data information based on the first BWP and the determined SCS, where the synchronization signal and the data information may be transmitted based on the determined temporal period.

In some examples of the non-transitory computer-readable medium described herein, the synchronization signal and the second data information may be received based on a FDM scheme. In some examples of the non-transitory computer-readable medium described herein, the synchronization signal includes a SSB. In some examples of the non-transitory computer-readable medium described herein, the second SCS includes a default SCS associated with the synchronization signal. In some examples of the non-transitory computer-readable medium described herein, the transmission of the second data information may be temporally adjacent to the transmission of the first data information.

DETAILED DESCRIPTION

Figure 1:
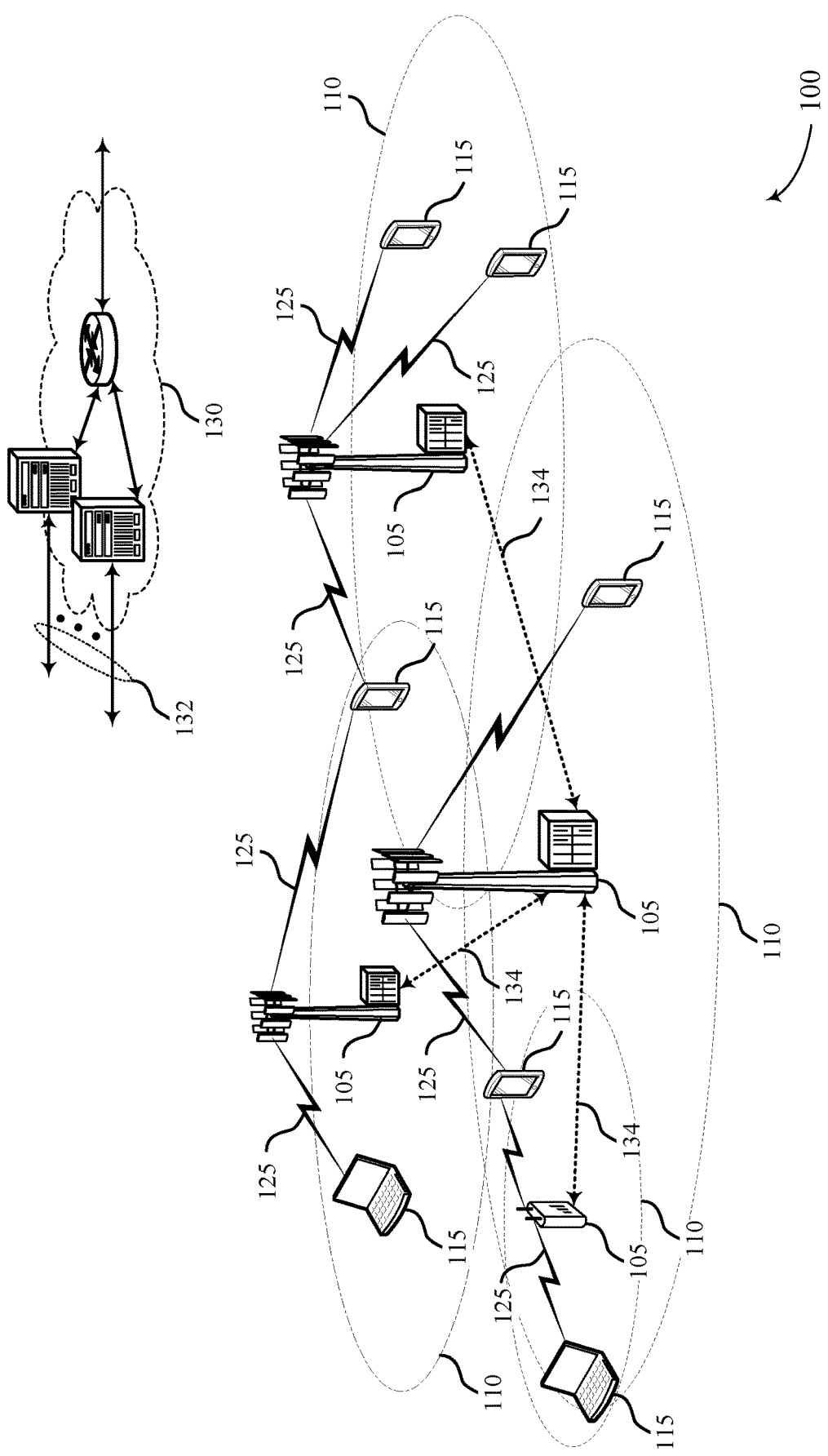
FIG. 1 illustrates an example of a system for wireless communications that supports automatic adaptation of data subcarrier spacing (SCS) based on synchronization signal block (SSB) transmission in accordance with various aspects of the present disclosure.

In some wireless communications systems, a base station and a user equipment (UE) may synchronize communications or establish a connection, or both, using one or more synchronization signal blocks (SSBs). For example, a base station may transmit an SSB to a UE. The SSB may include one or more primary synchronization signals (PSS) and one or more secondary synchronization signals (SSS). The UE may use the PSS and SSS to synchronize with the base station. In some cases, a physical broadcast channel (PBCH) of the SSB may include a master information block (MIB). The MIB may include basic information permitting the UE to establish a connection with the base station. The base station, based on establishing a connection with the UE, may send SSB transmissions using one or more transmission beams in a fixed, repeating pattern, so as to keep the SSB reception performance steady and consistent for the UE (and each other UE served by the base station). For instance, the base station may transmit SSBs during a set of time intervals (e.g., SSB positions or SSB occasions) within a time period (e.g., an SSB period).

In some cases, the UE may be allocated a bandwidth part (BWP) (e.g., the UE may be configured with an active BWP) to communicate with the serving base station. The BWP may be a contiguous set of physical resource blocks (PRBs) on a given wireless communications carrier. In some cases, each BWP may be associated with a numerology, where a sub-carrier spacing (SCS), symbol duration, and cyclic prefix length used for the BWP is based on the numerology. The PRBs may be selected from a contiguous subset of common resource blocks, which are allocated or assigned by the base station to served UEs. The UE may have one active BWP for uplink transmissions and one active BWP for downlink communications. For example, the UE may transmit and receive within the frequency ranges of the active BWPs and the UE may not be configured to transmit or expected to receive outside of the active BWPs for uplink and downlink, respectively. In some cases, the base station configuring the BWP for the UE may indicate the start of the BWP (e.g., in frequency) based on an offset from a common reference point in the carrier. In some cases, the common reference point may correspond to a reference resource block, a start, end, or center point of the carrier, etc.

For some communications systems (e.g., such as New Radio (NR) systems, FR2x systems, FR4 systems, etc.), wider bandwidth may be utilized such that the SCS for data and SSB may be scaled up. However, the SCS of different types of transmissions may not be scaled up equally. For example, the SCS of data may be scaled up (e.g., to 960 kHz, 1.92 MHz, or 3.84 MHz) to enable data to cover the wider bandwidth, while the SCS of synchronization signal blocks (SSB) may be scaled up relatively less with respect to data (e.g., to 120 kHz, 240 kHz, 480 kHz, or 960 kHz) to reduce or maintain relatively low search complexity. In cases in which wireless communications systems employ frequency division multiplexing (FDM) between SSB and data, it may be inefficient to generate a mixed numerology waveform (e.g., where SCS of data is scaled up differently than SCS of SSB). For example, a time-domain summation of two inverse fast Fourier transform (IFFT) outputs for FDM of SSB and data (e.g., each with a different numerology) may result in increased complexity at a receiving device or a transmitting device.

According to the techniques described herein, SCS of data may be adapted or dynamically configured based on the occurrence or presence of a SSB. For example, during a SSB transmission (e.g., during a SSB position or a SSB occasion), the SCS of data may be automatically switched from some default SCS (e.g., some default data SCS) to a second SCS (e.g., the SCS of the SSB) to provide for improved FDM of data and SSB (e.g., to allow for FDM of data and SSB where the data and SSB use the same numerology). As such, communicating devices (e.g., a base station, a UE, etc.) may identify some location or configuration for a SSB (e.g., such as one or more SSB positions or SSB occasions), and may determine the second SCS (e.g., the SCS associated with the SSB) such that the SCS of data may be adapted to the second SCS during the FDM of the SSB and the data. The SSB and data may thus be contemporaneously transmitted or received using the second SCS (e.g., via efficient FDM techniques).

In some cases, the SCS of data may be varied (e.g., dynamically configured) within a BWP. For example, a BWP may be associated with a data numerology and a SSB numerology, where SCS, symbol duration, and cyclic prefix length used for the BWP is based on the data numerology (e.g., in portions or durations of the BWP without SSB) and the SSB numerology (e.g., in portions or durations of the BWP including the SSB). In such cases, when the SSB is transmitted (e.g., within the active BWP) the SCS of the SSB may be used for the SCS of data (e.g., such that the FDM of the SSB and data uses the SCS of the SSB). Otherwise, the default SCS for data may be used where data is transmitted (e.g., within the active BWP).

In other examples, the BWP may be switched automatically (e.g., without DCI indication) inside and outside the SSB burst. For example, wireless communications systems may employ separate BWPs for data and for FDM of SSB and data, where a first BWP may be associated with a SSB numerology (e.g., where a SSB SCS, a SSB symbol duration, and a SSB cyclic prefix length used for the BWP is based on the SSB numerology) and a second BWP may be associated with a data numerology (e.g., where a data SCS, a data symbol duration, and a data cyclic prefix length used for the BWP is based on the data numerology). In such examples, outside the SSB burst, the second BWP with the default SCS for data may be used (e.g., active). Inside the SSB burst, the second BWP may be switched to the first BWP where the SCS for data is the same as the SCS of SSB.

Aspects of the disclosure are initially described in the context of a wireless communications system. Example SCS configurations, SCS adaptation diagrams, UE feedback diagrams, BWP configurations, and process flows illustrating one or more aspects of the techniques discussed herein are then described. Aspects of the disclosure are further illustrated by and described with reference to apparatus diagrams, system diagrams, and flowcharts that relate to automatic adaptation of data SCS numerology based on SSB transmission.

FIG. 1 illustrates an example of a system for wireless communications that supports automatic adaptation of data SCS numerology based on SSB transmission in accordance with various aspects of the present disclosure. The wireless communications system 100 includes base stations 105, UEs 115, and a core network 130. In some examples, the wireless communications system 100 may be a Long Term Evolution (LTE) network, an LTE-Advanced (LTE-A) network, an LTE-A Pro network, or an NR network. In some cases, wireless communications system 100 may support enhanced broadband communications, ultra-reliable (e.g., mission critical) communications, low latency communications, or communications with low-cost and low-complexity devices.

Base stations 105 may wirelessly communicate with UEs 115 via one or more base station antennas. Base stations 105 described herein may include or may be referred to by those skilled in the art as a base transceiver station, a radio base station, an access point, a radio transceiver, a NodeB, an eNodeB (eNB), a next-generation NodeB or giga-NodeB (either of which may be referred to as a gNB), a Home NodeB, a Home eNodeB, or some other suitable terminology. Wireless communications system 100 may include base stations 105 of different types (e.g., macro or small cell base stations). The UEs 115 described herein may be able to communicate with various types of base stations 105 and network equipment including macro eNBs, small cell eNBs, gNBs, relay base stations, and the like.

Each base station 105 may be associated with a geographic coverage area 110 in which communications with various UEs 115 is supported. Each base station 105 may provide communication coverage for a respective geographic coverage area 110 via communication links 125, and communication links 125 between a base station 105 and a UE 115 may utilize one or more carriers. Communication links 125 shown in wireless communications system 100 may include uplink transmissions from a UE 115 to a base station 105, or downlink transmissions from a base station 105 to a UE 115. Downlink transmissions may also be called forward link transmissions while uplink transmissions may also be called reverse link transmissions.

The geographic coverage area 110 for a base station 105 may be divided into sectors making up a portion of the geographic coverage area 110, and each sector may be associated with a cell. For example, each base station 105 may provide communication coverage for a macro cell, a small cell, a hot spot, or other types of cells, or various combinations thereof. In some examples, a base station 105 may be movable and therefore provide communication coverage for a geographic coverage area 110 that may likewise move. In some examples, different geographic coverage areas 110 associated with different technologies may overlap such that geographic coverage areas 110 associated with different technologies may overlap and may be supported by the same base station 105 or by different base stations 105. The wireless communications system 100 may include, for example, a heterogeneous LTE/LTE-A/LTE-A Pro or NR network in which different types of base stations 105 provide coverage for various geographic coverage areas 110.

The term "cell" refers to a logical communication entity used for communication with a base station 105 (e.g., over a carrier), and may be associated with an identifier for distinguishing neighboring cells (e.g., a physical cell identifier (PCID), a virtual cell identifier (VCID)) operating via the same or a different carrier. In some examples, a carrier may support multiple cells, and different cells may be configured according to different protocol types (e.g., machine-type communication (MTC), narrowband Internet-of-Things (NB-IoT), enhanced mobile broadband (eMBB), or others) that may provide access for different types of devices. In some cases, the term "cell" may refer to a portion of a geographic coverage area 110 (e.g., a sector) over which the logical entity operates.

UEs 115 may be dispersed throughout the wireless communications system 100, and each UE 115 may be stationary or mobile. A UE 115 may also be referred to as a mobile device, a wireless device, a remote device, a handheld device, or a subscriber device, or some other suitable terminology, where the "device" may also be referred to as a unit, a station, a terminal, or a client. A UE 115 may also be a personal electronic device such as a cellular phone, a personal digital assistant (PDA), a tablet computer, a laptop computer, or a personal computer. In some examples, a UE 115 may also refer to a wireless local loop (WLL) station, an Internet of Things (IoT) device, an Internet of Everything (IoE) device, or an MTC device, or the like, which may be implemented in various articles such as appliances, vehicles, meters, or the like.

Some UEs 115, such as MTC or IoT devices, may be low cost or low complexity devices, and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay that information to a central server or application program that can make use of the information or present the information to humans interacting with the program or application. Some UEs 115 may be designed to collect information or enable automated behavior of machines. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception simultaneously). In some examples, half-duplex communications may be performed at a reduced peak rate. Other power conservation techniques for UEs 115 include entering a power saving "deep sleep" mode when not engaging in active communications, or operating over a limited bandwidth (e.g., according to narrowband communications). In some cases, UEs 115 may be designed to support critical functions (e.g., mission critical functions), and a wireless communications system 100 may be configured to provide ultra-reliable communications for these functions.

In some cases, a UE 115 may also be able to communicate directly with other UEs 115 (e.g., using a peer-to-peer (P2P) or device-to-device (D2D) protocol). One or more of a group of UEs 115 utilizing D2D communications may be within the geographic coverage area 110 of a base station 105. Other UEs 115 in such a group may be outside the geographic coverage area 110 of a base station 105, or be otherwise unable to receive transmissions from a base station 105. In some cases, groups of UEs 115 communicating via D2D communications may utilize a one-to-many (1:M) system in which each UE 115 transmits to every other UE 115 in the group. In some cases, a base station 105 facilitates the scheduling of resources for D2D communications. In other cases, D2D communications are carried out between UEs 115 without the involvement of a base station 105.

Base stations 105 may communicate with the core network 130 and with one another. For example, base stations 105 may interface with the core network 130 through backhaul links 132 (e.g., via an S1, N2, N3, or other interface). Base stations 105 may communicate with one another over backhaul links 134 (e.g., via an X2, Xn, or other interface) either directly (e.g., directly between base stations 105) or indirectly (e.g., via core network 130).

The core network 130 may provide user authentication, access authorization, tracking, Internet Protocol (IP) connectivity, and other access, routing, or mobility functions. The core network 130 may be an evolved packet core (EPC), which may include at least one mobility management entity (MME), at least one serving gateway (S-GW), and at least one Packet Data Network (PDN) gateway (P-GW). The MME may manage non-access stratum (e.g., control plane) functions such as mobility, authentication, and bearer management for UEs 115 served by base stations 105 associated with the EPC. User IP packets may be transferred through the S-GW, which itself may be connected to the P-GW. The P-GW may provide IP address allocation as well as other functions. The P-GW may be connected to the network operators IP services. The operators IP services may include access to the Internet, Intranet(s), an IP Multimedia Subsystem (IMS), or a Packet-Switched (PS) Streaming Service.

At least some of the network devices, such as a base station 105, may include subcomponents such as an access network entity, which may be an example of an access node controller (ANC). Each access network entity may communicate with UEs 115 through a number of other access network transmission entities, which may be referred to as a radio head, a smart radio head, or a transmission/reception point (TRP). In some examples, various functions of each access network entity or base station 105 may be distributed across various network devices (e.g., radio heads and access network controllers) or consolidated into a single network device (e.g., a base station 105).

Wireless communications system 100 may operate using one or more frequency bands, sometimes in the range of 300 megahertz (MHz) to 300 gigahertz (GHz). For example, the region from 300 MHz to 3 GHz is known as the ultra-high frequency (UHF) region or decimeter band, since the wavelengths range from approximately one decimeter to one meter in length. UHF waves may be blocked or redirected by buildings and environmental features. However, the waves may penetrate structures sufficiently for a macro cell to provide service to UEs 115 located indoors. Transmission of UHF waves may be associated with smaller antennas and shorter range (e.g., less than 100 km) compared to transmission using the smaller frequencies and longer waves of the high frequency (HF) or very high frequency (VHF) portion of the spectrum below 300 MHz.

Wireless communications system 100 may also operate in a super high frequency (SHF) region using frequency bands from 3 GHz to 30 GHz, also known as the centimeter band. The SHF region includes bands such as the 5 GHz industrial, scientific, and medical (ISM) bands, which may be used opportunistically by devices that may be capable of tolerating interference from other users.

Wireless communications system 100 may also operate in an extremely high frequency (EHF) region of the spectrum (e.g., from 30 GHz to 300 GHz), also known as the millimeter band. In some examples, wireless communications system 100 may support millimeter wave (mmW) communications between UEs 115 and base stations 105, and EHF antennas of the respective devices may be even smaller and more closely spaced than UHF antennas. In some cases, this may facilitate use of antenna arrays within a UE 115. However, the propagation of EHF transmissions may be subject to even greater atmospheric attenuation and shorter range than SHF or UHF transmissions. Techniques disclosed herein may be employed across transmissions that use one or more different frequency regions, and designated use of bands across these frequency regions may differ by country or regulating body.

In some cases, wireless communications system 100 may utilize both licensed and unlicensed radio frequency spectrum bands. For example, wireless communications system 100 may employ License Assisted Access (LAA), LTE-Unlicensed radio access technology, or NR technology in an unlicensed band such as the 5 GHz ISM band. When operating in unlicensed radio frequency spectrum bands, wireless devices such as base stations 105 and UEs 115 may employ listen-before-talk (LBT) procedures to ensure a frequency channel is clear before transmitting data. In some cases, operations in unlicensed bands may be based on a carrier aggregation configuration in conjunction with component carriers (CCs) operating in a licensed band (e.g., LAA). Operations in unlicensed spectrum may include downlink transmissions, uplink transmissions, peer-to-peer transmissions, or a combination of these. Duplexing in unlicensed spectrum may be based on frequency division duplexing (FDD), time division duplexing (TDD), or a combination of both.

In some examples, base station 105 or UE 115 may be equipped with multiple antennas, which may be used to employ techniques such as transmit diversity, receive diversity, multiple-input multiple-output (MIMO) communications, or beamforming. For example, wireless communications system 100 may use a transmission scheme between a transmitting device (e.g., a base station 105) and a receiving device (e.g., a UE 115), where the transmitting device is equipped with multiple antennas and the receiving device is equipped with one or more antennas. MIMO communications may employ multipath signal propagation to increase the spectral efficiency by transmitting or receiving multiple signals via different spatial layers, which may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream, and may carry bits associated with the same data stream (e.g., the same codeword) or different data streams. Different spatial layers may be associated with different antenna ports used for channel measurement and reporting. MIMO techniques include single-user MIMO (SU-MIMO) where multiple spatial layers are transmitted to the same receiving device, and multiple-user MIMO (MU-MIMO) where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105 or a UE 115) to shape or steer an antenna beam (e.g., a transmit beam or receive beam) along a spatial path between the transmitting device and the receiving device. Beamforming may be achieved by combining the signals communicated via antenna elements of an antenna array such that signals propagating at some orientations with respect to an antenna array experience constructive interference while others experience destructive interference. The adjustment of signals communicated via the antenna elements may include a transmitting device or a receiving device applying amplitude and phase offsets to signals carried via each of the antenna elements associated with the device. The adjustments associated with each of the antenna elements may be defined by a beamforming weight set associated with an orientation (e.g., with respect to the antenna array of the transmitting device or receiving device, or with respect to some other orientation).

In one example, a base station 105 may use multiple antennas or antenna arrays to conduct beamforming operations for directional communications with a UE 115. For instance, some signals (e.g., synchronization signals, reference signals, beam selection signals, or other control signals) may be transmitted by a base station 105 multiple times in different directions, which may include a signal being transmitted according to different beamforming weight sets associated with different directions of transmission. Transmissions in different beam directions may be used to identify (e.g., by the base station 105 or a receiving device, such as a UE 115) a beam direction for subsequent transmission or reception by the base station 105.

Some signals, such as data signals associated with a receiving device, may be transmitted by a base station 105 in a single beam direction (e.g., a direction associated with the receiving device, such as a UE 115). In some examples, the beam direction associated with transmissions along a single beam direction may be determined based at least in in part on a signal that was transmitted in different beam directions. For example, a UE 115 may receive one or more of the signals transmitted by the base station 105 in different directions, and the UE 115 may report to the base station 105 an indication of the signal it received with a highest signal quality, or an otherwise acceptable signal quality. Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115), or transmitting a signal in a single direction (e.g., for transmitting data to a receiving device).

A receiving device (e.g., a UE 115, which may be an example of a mmW receiving device) may try multiple receive beams when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets applied to signals received at a plurality of antenna elements of an antenna array, or by processing received signals according to different receive beamforming weight sets applied to signals received at a plurality of antenna elements of an antenna array, any of which may be referred to as "listening" according to different receive beams or receive directions. In some examples, a receiving device may use a single receive beam to receive along a single beam direction (e.g., when receiving a data signal). The single receive beam may be aligned in a beam direction determined based at least in part on listening according to different receive beam directions (e.g., a beam direction determined to have a highest signal strength, highest signal-to-noise ratio, or otherwise acceptable signal quality based at least in part on listening according to multiple beam directions).

In some cases, the antennas of a base station 105 or UE 115 may be located within one or more antenna arrays, which may support MIMO operations, or transmit or receive beamforming. For example, one or more base station antennas or antenna arrays may be co-located at an antenna assembly, such as an antenna tower. In some cases, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations.

In some cases, wireless communications system 100 may be a packet-based network that operate according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use hybrid automatic repeat request (HARQ) to provide retransmission at the MAC layer to improve link efficiency. In the control plane, the Radio Resource Control (RRC) protocol layer may provide establishment, configuration, and maintenance of an RRC connection between a UE 115 and a base station 105 or core network 130 supporting radio bearers for user plane data. At the Physical layer, transport channels may be mapped to physical channels.

In some cases, UEs 115 and base stations 105 may support retransmissions of data to increase the likelihood that data is received successfully. HARQ feedback is one technique of increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., signal-to-noise conditions). In some cases, a wireless device may support same-slot HARQ feedback, where the device may provide HARQ feedback in a specific slot for data received in a previous symbol in the slot. In other cases, the device may provide HARQ feedback in a subsequent slot, or according to some other time interval.

Time intervals in LTE or NR may be expressed in multiples of a basic time unit, which may, for example, refer to a sampling period of $T_s=1/30,720,000$ seconds. Time intervals of a communications resource may be organized according to radio frames each having a duration of 10 milliseconds (ms), where the frame period may be expressed as $T_f=307,200\ T_s$. The radio frames may be identified by a system frame number (SFN) ranging from 0 to 1023. Each frame may include 10 subframes numbered from 0 to 9, and each subframe may have a duration of 1 ms. A subframe may be further divided into 2 slots each having a duration of 0.5 ms, and each slot may contain 6 or 7 modulation symbol periods (e.g., depending on the length of the cyclic prefix prepended to each symbol period). Excluding the cyclic prefix, each symbol period may contain 2048 sampling periods. In some cases, a subframe may be the smallest scheduling unit of the wireless communications system 100, and may be referred to as a transmission time interval (TTI). In other cases, a smallest scheduling unit of the wireless communications system 100 may be shorter than a subframe or may be dynamically selected (e.g., in bursts of shortened TTIs (sTTIs) or in selected CCs using sTTIs).

In some wireless communications systems, a slot may further be divided into multiple mini-slots containing one or more symbols. In some instances, a symbol of a mini-slot or a mini-slot may be the smallest unit of scheduling. Each symbol may vary in duration depending on the subcarrier spacing or frequency band of operation, for example. Further, some wireless communications systems may implement slot aggregation in which multiple slots or mini-slots are aggregated together and used for communication between a UE 115 and a base station 105.

The term "carrier" refers to a set of radio frequency spectrum resources having a defined physical layer structure for supporting communications over a communication link 125. For example, a carrier of a communication link 125 may include a portion of a radio frequency spectrum band that is operated according to physical layer channels for a given radio access technology. Each physical layer channel may carry user data, control information, or other signaling. A carrier may be associated with a pre-defined frequency channel (e.g., an evolved universal mobile telecommunication system terrestrial radio access (E-UTRA) absolute radio frequency channel number (EARFCN)), and may be positioned according to a channel raster for discovery by UEs 115. Carriers may be downlink or uplink (e.g., in an FDD mode), or be configured to carry downlink and uplink communications (e.g., in a TDD mode). In some examples, signal waveforms transmitted over a carrier may be made up of multiple sub-carriers (e.g., using multi-carrier modulation (MCM) techniques such as orthogonal frequency division multiplexing (OFDM) or discrete Fourier transform spread OFDM (DFT-S-OFDM)).

The organizational structure of the carriers may be different for different radio access technologies (e.g., LTE, LTE-A, LTE-A Pro, NR). For example, communications over a carrier may be organized according to TTIs or slots, each of which may include user data as well as control information or signaling to support decoding the user data. A carrier may also include dedicated acquisition signaling (e.g., synchronization signals or system information, etc.) and control signaling that coordinates operation for the carrier. In some examples (e.g., in a carrier aggregation configuration), a carrier may also have acquisition signaling or control signaling that coordinates operations for other carriers.

Physical channels may be multiplexed on a carrier according to various techniques. A physical control channel and a physical data channel may be multiplexed on a downlink carrier, for example, using time division multiplexing (TDM) techniques, FDM techniques, or hybrid TDM-FDM techniques. In some examples, control information transmitted in a physical control channel may be distributed between different control regions in a cascaded manner (e.g., between a common control region or common search space and one or more UE-specific control regions or UE-specific search spaces).

A carrier may be associated with a bandwidth of the radio frequency spectrum band, and in some examples the carrier bandwidth may be referred to as a "system bandwidth" of the carrier or the wireless communications system 100. For example, the carrier bandwidth may be one of a number of predetermined bandwidths for carriers of a radio access technology (e.g., 1.4, 3, 5, 10, 15, 20, 40, or 80 MHz). In some examples, each UE 115 may be configured for operating over portions or all of the carrier bandwidth. In other examples, some UEs 115 may be configured for operation using a narrowband protocol type that is associated with a predefined portion or range (e.g., set of subcarriers or RBs) within a carrier (e.g., "in-band" deployment of a narrowband protocol type).

In a system employing MCM techniques, a resource element may include one symbol period (e.g., a duration of one modulation symbol) and one subcarrier, where the symbol period and subcarrier spacing are inversely related. The number of bits carried by each resource element may depend on the modulation scheme (e.g., the order of the modulation scheme). Thus, the more resource elements that a UE 115 receives and the higher the order of the modulation scheme, the higher the data rate may be for the UE 115. In MIMO systems, a wireless communications resource may refer to a combination of a radio frequency spectrum resource, a time resource, and a spatial resource (e.g., spatial layers), and the use of multiple spatial layers may further increase the data rate for communications with a UE 115.

Devices of the wireless communications system 100 (e.g., base stations 105 or UEs 115) may have a hardware configuration that supports communications over a carrier bandwidth, or may be configurable to support communications over one of a set of carrier bandwidths. In some examples, the wireless communications system 100 may include base stations 105 or UEs 115 that support simultaneous communications via carriers associated with more than one different carrier bandwidth.

Wireless communications system 100 may support communication with a UE 115 on multiple cells or carriers, a feature which may be referred to as carrier aggregation or multi-carrier operation. A UE 115 may be configured with multiple downlink CCs and one or more uplink CCs according to a carrier aggregation configuration. Carrier aggregation may be used with both FDD and TDD CCs.

In some cases, wireless communications system 100 may utilize enhanced CCs (eCCs). An eCC may be characterized by one or more features including wider carrier or frequency channel bandwidth, shorter symbol duration, shorter TTI duration, or modified control channel configuration. In some cases, an eCC may be associated with a carrier aggregation configuration or a dual connectivity configuration (e.g., when multiple serving cells have a suboptimal or non-ideal backhaul link). An eCC may also be configured for use in unlicensed spectrum or shared spectrum (e.g., where more than one operator is allowed to use the spectrum). An eCC characterized by wide carrier bandwidth may include one or more segments that may be utilized by UEs 115 that are not capable of monitoring the whole carrier bandwidth or are otherwise configured to use a limited carrier bandwidth (e.g., to conserve power).

In some cases, an eCC may utilize a different symbol duration than other CCs, which may include use of a reduced symbol duration as compared with symbol durations of the other CCs. A shorter symbol duration may be associated with increased spacing between adjacent subcarriers. A device, such as a UE 115 or base station 105, utilizing eCCs may transmit wideband signals (e.g., according to frequency channel or carrier bandwidths of 20, 40, 60, 80 MHz, etc.) at reduced symbol durations (e.g., 16.67 microseconds). A TTI in eCC may include one or multiple symbol periods. In some cases, the TTI duration (that is, the number of symbol periods in a TTI) may be variable.

Wireless communications system 100 may be an NR system that may utilize any combination of licensed, shared, and unlicensed spectrum bands, among others. The flexibility of eCC symbol duration and subcarrier spacing may allow for the use of eCC across multiple spectrums. In some examples, NR shared spectrum may increase spectrum utilization and spectral efficiency, specifically through dynamic vertical (e.g., across the frequency domain) and horizontal (e.g., across the time domain) sharing of resources.

Wireless communications system 100 may support adaptation or dynamic configurations of SCS of data based on the occurrence or presence of a SSB. For example, during a SSB transmission (e.g., during a SSB position or a SSB occasion), the SCS of data may be automatically switched from some default SCS (e.g., some default data SCS) to a second SCS (e.g., a SCS of the SSB) to provide for improved FDM of data and SSB (e.g., to allow for FDM of data and SSB where the data and SSB use the same numerology). As such, communicating devices (e.g., base stations 105, UEs 115, etc.) may identify some location or configuration for a SSB (e.g., such as one or more SSB positions or SSB occasions), and may determine the second SCS (e.g., the SCS associated with the SSB) such that the SCS of data may be adapted to the second SCS during the FDM of the SSB and the data. The SSB and data may thus be contemporaneously transmitted or received using the second SCS (e.g., via efficient FDM techniques).

For example, a UE 115 may receive first data information transmitted (e.g., transmitted by a base station 105) using a first SCS. The UE 115 may receive DCI, on a physical downlink control channel (PDCCH), that includes an indication of a synchronization signal (e.g., a SSB) in a first BWP, and the UE 115 may determine the second SCS (e.g., the SCS of the SSB) based on the indication. As such, the UE 115 may contemporaneously receive the synchronization signal and second data information that are transmitted by the base station 105 using the determined second SCS.

In some examples, the SCS of data may be varied (e.g., dynamically configured) within a BWP (e.g., within the first BWP). For example, the first BWP may be associated with both a data numerology and a SSB numerology, where SCS, symbol duration, or cyclic prefix length used for the BWP is based on the data numerology (e.g., in portions or durations of the BWP without SSB, such as for receiving the first data information) and the SSB numerology (e.g., in portions or durations of the BWP including the SSB, such as for receiving the SSB and the second data information). In some other examples, BWPs may be switched automatically (e.g., without DCI indication) inside and outside the SSB burst. For example, wireless communications system 100 may employ separate BWPs for data and for FDM of SSB and data. In such examples, a second BWP may be associated with a data numerology (e.g., where a data SCS, a data symbol duration, and a data cyclic prefix length used for the BWP is based on the data numerology) and the first BWP may be associated with a SSB numerology (e.g., where a SSB SCS, a SSB symbol duration, and a SSB cyclic prefix length used for the BWP is based on the SSB numerology). As such, the second BWP may be used for receiving the first data information and the first BWP may be used for receiving the SSB and the second data information.

Figure 2:
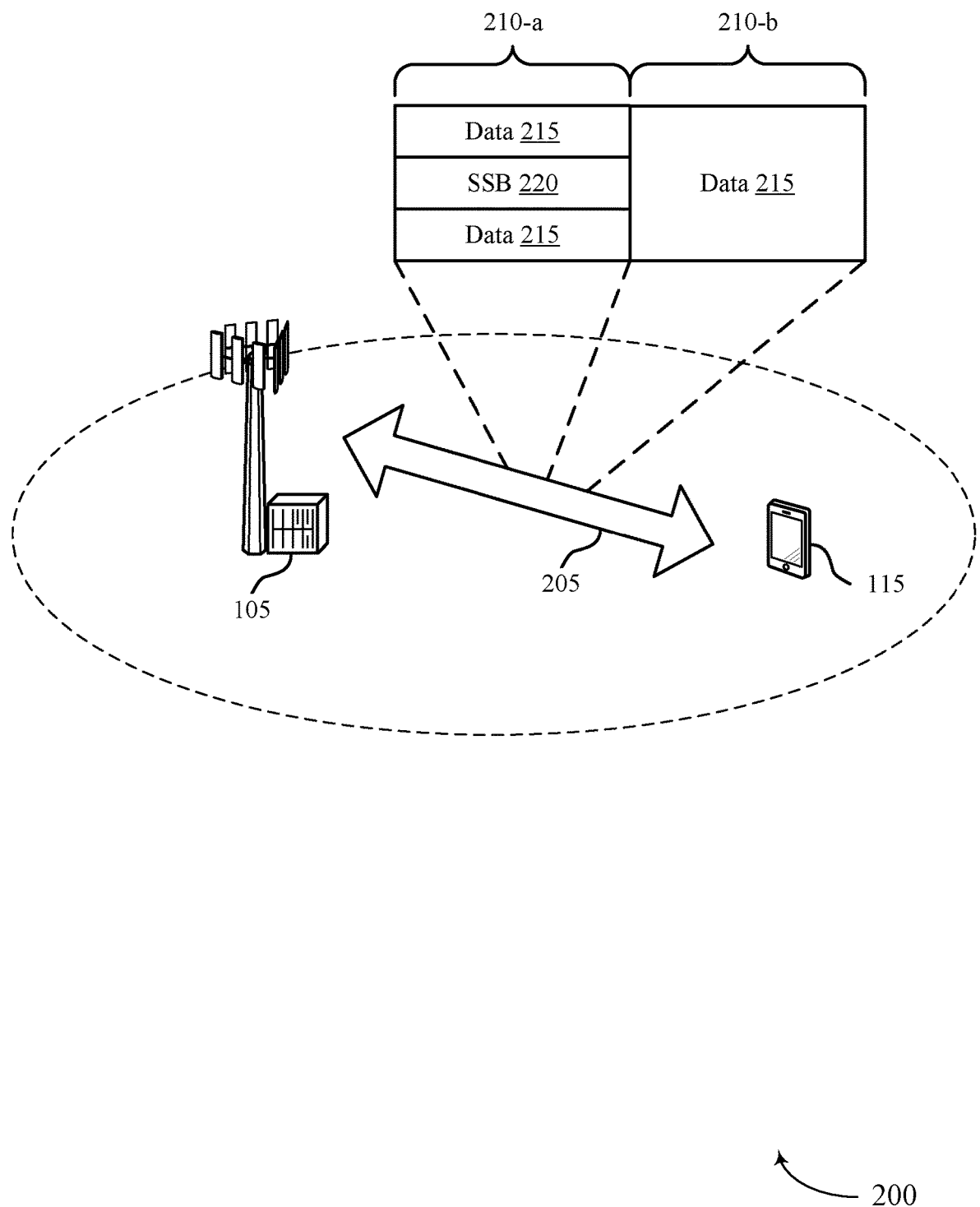
FIG. 2 illustrates an example of a wireless communications system that supports automatic adaptation of data SCS numerology based on SSB transmission in accordance with various aspects of the present disclosure.

FIG. 2 illustrates an example of a wireless communications system that supports automatic adaptation of data SCS numerology based on SSB transmission in accordance with various aspects of the present disclosure. In some examples, wireless communications system 200 may implement aspects of wireless communications system 100. For example, wireless communications system 200 may include base station 105 and UE 115, which may be examples of base stations 105 and UEs 115 as shown in and described with reference to FIG. 1. Base station 105 may communicate with UE 115 (e.g., send transmission 210 to UE 115) via communication link 205. In the example of FIG. 2, transmission 210-a may include FDM of data 215 and a SSB 220 and transmission 210-b may include data 215. The techniques described herein may provide for adaptation of the SCS of data 215 (e.g., across transmission 210-a and transmission 210-b).

Some wireless communications systems (e.g., wireless communications system 200, which may include FR2x systems or FR4 systems) may utilize a wider bandwidth than some other wireless communications systems, which may result in a scaling of SCS as a result of the wider available bandwidth in such wireless communications systems. However, the SCS of different types of transmissions may not be scaled up equally. For example, the SCS of data (e.g., SCS of data 215) may be scaled up to enable data to cover the wider bandwidth, while the SCS of SSB (e.g., SCS of the SSB 220) may be scaled up less (e.g., to reduce search complexity) relative to the scaling of data SCS. For example, data 215 may be associated with SCS of 960 kHz, 1.92 MHz, or 3.84 MHz while the SSB 220 may be associated with SCS of 120 kHz, 240 kHz, 480 kHz, or 960 kHz.

Generating a transmission waveform comprising two different SCSs (e.g., two different numerologies) may be difficult due to additional processing complexity for the base station 105 or the UE 115. For example, generating a mixed numerology transmission waveform may involve time-domain summation of two IFFT outputs, each with a different numerology. Alternatively, transmissions with different SCS may not be transmitted together (e.g., may not use FDM). However, this may result in increased transmission latency, as transmissions with a first SCS (e.g., data 215 with data SCS) may be delayed or halted until transmissions with a second SCS (e.g., the SSB 220 with SSB SCS) are performed. Such increased latency may result in degraded system performance or user experience (e.g., in cases with downlink urgent traffic).

In some implementations of the present disclosure, the SCS of data 215 may automatically adapt (e.g., be dynamically configured) to match the SCS of the SSB 220 when data 215 and the SSB 220 are scheduled for concurrent transmission (e.g., for FDM of data 215 and the SSB 220 in transmission 210-a). For example, when data 215 and the SSB 220 are transmitted concurrently (e.g., contemporaneously), the SCS of data 215 may be adapted to the SCS of the SSB 220. This may enable the efficient transmission of data 215 and the SSB 220 (e.g., via transmission 210-a) when the SCS of data 215 and the SSB 220 are otherwise, in default configurations, different (e.g., as a transmission 210-a waveform for FDM of data 215 and the SSB 220 may be generated according to a same SCS for data 215 and the SSB 220).

In some cases, the SCS of data 215 may be adapted (e.g., switched, configured, etc.) to match the SCS of the SSB 220 during a SSB position or SSB occasion within a BWP (e.g., within an active BWP for transmission 210-a and transmission 210-b). In such cases, the SCS of data 215 may be adapted to the SCS of the SSB 220 during transmission of the SSB 220 within the active BWP. For example, the SCS of data 215 may be adapted within a BWP based on the position or occasion of the SSB 220 (e.g., SCS of data 215 may be adapted or configured to SCS of the SSB 220 during transmission 210-a). When the SSB 220 is not transmitted (e.g., in transmission 210-b), the SCS of data 215 may remain the same (e.g., may remain the default SCS of data according to the data numerology of the active BWP). When the SSB 220 is transmitted (e.g., in transmission 210-*a*), the SCS of data 215 may adapt to the SCS of the SSB 220 during the transmission 210-*a* according to the SSB numerology of the active BWP.

In some examples, the BWP may be switched automatically (e.g., without DCI indication) inside and outside the SSB position or occasion. For example, separate BWPs may be used for data 215 (e.g., for transmission 210-*b*) and for FDM of data 215 and the SSB 220 (e.g., for transmission 210-*a*). For instance, a first BWP may be associated with a SSB numerology (e.g., associated with the SSB SCS) and a second BWP may be associated with a data numerology (e.g., associated with the default data SCS) and, as such, when data 215 is transmitted the second BWP may be used (e.g., transmission 210-*b* may be associated with the second BWP) and when data 215 and the SSB 220 are FDM the first BWP may be used (e.g., transmission 210-*a* may be associated with the first BWP). Thus, in transmission 210-*b*, when the SSB 220 is not transmitted, the second BWP may be used to transmit data at the default SCS of data. In transmission 210-*a*, when SSB is transmitted, the second BWP may be switched to the first BWP so that data 215 and the SSB 220 may be transmitted with the same SCS (e.g., a SCS corresponding to the SSB 220).

The SCS of data 215 may be switched at a number of different locations in the time domain. That is, the described techniques provide for various SCS configuration boundaries (e.g., SCS switching boundaries, SCS adaptation triggers, etc.) for when SCS is adapted based on the presence or completion of the transmission of the SSB 220. In some cases, the SCS of data 215 may adapt to match the SCS of the SSB 220 at a SSB symbol boundary (symbol-level switching) associated with the SSB 220. For example, data 215 may be transmitted with a default SCS up until the first symbol that contains the transmission of the SSB 220 (e.g., the first symbol of a SSB burst, according to the numerology of the SSB 220). In this case, the data slot boundary and the SSB symbol boundary may not be aligned at the switching point (e.g., as described in further detail herein, for example, with reference to FIG. 4).

In some cases, the SCS of data 215 may adapt to match the SCS of the SSB 220 at a SSB slot boundary (slot-level switching) associated with the SSB 220. For example, data 215 may be transmitted with a first SCS up until the first slot that contains the SSB 220 transmission. In this case, the data slot boundary and the SSB slot boundary may be aligned at the switching point. In some cases, the SCS of data 215 may adapt to match the SCS of the SSB 220 at the SSB burst boundary (SSB-burst level switching) associated with the SSB 220. For example, data 215 may be transmitted with a first SCS up until the first subframe of the SSB burst. In this case, the data slot boundary and the SSB slot boundary may be aligned at the switching point.

In some cases, DCI indication (e.g., $K_0/K_1$ indication) may indicate the location of downlink data (e.g., data 215) as well as where a UE may transmit ACK/negative acknowledgement (NACK). In other words, DCI may include $K_0/K_1$ indication for scheduling downlink data (e.g., over a physical downlink shared channel (PDSCH)) and corresponding uplink feedback occasions, respectively. For example, $K_0$ may indicate a number of slots until a slot containing data 215 associated with the indication may be received, and $K_1$ may indicate a number of slots between the slot containing the data 215 and when the UE may transmit ACK/NACK associated with the data 215.

In some cases, during the SSB transmission (e.g., during transmission 210-*a*), $K_0/K_1$ may be defined in a first slot pattern (e.g., in a virtual slot pattern) that may be defined with respect to the SCS of data 215. In such cases, for example, a virtual slot duration may be defined during transmission 210-*a* and may be the same as the slot duration of data 215 outside of the SSB transmission (e.g., during transmission 210-*b*). In some cases, the SCS of the SSB 220 may be defined as M and the SCS of data 215 may be defined as N. In such examples, the virtual slot duration during transmission 210-*a* may be defined as:

$$N/M*\{\text{slot duration w. r. t. SCS of data}\}$$

In some other cases, during transmission 210-*a*, $K_0/K_1$ may be defined according to a second slot pattern (e.g., an actual slot pattern) that may be defined with respect to the SCS of the SSB 220. In such cases, for example, the actual slot duration during transmission 210-*a* may be different than the slot duration of data 215 in transmission 210-*b* such that the slot duration varies.

In some cases, a hybrid automatic repeat request acknowledgment (HARQ-ACK) codebook may be designed based on the $K_1$ indication. For example, $K_1$ may be defined based on virtual slots or actual slots, and the HARQ-ACK codebook may be designed based on the definition of $K_1$. For example, when $K_1$ is defined based on virtual slots (e.g., slots defined based on the default SCS of data 215), the codebook may include information (e.g., a number of bits) indicating ACK/NACK for each virtual slot during transmission 210-*a*. In some cases, the ACK/NACK for the virtual slots may all be set to NACK. In other cases, the ACK/NACK for the virtual slots may all be set to ACK or NACK according to the indication of the first virtual slot during transmission 210-*a*. For example, the codebook entry for each virtual slot during transmission 210-*a* may be set equal to the entry of the first virtual slot during transmission 210-*a*. In some cases, designing the codebook based on virtual slots may increase feedback reliability.

In cases when $K_1$ is defined based on actual slots (e.g., slots defined based on the SCS of the SSB 220), the codebook may include information (e.g., a number of bits) for a single slot during transmission 210-*a* (e.g., a single slot corresponding to the duration of the transmission of the SSB 220). For example, instead of carrying entries for a number of virtual slots during transmission 210-*a*, the codebook may carry a single entry for the single slot during transmission 210-*a*. In some cases, this may enable the UE to omit a portion of the codebook (e.g., to reduce feedback overhead).

In some cases, the SCS of data 215 may adapt to match the SCS of the SSB 220 via BWP switching (e.g., where a second BWP is active for transmission 210-*b* and a first BWP is active for transmission 210-*a*). For example, an active BWP may be switched from a default BWP to a first BWP, where data 215 and the SSB 220 may be transmitted during the first BWP, and then may switch back to the default BWP after the transmission of the SSB 220. In some cases, a switching-back point may be defined. For example, in some cases the switching-back point may be defined to occur a time interval $\Delta T$ after transmission 210-*a* has finished. For example, transmission 210-*a* may finish at $T_1$, and the switching-back point may occur at $T_1 + \Delta T$. In some cases, the time interval $\Delta T$ may enable the base station 105 to address the ACK/NACKs before the switching occurs. Additionally or alternatively, the configuration of the BWP during transmission 210-*a* may be indicated semi-statically (e.g., via RRC or MAC control element (MAC-CE)). In some cases, the indication may include the time interval $\Delta T$, the bandwidth of the bandwidth part, etc. For example, the bandwidth of the BWP used during transmission 210-a may or may not be the same as the bandwidth of the default BWP used for transmission 210-b. In some other cases, the switching back point may be indicated dynamically (e.g., via DCI). For example, the base station 105 may decide the switching back point based on the HARQ process in the BWP used for transmission 210-a and indicate the switching back point via DCI.

Figure 3A:
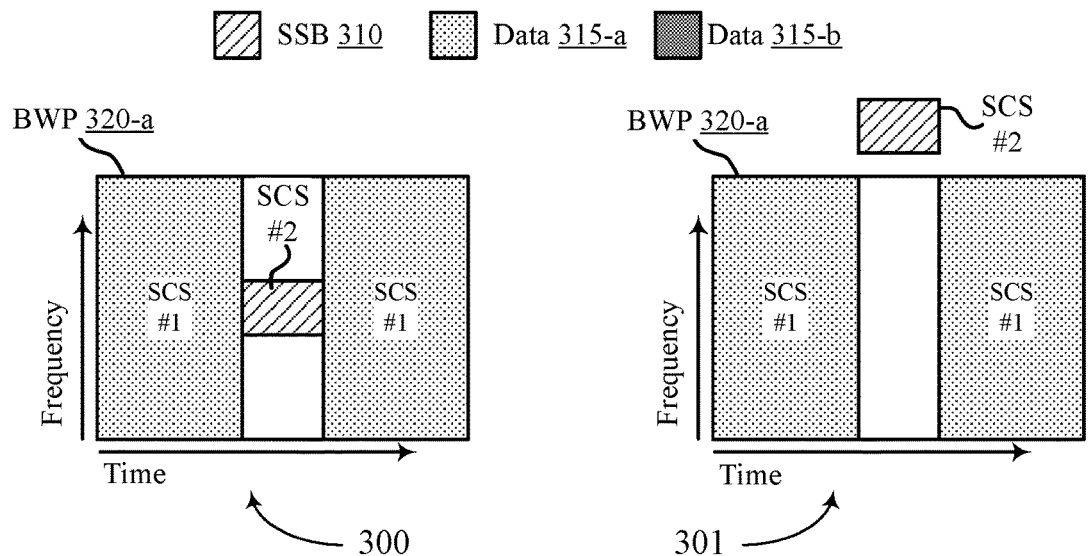
FIGS. 3A, 3B, and 3C illustrate example SCS configurations that support automatic adaptation of data SCS numerology based on SSB transmission in accordance with various aspects of the present disclosure.

FIG. 3A illustrates example SCS configurations that support automatic adaptation of data SCS numerology based on SSB transmission in accordance with various aspects of the present disclosure. In some examples, SCS configuration 300 and SCS configuration 301 may be implemented to realize aspects of wireless communications system 100 or wireless communications system 200.

SCS configuration 300 may illustrate an example where a SSB 310 and data 315 are within an active BWP 320-a (e.g., within a first BWP). In some cases, the SSB 310 may be associated with a different SCS than data 315-a. For example, data 315-a may be associated with a first SCS (e.g., default data SCS #1), while the SSB 310 may be associated with a second SCS (e.g., SCS #2). In such cases, the active BWP 320-a may be associated with a data numerology (supporting SCS #1) and a SSB numerology (supporting SCS #2) to support the transmission of both the SSB 310 and data 315 within the active BWP 320-a (e.g., where the data numerology is employed when SSB 310 is not temporally present and the SSB numerology is employed when SSB 310 is temporally present). In some cases, data 315 and SSB 310 may not be transmitted together (e.g., may not be FDM). For example, data 315-a may be transmitted for a first time period and the SSB 310 may be transmitted for a second time period after the first time period when data 315-a is not transmitted. In such cases where data 315 and SSB 310 are not FDM, the SCS of data 315 may not adapt to the SCS of SSB 310 (e.g., as data 315 may not be transmitted with SSB 310).

SCS configuration 301 may illustrate an example where the SSB 310 may be transmitted outside of the active BWP 320-a while data 315 may be transmitted within the active BWP 320-a. For example, the SSB 310 may not be expected within the active BWP 320-a. SCS configuration 301 may be configured similarly to SCS configuration 300 and may not transmit data 315 and the SSB 310 concurrently (e.g., data 315 and the SSB 310 may not be FDM). In cases when the SSB 310 may not be expected within the active BWP 320-a, data 315 may still not be transmitted during the SSB 310 location. In such cases, SCS #1 of data 315 may not adapt to SCS #2 of the SSB 310. In some examples, data 315-a may be configured with data SCS and a UE may switch to a different BWP to receive the SSB 310 (e.g., where the different BWP may be associated with a SCS corresponding to the SSB 310).

Figure 3B:
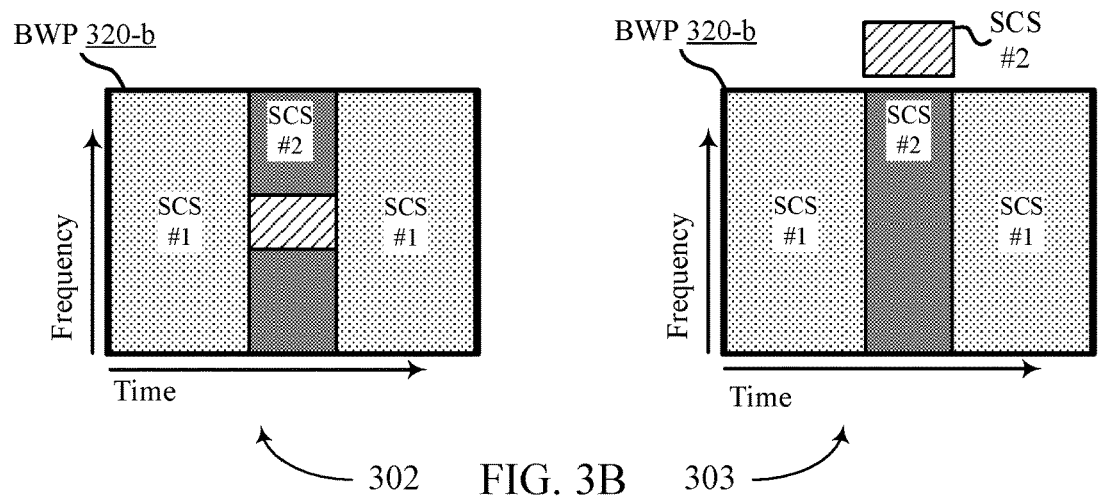

FIG. 3B illustrates example SCS configurations that support automatic adaptation of data SCS numerology based on SSB transmission in accordance with various aspects of the present disclosure. In some examples, SCS configuration 302 and SCS configuration 303 may be implemented to realize aspects of wireless communications system 100 or wireless communications system 200.

SCS configuration 302 may illustrate an example where a SSB 310 is within an active BWP 320-b. In such cases, according to the implementations of the present disclosure, SCS may be adapted during transmission of data 315. For example, a first SCS (e.g., SCS #1) may be used for transmission of data 315-a. During transmission of the SSB 310 within the active BWP 320-b (e.g., where the SSB 310 and data 315-b are FDM), the SCS may be adapted or configured such that a second SCS (e.g., SCS #2) may be used for transmission/reception of both the SSB 310 and the data 315-b. The active BWP 320-a may be associated with a data numerology (supporting SCS #1) and a SSB numerology (supporting SCS #2) to support the transmission of both the SSB 310 and data 315 within the active BWP 320-a (e.g., where the data numerology is employed when SSB 310 is not temporally present and the SSB numerology is employed data 315 and SSB 310 are FDM).

In some cases, communicating devices (e.g., base station and UE) may identify a location or configuration for SSB 310. For example, one or more SSB positions or SSB occasions of an SSB burst may be identified. SCS configuration 302 may illustrate an example of an identified SSB configuration. SCS configuration 302 may include data 315 transmissions and a SSB 310 transmission within the active BWP 320-b. At a first time period prior to the SSB 310 occasion, data 315 may be transmitted with SCS #1 (e.g., a default data SCS). The transmission of data 315-a (data 315 with SCS #1) in the first time period may be an example of a transmission 210-b (as shown in FIG. 2). When the SSB 310 is transmitted, the SCS of data 315-a (SCS #1) may adapt to the SCS of the SSB 310 (SCS #2). For example, data 315-b (data 315 with SCS #2) and the SSB 310 may both be transmitted using the SCS of the SSB 310. In some cases, transmitting both data 315-b and the SSB 310 with SCS #2 may enable concurrent transmission of data 315-b and the SSB 310 (e.g., FDM) during the SSB occasion. For example, data 315-b and the SSB 310 may be concurrently transmitted during transmission 210-a (as shown in FIG. 2) (e.g., via FDM, where the waveform is generated based on a same SCS for both data 315-b and SSB 310).

After the SSB occasion, data 315 may switch back to SCS #1. For example, data 315-a may switch back to its default SCS after an SSB occasion. Data 315 may be switched between SCS #1 and SCS #2 due to active BWP 320-b supporting at least two numerologies. For example, an active BWP 320-b may be associated with a first numerology that supports SCS #1 and a second numerology that supports SCS #2 (e.g., when a SSB occasion, a SSB burst, etc. is identified or configured within the active BWP 320-b).

SCS configuration 303 may illustrate an example where a SSB 310 is outside the active BWP 320-b while data 315 may be transmitted within active BWP 320-b. For example, SSB 310 may not be expected within active BWP 320-b. In such cases, the SCS of data 315 may adapt to the SCS of the SSB 310 and may be transmitted/received concurrently with the SSB 310, but data 315 and the SSB 310 may not be FDM. For example, base station 105 or UE 115 may identify the occasion of the SSB 310 and the SCS #1 of data 315-a may adapt to the SCS #2 of the SSB 310 during the SSB 310 occasion. After the SSB 310 occasion, data 315 may switch back from SCS #2 to SCS #1. For example, the SCS of data 315 may switch back from the SCS of the SSB 310 to the default SCS of data 315 based on the configuration of the active BWP 320-b.

Figure 3C:
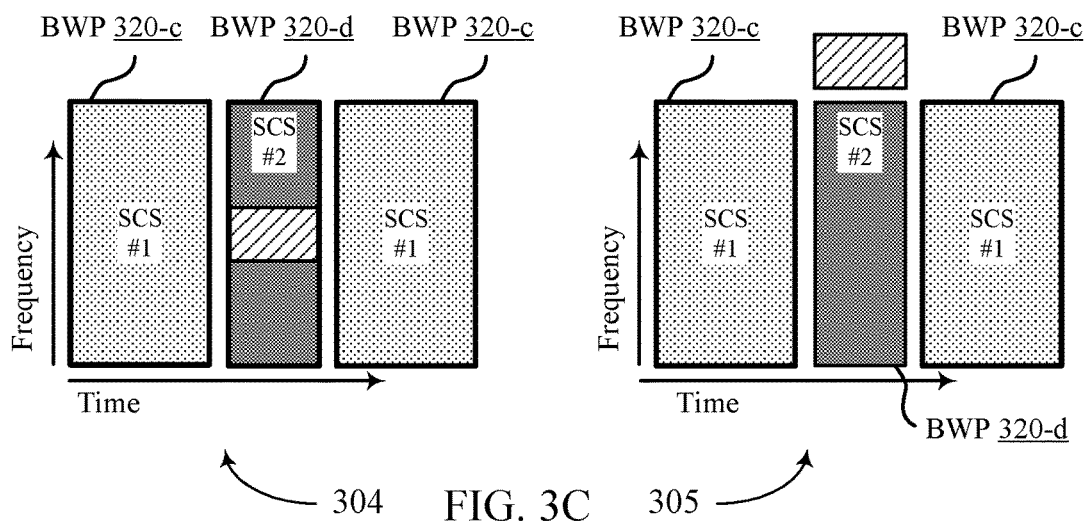

FIG. 3C illustrates example SCS configurations that support automatic adaptation of data SCS numerology based on SSB transmission in accordance with various aspects of the present disclosure. In some examples, SCS configuration 304 and SCS configuration 305 may be implemented to realize aspects of wireless communications system 100 or wireless communications system 200.

SCS configuration 304 may illustrate an example where a SSB 310 is within a BWP 320-d. In such cases, according to the techniques described herein, SCS may be adapted during transmission of data 315. For example, a first SCS (e.g., SCS #1) may be used for transmission of data 315-*a* during default BWP 320-*c*. During transmission of the SSB 310 within the BWP 320-*d* (e.g., where the SSB 310 and data 315-*b* are FDM), the SCS may be adapted or updated such that a second SCS (e.g., SCS #2) may be used for transmission/reception of both the SSB 310 and the data 315-*b*. That is, a BWP switching between the default BWP 320-*c* (e.g., an active BWP 320 for data 315-*a*) and BWP 320-*d* (e.g., an active BWP 320 for FDM of data 315-*b* and SSB 310) may be employed to facilitate SCS adaptation, as described in more detail herein.

In some cases, base station 105 and UE 115 may identify a configuration for SSB 310 and may switch active BWPs during the transmission of the SSB 310. For example, data 315-*a* may initially be transmitted in default BWP 320-*c* with SCS #1 prior to the transmission of the SSB 310. During the transmission of the SSB 310, the BWP may automatically switch (e.g., without DCI indication) to support concurrent transmission of data 315 and the SSB 310. In some cases, BWP 320-*d* may be preferable for transmitting data 315 and the SSB 310 based on a numerology of the BWP 320-*d* (e.g., based on the BWP 320-*d* being configured with a SCS of the SSB 310).

For example, default BWP 320-*c*, over which data 315-*a* is transmitted or received using SCS #1 outside of the occasion of SSB 310, may automatically switch to BWP 320-*d*, over which data 315-*b* and the SSB 310 may be transmitted or received using SCS #2 when the SSB 310 is transmitted. In some cases, default BWP 320-*c* may be associated with a numerology that supports SCS #1 and BWP 320-*d* may be associated with a numerology that supports SCS #2. For example, when the BWP is switched from default BWP 320-*c* to BWP 320-*d*, data 315 may automatically adapt from SCS #1 to SCS #2 based on switching from the numerology that supports SCS #1 to the numerology that supports SCS #2. By switching to BWP 320-*d*, data 315 and SSB 310 may be transmitted concurrently (e.g., may be FDM). In some cases, default BWP 320-*c* may be the active BWP outside of the transmission of the SSB 310 (e.g., during transmission 210-*b* as shown in FIG. 2) and BWP 320-*d* may be the active BWP during the transmission of the SSB 310 (e.g., during transmission 210-*a* as shown in FIG. 2).

SCS configuration 305 may illustrate an example where the SSB 310 is outside the active BWP (e.g., outside of BWP 320-*d*). For example, the SSB 310 may not be expected within BWP 320-*d*. In such cases, concurrent transmission/reception of the SSB 310 may be supported by adapting the SCS #1 of data 315 to SCS #2 of the SSB 310 by automatically switching from default BWP 320-*c* to BWP 320-*d* during the transmission of the BWP in a similar manner to SCS configuration 304.

Figure 4:
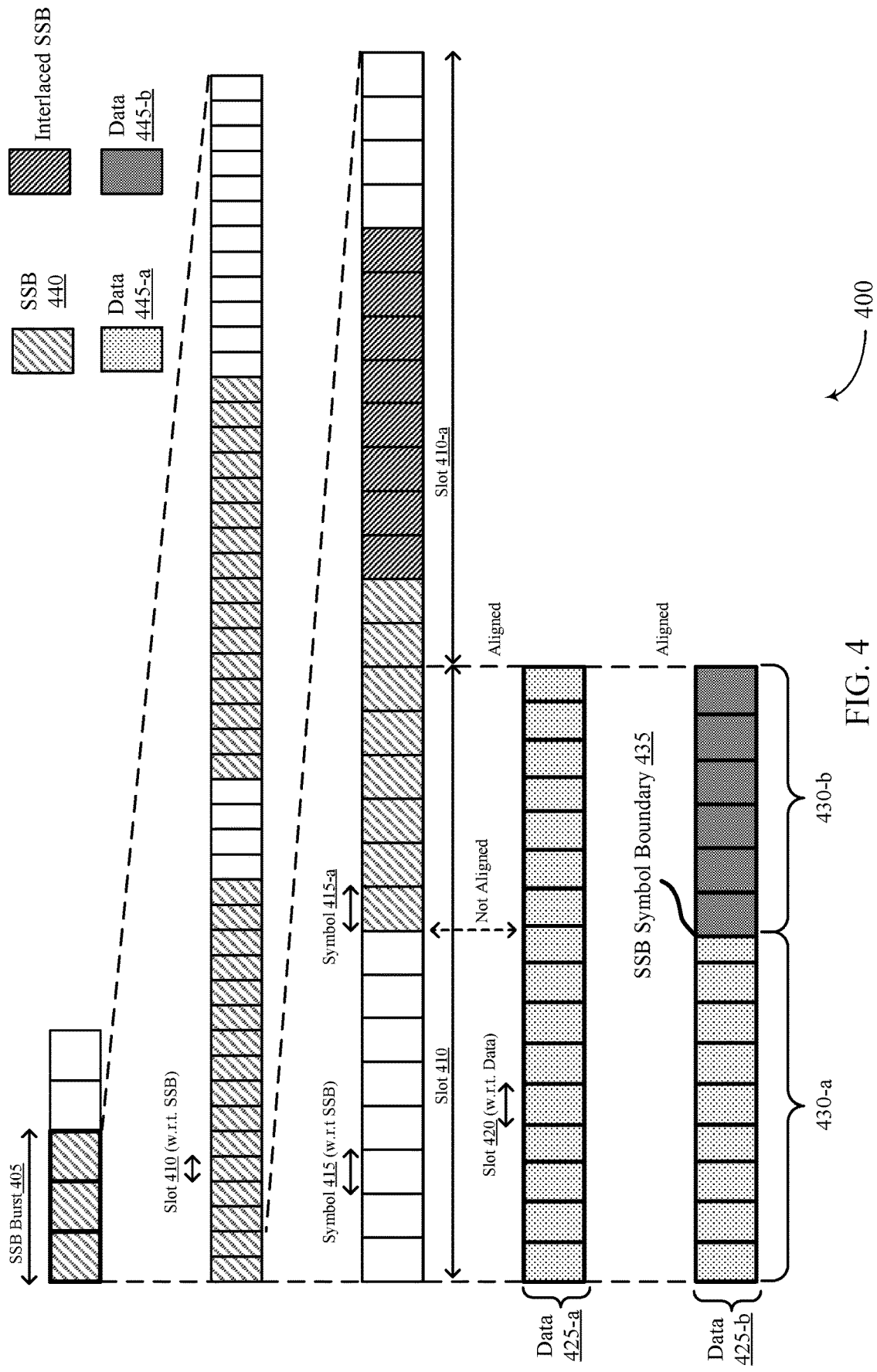
FIG. 4 illustrates an example of a SCS adaptation diagram that supports automatic adaptation of data SCS numerology based on SSB transmission in accordance with various aspects of the present disclosure.

FIG. 4 illustrates an example of a SCS adaptation diagram that supports automatic adaptation of data SCS numerology based on SSB transmission in accordance with various aspects of the present disclosure. In some examples, SCS adaptation diagram 400 may be implemented to realize aspects of wireless communications system 100 or wireless communications system 200. SCS adaptation diagram 400 may illustrate SSB symbol level switching for adaptation of SCS for data. For example, an SSB burst 405 may include several SSB slots 410 (e.g., slots including at least some SSBs 440). Further, each SSB slot 410 (e.g., a slot with respect to SSB) may include several symbols 415 (e.g., 14 symbols 415).

In the example of FIG. 4, an SSB burst 405 may include SSB 440 that begins on symbol 415-*a*. As such, an SSB symbol boundary 435, associated with the beginning or the starting boundary of symbol 415-*a*, may be used as a switching point for adaptation of SCS for data 445. That is, a first SCS (e.g., a default SCS for data) may be used for data 445-*a* for duration 430-*a* up until SSB symbol boundary 435, at which point the SCS for data 445 may be adapted, reconfigured, switched, etc. to a second SCS (e.g., a SCS associated with SSB 440) for a duration 430-*b*.

In some cases, symbol-level switching may be based on data transmission 425 and the SSB burst 405 having different time-domain structures. For example, in some cases, data transmission 425 may be transmitted or received using a SCS of a first frequency (e.g., 3.84 MHz) while SSB 440 may be transmitted/received using a SCS of a second frequency (240 kHz). In such cases, a data slot 420 may be a fraction of a SSB slot 410 (e.g., a data slot 420 may be 1/16 the duration of a SSB slot 410).

In some cases, due to their differing time-domain structures, a SSB symbol boundary 435 of a symbol 415 of SSB burst 405 may not align with a beginning or a starting boundary of a data slot 420. In such cases, the SSB burst 405 may begin in symbol 415-*a*, which may not be aligned (e.g., in the time-domain) with a boundary of a data slot 420. To support concurrent transmission of the SSB 440 and data 445, the SCS of data 445 may adapt the SCS of the SSB 440 within a data slot 420. For example, data 445-*a* (e.g., data 445 transmitted with the default data SCS for duration 430-*a*), may adapt to data 445-*b* (e.g., data 445 transmitted with the SCS of the SSB 440 for duration 430-*b*) at the SSB symbol boundary 435 according to SSB 440 numerology.

As an example illustration, data transmission 425-*a* may be an example data transmission that may not adapt the SCS of the SSB 440 (e.g., data transmission 425-*a* uses the default data SCS), while data transmission 425-*b* may be an example data transmission that may adapt the SCS of the SSB 440 at the switching point (e.g., at SSB symbol boundary 435).

As described with reference to FIG. 3, the occasion for the SSB burst 405 may be identified and the SCS of data 445 may adapt to the SCS of the SSB 440 during the SSB burst 405. In some cases, data 445 may adapt the SCS of the SSB 440 within an active BWP, such as active BWP 320-*b* (as shown in FIG. 3). Thus, in such cases, the SCS of data 445 may switch to the SCS of the SSB 440 at the SSB symbol boundary 435. In some cases, SCS switching within an active BWP may be based on the capability of the active BWP to support at least two numerologies, where each numerology is associated with a SCS. For example, the first numerology may be associated with the default SCS of data and the second numerology may be associated with the SCS of the SSB. In other cases, data 445 may adapt the SCS of the SSB 440 by switching active BWPs, such as switching from default BWP 320-*c* to BWP 320-*d* (as shown in FIG. 3). For example, in such cases, the SCS of data 445 may switch to the SCS of the SSB 440 at the SSB symbol boundary 435 based on switching active BWPs at that point.

Figure 5:
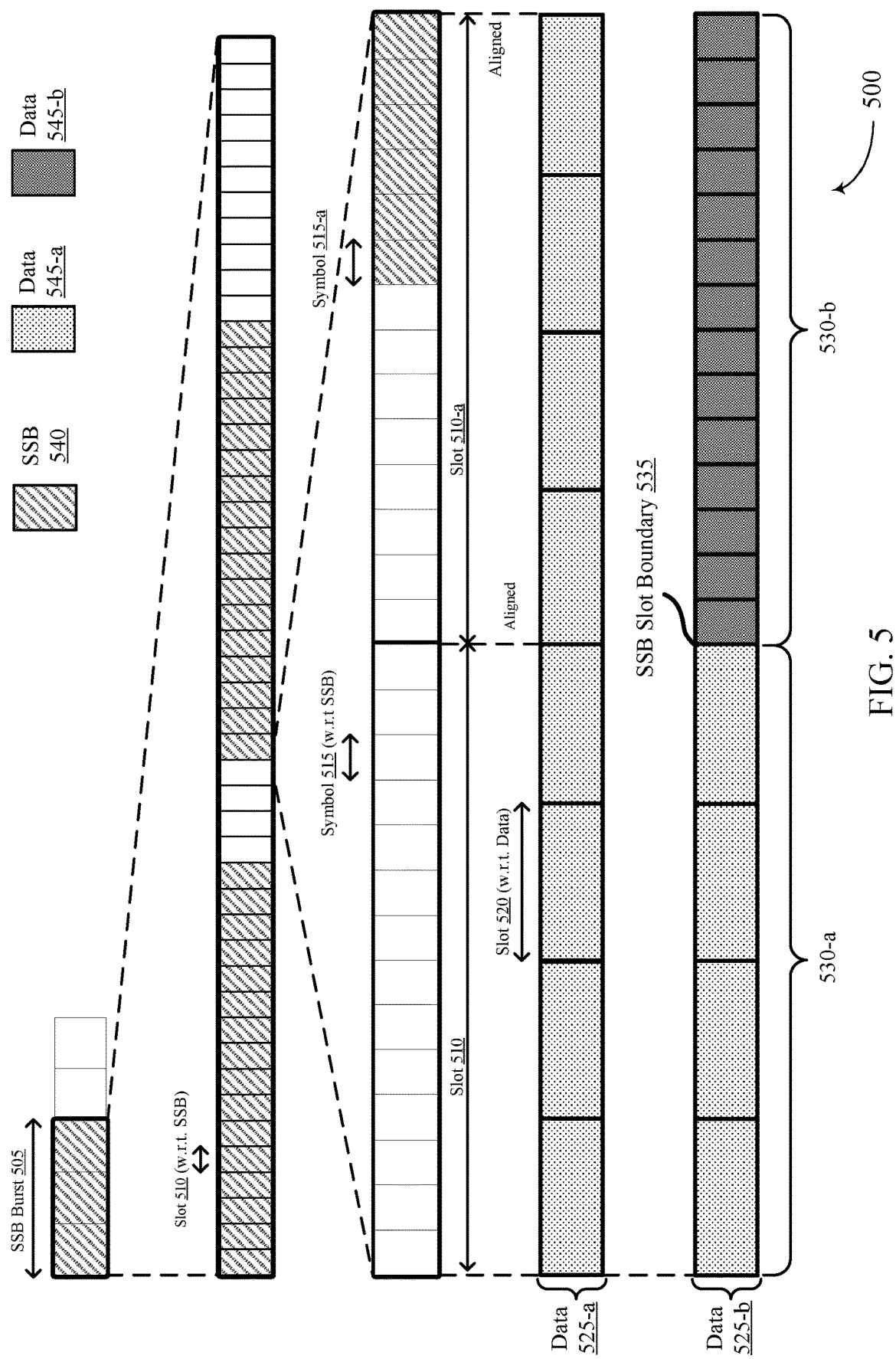
FIG. 5 illustrates an example of a SCS adaptation diagram that supports automatic adaptation of data SCS numerology based on SSB transmission in accordance with various aspects of the present disclosure.

FIG. 5 illustrates an example of a SCS adaptation diagram that supports automatic adaptation of data SCS numerology based on SSB transmission in accordance with various aspects of the present disclosure. In some examples, SCS adaptation diagram 500 may be implemented to realize aspects of wireless communications system 100 or wireless communications system 200. SCS adaptation diagram 500 may illustrate SSB symbol-level switching for adaptation of SCS for data. For example, an SSB burst 505 may include several SSB slots 510 (e.g., slots including at least one SSB 540). Further, each SSB slot 510 (e.g., a slot with respect to the numerology of the SSB 540) may include several SSB symbols 515 (e.g., 14 SSB symbols 515). In some cases, a number of SSB symbols 515 may include the SSB 540 that may be interlaced (e.g., as opposed to being continuous).

In the example of FIG. 5, an SSB burst 505 may begin in SSB slot 510-*a* (e.g., and in SSB symbol 515-*a* of SSB slot 510-*a*). As such, an SSB slot boundary 535, associated with the beginning or the starting boundary of SSB slot 510-*a*, may be used as a switching point for adaptation of SCS for data 530. That is, a first SCS (e.g., a default SCS for data) may be used for data 530-*a* up until SSB slot boundary 535, at which point the SCS for data 530-*b* may be adapted, reconfigured, switched, etc. to a second SCS (e.g., a SCS associated with the SSB 540).

In some cases, slot-boundary switching may be based on data transmission 525 and the SSB burst 505 having different time-domain structures. For example, in some cases, data transmission 525 may be transmitted or received using a SCS of a first frequency (e.g., 960 kHz) while the SSB 540 may be transmitted or received using a SCS of a second frequency (240 kHz). In such cases, a data slot 520 may be a fraction of a SSB slot 510.

In some cases, due to their differing time-domain structures, a SSB slot 510 may occasionally align with a data slot 520. In such cases, the SCS of data 530 may adapt to the SCS of the SSB 540 at the aligned slot boundary (e.g., SSB slot boundary 535). For example, as opposed to switching at the first symbol including the SSB 540, the SCS of data 530 may switch to the SCS of the SSB 540 at a beginning or boundary of the first slot including symbols of the SSB 540. Thus, data 530-*a* (e.g., including data 545-*a* transmitted with the default data SCS), may adapt to data 530-*b* (e.g., including data 545-*b* with the SCS of the SSB 540) at the symbol-level of data transmission 425-*b*.

As an example illustration, data transmission 525-*a* may be an example data transmission that may not adapt the SCS of the SSB 540 (e.g., data transmission 425-*a* uses the default data SCS), while data transmission 525-*b* may be an example data transmission that may adapt the SCS of the SSB 540 at the switching point (e.g., at SSB slot boundary 535).

As described with reference to FIG. 3, the occasion for the SSB burst 505 may be identified and the SCS of data 530 may adapt to the SCS of the SSB 540 during the SSB burst 505. In some cases, data 530 may adapt the SCS of the SSB 540 within an active BWP, such as active BWP 320-*b* (as shown in FIG. 3). Thus, in such cases, the SCS of data 530 may switch to the SCS of the SSB 540 at the SSB slot boundary 535. In some cases, SCS switching within an active BWP may be based on the capability of the active BWP to support at least two numerologies, where each numerology is associated with a SCS. For example, a first numerology may be associated with the default SCS of data and a second numerology may be associated with the SCS of the SSB. In other cases, data 445 may adapt the SCS of the SSB 440 by switching active BWPs, such as switching from default BWP 320-*c* to BWP 320-*d* (as shown in FIG. 3). For example, in such cases, the SCS of data 445 may switch to the SCS of the SSB 440 at the SSB symbol boundary 435 based on switching active BWPs at that point.

Figure 6:
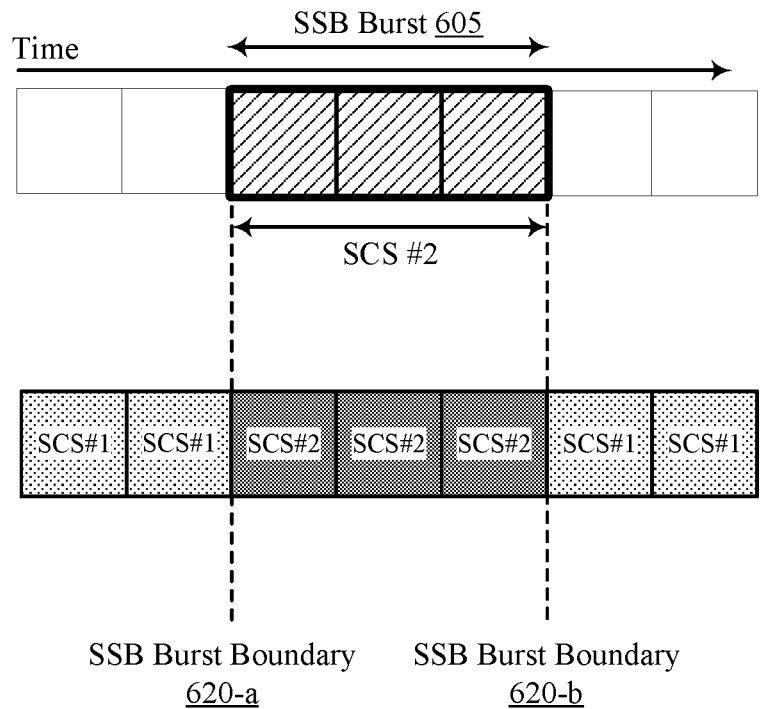
FIG. 6 illustrates an example of a SCS adaptation diagram that supports automatic adaptation of data SCS numerology based on SSB transmission in accordance with various aspects of the present disclosure.

FIG. 6 illustrates an example of a SCS adaptation diagram that supports automatic adaptation of data SCS numerology based on SSB transmission in accordance with various aspects of the present disclosure. In some examples, SCS adaptation diagram 600 may implement aspects of wireless communications system 100 or wireless communications system 200. SCS adaptation diagram 600 may illustrate SSB burst level switching for adaptation of SCS for data. For example, an SSB burst 605 may be associated with a SSB burst boundaries 620 (e.g., SSB burst 605 may be associated with a starting SSB burst boundary 620-*a* and an ending SSB burst boundary 620-*b*), and SCS adaptation for data may be configured according to the SSB burst boundaries 620.

In the example of FIG. 6, an SSB burst 605 be configured for one or more slots. As such, an SSB burst boundary 620 may, in some cases, be associated with the beginning of a first or ending of a final slot associated with SSB burst 605. SSB burst boundaries 620 may be used as a switching point for adaptation of SCS for data 445. That is, a first SCS (e.g., a default SCS #1 for data) may be used for data 615-*a* up until SSB burst boundary 620-*a*, at which point the SCS for data 615 may be adapted, reconfigured, switched, etc. to a second SCS (e.g., a SCS #2 associated with SSB 610) used for data 615-*b*. Similarly, the second SCS (e.g., SCS #2 for SSB 610) may be used for data 615-*b* up until SSB burst boundary 620-*b*, at which point the SCS for data 615 may be adapted, reconfigured, switched, etc. to the first SCS (e.g., SCS #1) used for data 615-*a*. In some examples, SCS #1 may include 960 kHz SCS and SCS #2 may include 240 kHz SCS. As the SCS adaptation or configuration may be performed according to SSB burst boundaries 620, the data slot boundary and the SSB slot boundary may be aligned at the switching points (e.g., at the data SCS configuration points at the SSB burst boundaries 620).

Figure 7A:
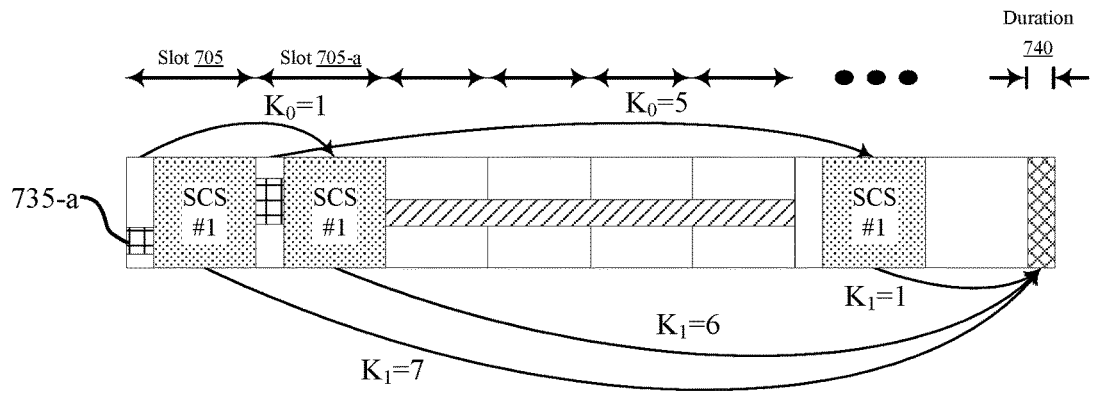
FIGS. 7A, 7B, and 7C illustrate example user equipment (UE) feedback diagrams that support automatic adaptation of data SCS numerology based on SSB transmission in accordance with various aspects of the present disclosure.
Figure 7B:
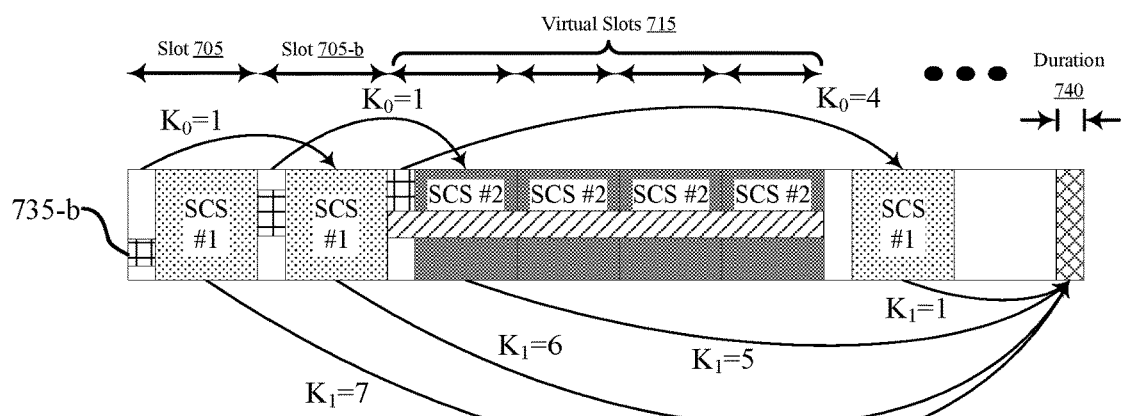
Figure 7C:
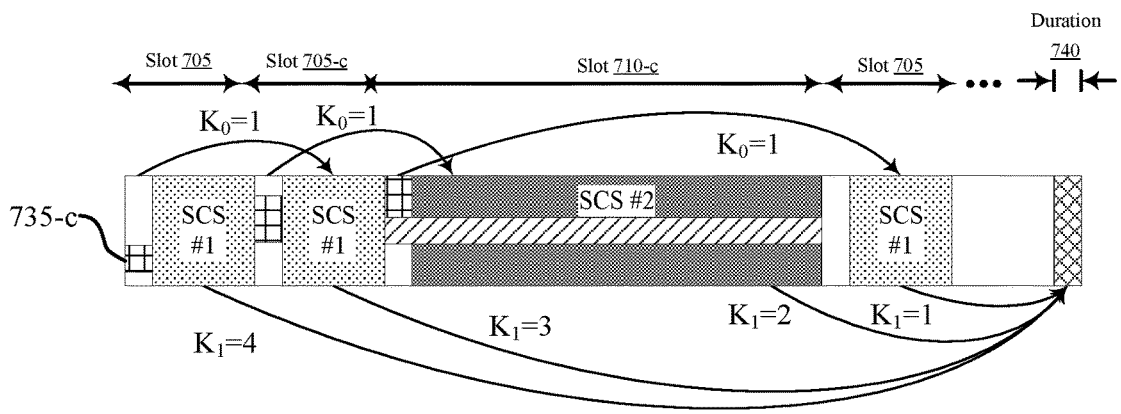

FIGS. 7A, 7B and 7C illustrate example UE feedback diagrams that support automatic adaptation of data SCS numerology based on SSB transmission in accordance with various aspects of the present disclosure. In some examples, UE feedback diagram 700, UE feedback diagram 701, and UE feedback diagram 702 may be implemented to realize aspects of wireless communications system 100 or wireless communications system 200. As described herein, in some cases, the SCS of data 725 may be varied (e.g., dynamically configured) within a BWP.

For example, a BWP may be associated with a data numerology and a SSB numerology, where SCS, symbol duration, and cyclic prefix length used for the BWP is based on the data numerology (e.g., in portions or durations of the BWP without SSB) and the SSB numerology (e.g., in portions or durations of the BWP including the SSB). In such cases, when SSB 720 is transmitted (e.g., within the active BWP) the SCS of the SSB may be used for the SCS of data (e.g., such that the FDM of the SSB and data uses the SCS of the SSB). Otherwise, the default SCS for data may be used where data (e.g., without the SSB) is transmitted (e.g., within the active BWP). UE feedback diagram 700, UE feedback diagram 701, and UE feedback diagram 702 may illustrate examples of how HARQ-ACK feedback may be configured in such cases where SCS of data 725 may be varied (e.g., dynamically configured) within a BWP.

In the example of FIG. 7A, UE feedback diagram 700 may illustrate UE feedback configuration for HARQ-ACK feedback in scenarios where SCS is not adapted within a BWP (e.g., in scenarios where there is no FDM between SSB 720 and data 725). UE feedback diagram 700 further illustrate UE feedback configuration that uses a slot pattern of data slots 705 (e.g., defined with respect to the data SCS (e.g., SCS #1) of data 725-*a*). DCI 735 may include $K_0$ indications for scheduling data 725 (e.g., PDSCH occasions) and $K_1$ indications for scheduling an uplink feedback occasion for the corresponding data 725 (e.g., a duration 740 for ACK/NACK 730 corresponding to data 725). In example UE feedback diagram 700, $K_0/K_1$ indications may be defined according to a slot pattern that includes data slots 705 (e.g., as no data 725 is transmitted with SSB 720). For example, DCI 735-*a* may indicate a $K_0=1$ value scheduling data 725-*a* in a next data slot 705-*a* (e.g., in 1 slot from a data slot 705 associated with DCI 735-*a*) and a $K_1=6$ value scheduling ACK/NACK 730 for the data 725-*a* (e.g., the data scheduled in data slot 705-*a*) in duration 740 (e.g., in 6 slots from scheduled data slot 705-*a*). As illustrated by UE feedback diagram 700, the $K_0/K_1$ indications may be defined according to a slot pattern of data slots 705.

In the example of FIG. 7B, UE feedback diagram 701 may illustrate UE feedback configuration for HARQ-ACK feedback in scenarios where SCS is adapted within a BWP (e.g., in scenarios where there is FDM between SSB 720 and data 725). UE feedback diagram 701 further illustrate UE feedback configuration that uses a slot pattern of data slots 705 (e.g., defined with respect to the data SCS (e.g., SCS #1) of data 725-*a*) and virtual slots 715 (e.g., virtual data slots, defined with respect to the data SCS (e.g., SCS #1) of data 725-*a*). For example, during the SSB transmission, $K_0/K_1$ may be defined in virtual slots 715 (e.g., where the virtual slots 715 may be defined with respect to the SCS of data, SCS #1). The virtual slot 715 duration during the SSB 720 transmission may be the same as the data slot 705 duration outside the SSB 720 transmission (e.g., UE feedback diagram 701 may use a slot pattern similar to UE feedback diagram 700 where there is no FDM of SSB 720 and data 725).

DCI 735 may include $K_0$ indications for scheduling data 725 (e.g., PDSCH occasions) and $K_1$ indications for scheduling an uplink feedback occasion for the corresponding scheduled data 725 (e.g., a duration 740 for ACK/NACK 730 corresponding to a scheduled data 725). In example UE feedback diagram 701, $K_0/K_1$ indications may be defined according to a slot pattern that includes data slots 705 and virtual slots 715. For example, DCI 735-*b* may indicate a $K_0=1$ value scheduling data 725-*a* in a next data slot 705-*b* (e.g., in 1 slot from a data slot 705 associated with DCI 735-*b*) and a $K_1=6$ value scheduling ACK/NACK 730 for the data (e.g., the data scheduled in data slot 705-*b*) in duration 740 (e.g., in 6 slots from scheduled data slot 705-*b*). As illustrated by UE feedback diagram 701, the $K_0/K_1$ indications may be defined according to a slot pattern of data slots 705 and virtual slots 715.

In the example of FIG. 7C, UE feedback diagram 702 may illustrate UE feedback configuration for HARQ-ACK feedback in scenarios where SCS is adapted within a BWP (e.g., in scenarios where there is FDM between SSB 720 and data 725). UE feedback diagram 702 further illustrate UE feedback configuration that uses a slot pattern of data slots 705 (e.g., defined with respect to the data SCS (e.g., SCS #1) of data 725-*a*) and SSB slots 710 (e.g., defined with respect to the SSB SCS (e.g., SCS #2) of SSB 720 and data 725-*b*). For example, during SSB 720 transmission, $K_0/K_1$ may be defined in actual slots (e.g., in a data slot 705 or SSB slot 710, depending on whether or not SSB is being transmitted in the slot). The slot duration during the SSB 720 transmission (e.g., SSB slot 710) may be different from the slot duration outside the SSB 720 transmission (e.g., data slots 705). When the SCS of SSB 720 is M and the SCS of data 725 is N, the actual slot duration during the SSB may become $$\text{Actual slot 715 duration} = \frac{N}{M} * \{\text{slot duration } w.r.t \text{ SCS of data}\}$$

For example, if the SCS of SSB 720 is 480 kHz and the SCS of data 725 is 1.92 MHz, then:

$$\text{Actual slot 715 duration} = 4 * \{\text{slot duration of the SCS of data}\}$$

DCI 735 may include $K_0$ indications for scheduling data 725 (e.g., PDSCH occasions) and $K_1$ indications for scheduling an uplink feedback occasion for the corresponding scheduled data 725 (e.g., a duration 740 for ACK/NACK 730 corresponding to a scheduled data 725). In example UE feedback diagram 702, $K_0/K_1$ indications may be defined according to a slot pattern that includes data slots 705 and SSB slots 710. For example, DCI 735-*c* may indicate a $K_0=1$ value scheduling data 725-*a* in a next data slot 705-*c* (e.g., in 1 slot from a data slot 705 associated with DCI 735-*c*) and a $K_1=3$ value scheduling ACK/NACK 730 for the data (e.g., the data scheduled in data slot 705-*c*) in duration 740 (e.g., in 3 slots from scheduled data slot 705-*c*). As illustrated by UE feedback diagram 702, the $K_0/K_1$ indications may be defined according to a slot pattern of data slots 705 and SSB slots 710.

Figure 8:
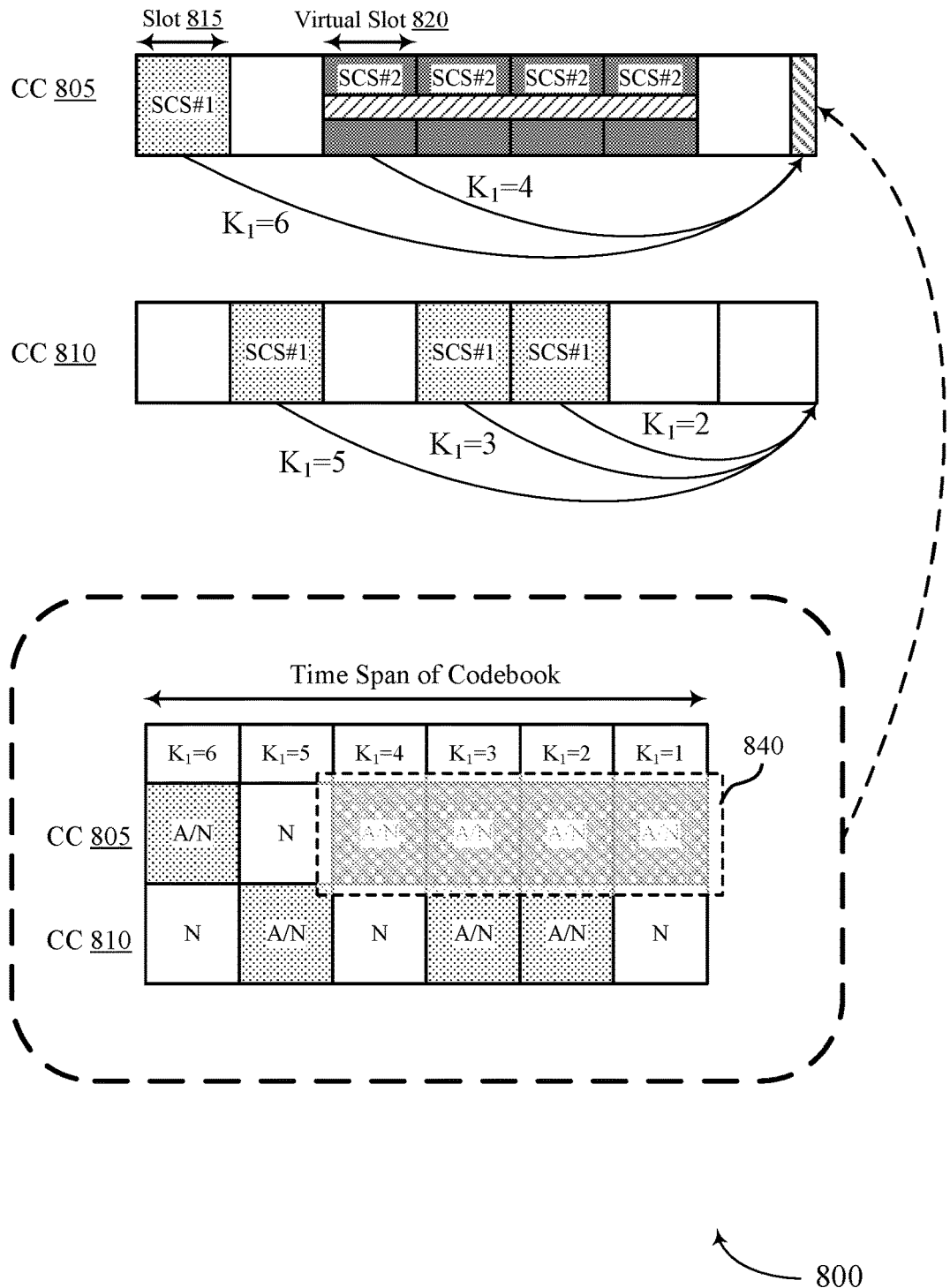
FIG. 8 illustrates an example of a UE feedback diagram that supports automatic adaptation of data SCS numerology based on SSB transmission in accordance with various aspects of the present disclosure.

FIG. 8 illustrates an example of a UE feedback diagram that supports automatic adaptation of data SCS numerology based on SSB transmission in accordance with various aspects of the present disclosure. In some examples, UE feedback diagram 800 may be implemented to realize aspects of wireless communications system 100 or wireless communications system 200. UE feedback diagram 800 may illustrate UE feedback generation (e.g., HARQ-ACK codebook design) based on a virtual slot pattern defined with respect to the default SCS of data in the BWP. For example, a codebook may be designed for a first CC (e.g., CC 805) and a second CC (e.g., CC 810). CC 805 may be associated with two configured indications of ACK/NACK 835. For example, CC 805 may be associated with a first indication of ACK/NACK 835 for data 830-*a* that is transmitted over slot 815 (e.g., without SSB 825) and a second indication of ACK/NACK 835 for data 830-*b* that is transmitted over virtual slots 820 (e.g., with SSB 825). In some examples, the slot 815 and the virtual slots 820 may both be defined according to the SCS of data 830-*a* (e.g., a default SCS for data).

CC 810 (e.g., where the location of SSB 825 is different than or outside of CC 810) may be associated with three configured indications of ACK/NACK 835. For example, the CC 810 may include three slots 815 including data 830-*a* and an absence of SSB 825, and the three indications of ACK/NACK 835 may be associated with the three slots 815 including data 830-*a*. As such, the slots 815 may be defined according to the SCS of data 830-*a* (e.g., a default SCS for data). As illustrated by UE feedback diagram 800, the information bits of the codebook highlighted by region 840 may correspond to the FDM of SSB 825 and data 830-*b*. In some cases, all bits, except the bit associated with $K_1=4$, may be set to NACK. In other cases, the ACK or NACK at $K_1=4$ may be repeated within region 840 (e.g., which may increase feedback reliability).

Figure 9:
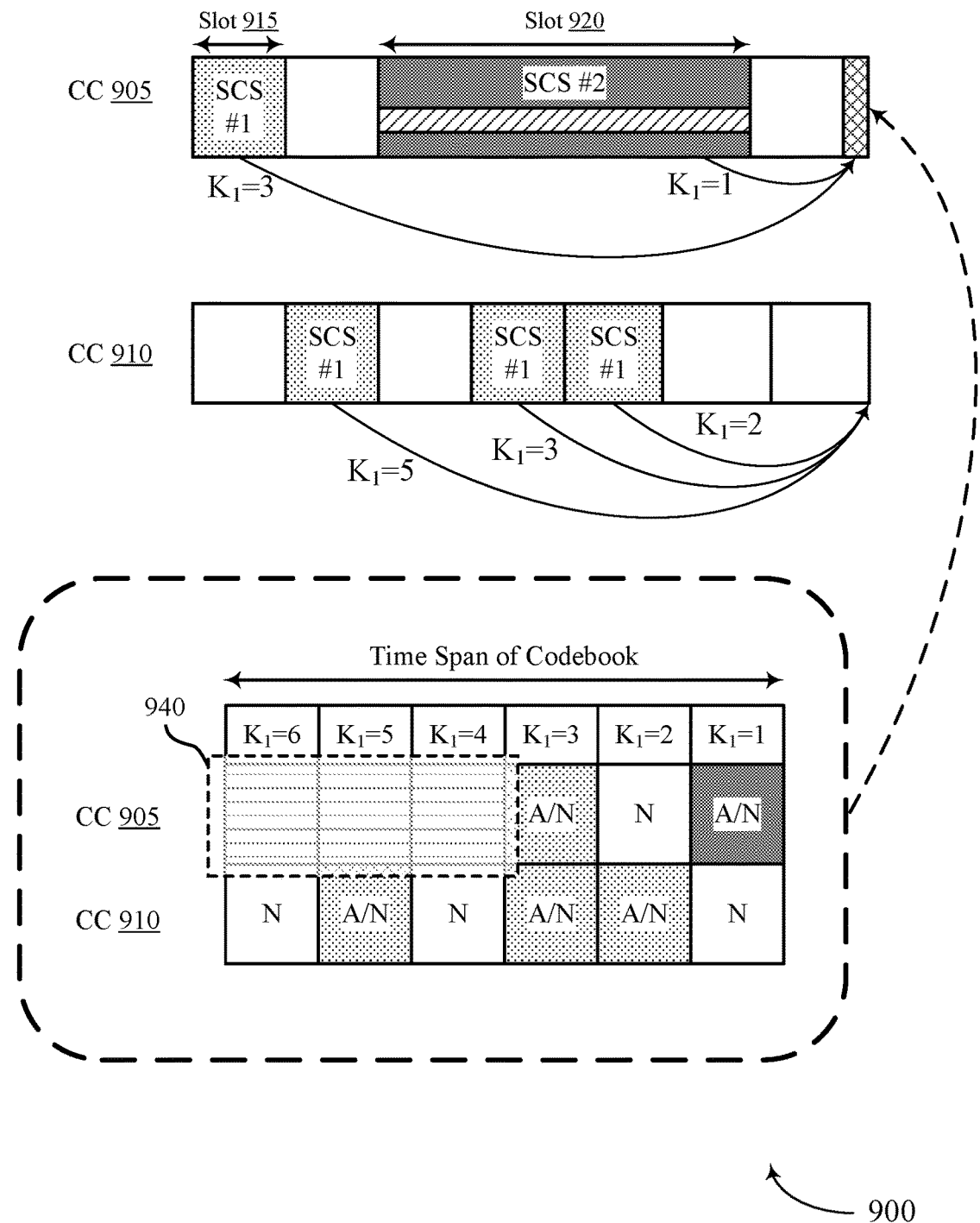
FIG. 9 illustrates an example of a UE feedback diagram that supports automatic adaptation of data SCS numerology based on SSB transmission in accordance with various aspects of the present disclosure.

FIG. 9 illustrates an example of a UE feedback diagram that supports automatic adaptation of data SCS numerology based on SSB transmission in accordance with various aspects of the present disclosure. In some examples, UE feedback diagram 900 may be implemented to realize aspects of wireless communications system 100 or wireless communications system 200. UE feedback diagram 800 may illustrate UE feedback generation (e.g., HARQ-ACK codebook design) based on slot during SSB 925 transmission (e.g., defined with respect to the SCS of SSB 925). For example, a codebook may be designed for a first CC (e.g., CC 905) and a second CC (e.g., CC 910). CC 905 may be associated with two configured indications of ACK/NACK 935. For example, CC 905 may be associated with a first indication of ACK/NACK 935 for data 930-a that is transmitted over slot 915 (e.g., without SSB 925) and a second indication of ACK/NACK 935 for data 930-b that is transmitted over slot 920 (e.g., with SSB 925). In some examples, slot 915 may be defined according to the SCS of data 930-a (e.g., a default SCS for data) and the slot 920 may be defined according to the SCS of SSB 925.

CC 910 (e.g., where the location of SSB 925 is different than or outside of CC 910) may be associated with three configured indications of ACK/NACK 935. For example, the CC 910 may include three slots 915 including data 930-a and an absence of SSB 925, and the three indications of ACK/NACK 935 may be associated with the three slots 915 including data 930-a. As such, slots 915 may be defined according to the SCS of data 930-a (e.g., a default SCS for data). As illustrated by UE feedback diagram 900, the information bits of the codebook highlighted by region 940 may correspond to the FDM of SSB 925 and data 930-b. As there is no ambiguity in this region 940 between the UE and the base station, the UE may omit region 940 in the codebook (e.g., the UE may feedback 9 bits instead of 12 bits, by omitting the 3 bits of region 940 from the codebook). When SSB 925 is transmitted in a CC within the time span of the codebook, the bits in the superfluous region (e.g., in region 940) may not be feedbacked (e.g., which may reduce feedback overhead).

Figure 10A:
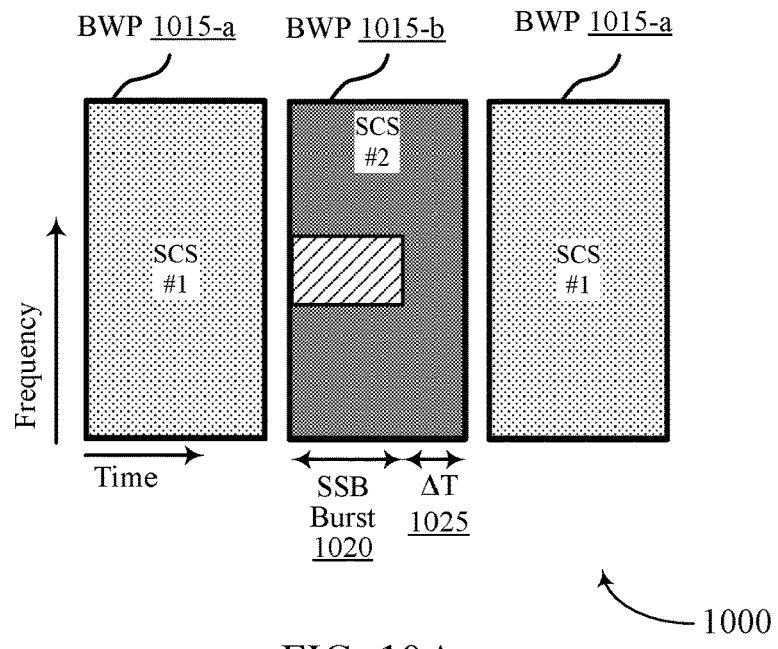
FIGS. 10A and 10B illustrate example bandwidth part (BWP) configurations that support automatic adaptation of data SCS numerology based on SSB transmission in accordance with various aspects of the present disclosure.
Figure 10B:
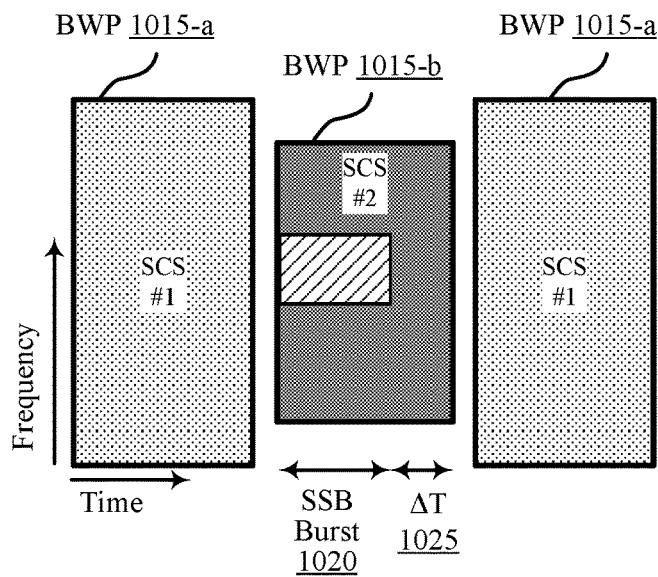

FIGS. 10A and 10B illustrate example BWP configurations that support automatic adaptation of data SCS numerology based on SSB transmission in accordance with various aspects of the present disclosure. In some examples, BWP configuration 1000 and BWP configuration 1001 may be implemented to realize aspects of wireless communications system 100 or wireless communications system 200. As discussed herein, in some cases, BWPs 1015 may be switched automatically, (e.g., without DCI indication) inside and outside the SSB burst (e.g., SSB 1005). For example, wireless communications systems may employ separate BWPs 1015 for data and for FDM of SSB and data, where a BWP 1015-b (e.g., a first BWP) may be associated with a SSB numerology (e.g., a SSB SCS) and a BWP 1015-a (e.g., a second BWP) may be associated with a data numerology (e.g., a data SCS).

In the example of FIG. 10A, BWP configuration 1000 may illustrate configuration of a time delay prior to switching from BWP 1015-b (e.g., an active BWP for FDM of SSB and data) to a BWP 1015-a (e.g., an active BWP for data). That is, BWP configuration 1000 may implement a time delay (ΔT) 1025 following a SSB burst 1020 prior to switching from a SSB SCS (e.g., SCS #2) to a data SCS (e.g., SCS #1).

For example, a BWP 1015-a (e.g., an active BWP) may support communication of data 1010-a (e.g., first data information) using a data SCS (e.g., SCS #1). When SSB 1005 is configured (e.g., when a SSB burst 1020 is configured, when a SSB occasion is configured, etc.), BWP 1015-b may be activated (e.g., automatically based on the SSB 1005, without DCI indication). BWP 1015-b (e.g., an active BWP) may then support communication of SSB 1005 and data 1010-b via FDM, where both SSB 1005 and data 1010-b use a same SSB SCS (e.g., SCS #2). However, in some cases, after the SSB burst 1020 (e.g., after the SSB 1005), a time delay 1025 may be employed prior to transitioning back to BWP 1015-a for communication of data 1010-a using SCS #1. In such cases, data information communicated during the time delay 1025 may still be configured with the SSB SCS (SCS #2).

That is, the switching-back point from the BWP 1015-b (the BWP including the SSB 1005) to the BWP 1015-a (e.g., the default BWP) may occur a time delay 1025 (ΔT) after SSB 1005 transmission is finished. As such, a base station may clear up all the HARQ A/N (e.g., a base station may process HARQ-ACK codebooks generated in accordance with the techniques described herein, for example, with reference to FIGS. 7 through 9) after the SSB burst 1020 and during the time delay 1025. The time delay 1025 may provide for extra time for a base station 105 to deal with A/Ns before switching to the BWP 1015-a (e.g., the default BWP) For example, time delay 1025 may provide enough time (e.g., when there is only downlink during SSB transmission and the A/N cannot be reported during SSB transmission). As such, in cases where BWPs are switched for FDM of SSB and data, UEs and base stations may determine a time delay 1025 after the SSB 1005 (e.g., after the SSB burst 1020) and may configure data SCS #1 (e.g., activate BWP 1015-a) after the time delay 1025. In some cases, the time delay 1025 may be determined based on a processing time associated with HARQ-ACK feedback (e.g., based on a base station's processing time for HARQ-ACK feedback transmitted by a UE). For example, in some cases, a base station may decide the switching point depending on the HARQ process (e.g., the extent or number of HARQ process) in the BWP 1015-b including SSB 1005. In some cases, the time delay 1025 may be preconfigured by a wireless communications system, or may be indicated to a UE by the base station (e.g., via DCI).

In the example of FIG. 10B, BWP configuration 1001 may illustrate configuration of BWP 1015-b (e.g., an active BWP during SSB 1005 transmission). In the example of FIG. 10B, BWP 1015-b may be configured over a smaller bandwidth compared to BWP 1015-a (e.g., as the SCS for both SSB and data may be scaled less for BWP 1015-b compared to the SCS of data outside the BWP 1015-b). In general, bandwidth of the SSB BWP may be configured as the same bandwidth of the default BWP or may be configured with a different bandwidth than the default BWP. In some examples, the configuration of the BWP 1015-b may be indicated (e.g., by a base station to a UE) semi-statically (e.g., via RRC or MAC-CE). The configuration of the BWP 1015-b may include a time delay 1025 value for the BWP 1015-b, a bandwidth for the BWP 1015-b, a SCS for the BWP 1015-b, a symbol duration for the BWP 1015-b, a cyclic prefix length for the BWP 1015-b, or any other configuration parameter for the BWP 1015-b.

Figure 11:
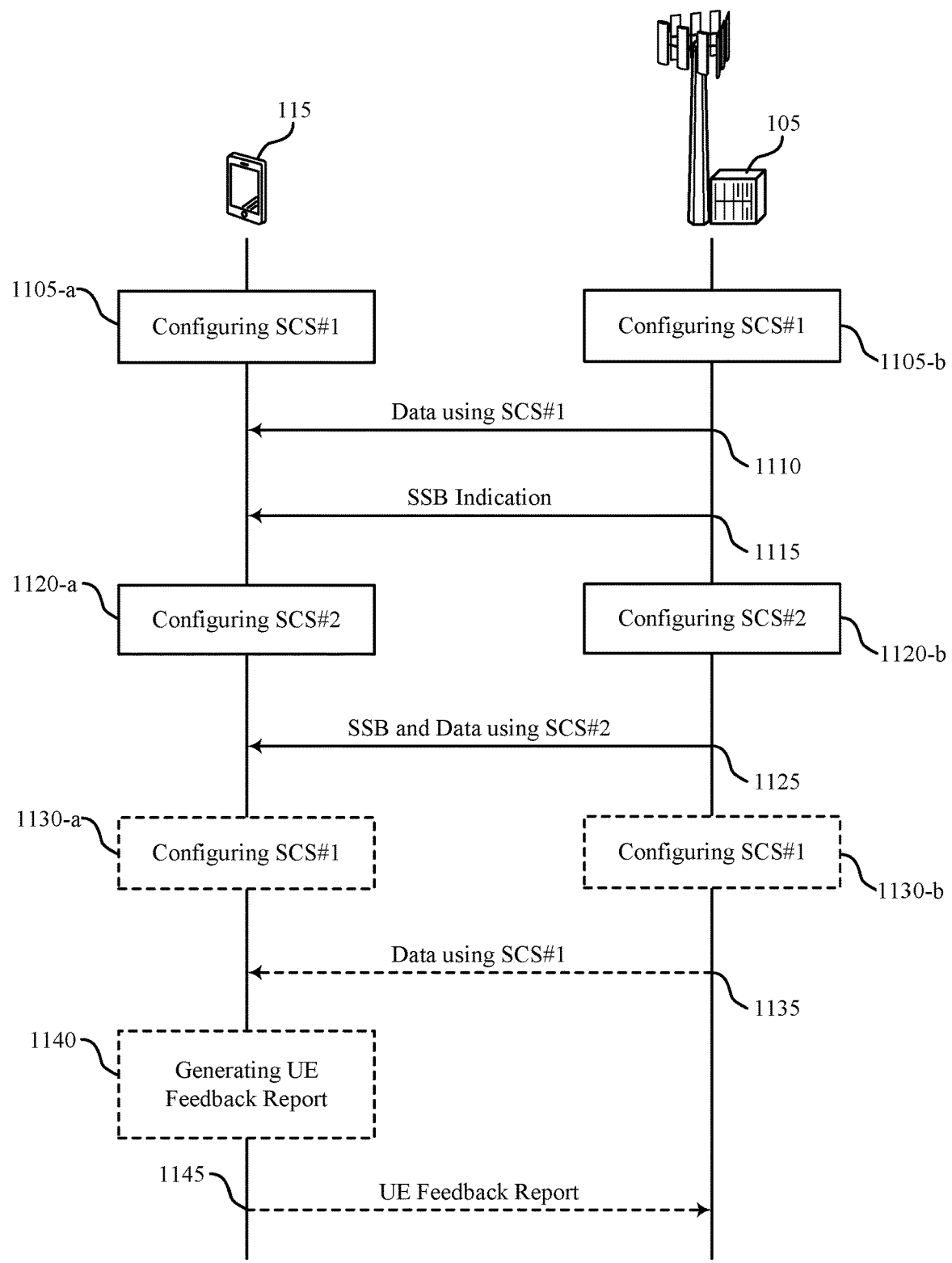
FIG. 11 illustrates an example of a process flow that supports automatic adaptation of data SCS numerology based on SSB transmission in accordance with various aspects of the present disclosure.

FIG. 11 illustrates an example of a process flow that supports automatic adaptation of data SCS numerology based on SSB transmission in accordance with various aspects of the present disclosure. In some examples, process flow 1100 may implement aspects of wireless communications system 100 or wireless communications system 200. The process flow 1100 includes a base station 105, which may be an example of base stations 105 as shown in and described with reference to FIGS. 1 and 2, and UE 115, which may be an example of UEs 115 as shown in and described with reference to FIGS. 1 and 2. The process flow 1100 includes functions and communications implemented by base station 105 and UE 115 in the context of automatic adaptation of data SCS numerology based on SSB transmission (e.g., for FDM of SSB and data using a SSB SCS).

In the following description of the process flow 1100, the operations between base station 105 and UE 115 may be transmitted in a different order than the order shown, or the operations may be performed in different orders or at different times. Some operations may also be left out of the process flow 1100, or other operations may be added to the process flow 1100. It is to be understood that while base station 105 and UE 115 are shown performing a number of the operations of process flow 1100, any wireless device may perform the operations shown.

At 1105-*a* and 1105-*b*, UE 115 and base station 105 may configure a first SCS (e.g., SCS #1), respectively. For example, at 1105-*a*, UE 115 may configure a modem, radio frequency (RF) circuitry, etc. for receiving transmissions (e.g., data at 1110) using the first SCS. In some examples, configuring the modem, RF circuitry, etc. for receiving transmissions using some SCS may refer to tuning RF circuitry in the frequency domain in order to receive communications transmitted according to a SCS, determining one or more temporal periods to decode communications transmitted according to the SCS, etc., such that communications may be received according to the configured SCS (e.g., according to the configured modem, RF circuitry, etc.).

At 1110, base station 105 may transmit first data information using a first SCS to UE 115.

At 1115, base station 105 may transmit downlink signaling including an indication of a SSB in a first BWP to UE 115. In some cases, the indication of the SSB in the first BWP may be transmitted via RRC signaling. In some cases, the downlink signaling may refer to DCI on a PDCCH (e.g., DCI may include the indication of the SSB in the first BWP).

At 1120-*a* and 1120-*b*, UE 115 and base station 105 may configure a second SCS (e.g., SCS #2), respectively. For example, at 1120-*a*, UE 115 may determine the second SCS based on the indication received at 1115. The indication of the SSB in the first BWP may be received at any time. For example, the indication of SSB may be conveyed semi-statically (e.g., via RRC signaling) where the indication of the SSB may refer to configured SSB occasions, the indication of SSB may be conveyed dynamically (e.g., via DCI) where the indication of the SSB may refer to an updated configuration for at least one SSB occasion, etc. As such, 1120-*a* and 1120-*b* may be performed prior to any identified SSB transmission. Further, in some cases, the SSB indication at 1115 may be received by UE 115 at any time (e.g., prior to 1105).

As discussed herein, the configuration at 1120 (e.g., at 1120-*a* or 1120-*b*) may occur at an identified symbol boundary associated with the SSB (e.g., at a SSB symbol boundary), at an identified slot boundary associated with the SSB (e.g., where the slot boundary may be identified based on the second SCS), at an identified SSB block burst boundary, etc. The switching boundary for when to configure the second SCS (e.g., the SSB SCS) is described in further detail herein (e.g., including at least at FIGS. 4 through 6).

At 1125, base station 105 may contemporaneously transmit the SSB and second data information using the second SCS, and UE 115 may contemporaneously receive the SSB and second data information using the second SCS. That is, according to some implementations of the present disclosure, UE 115 and base station 105 may adapt or dynamically configure SCS for data at 1110 and 1125. For example, UE 115 may receive first data information transmitted by base station 105 using a first SCS at 1110. The UE 115 may receive DCI, on a PDCCH, that includes an indication of a synchronization signal (e.g., a SSB) in a first BWP at 1115, and the UE 115 may determine a second SCS (e.g., a SCS of the SSB) based on the indication. As such, the UE 115 may contemporaneously receive the synchronization signal and second data information transmitted using the determined second SCS at 1125.

In some examples, the SCS of data may be varied (e.g., dynamically configured) within a BWP (e.g., within the first BWP). For example, the first BWP may be associated with both a data numerology and a SSB numerology, where SCS, symbol duration, and cyclic prefix length used for the BWP is based on the data numerology (e.g., in portions or durations of the BWP without SSB, such as for receiving the first data information at 1110) and the SSB numerology (e.g., in portions or durations of the BWP including the SSB, such as for receiving the SSB and the second data information at 1125).

In some other examples, BWPs may be switched automatically (e.g., without DCI indication) inside and outside the SSB burst. For example, process flow 1100 may employ separate BWPs for data at 1110 and for FDM of SSB and data at 1125. In such examples, a second BWP (e.g., active at 1110) may be associated with a data numerology (e.g., where a data SCS, a data symbol duration, and a data cyclic prefix length used for the BWP is based on the data numerology) and the first BWP (e.g., active at 1125) may be associated with a SSB numerology (e.g., where a SSB SCS, a SSB symbol duration, and a SSB cyclic prefix length used for the BWP is based on the SSB numerology). As such, the second BWP may be used for receiving the first data information at 1110 and the first BWP may be used for receiving the SSB and the second data information at 1125.

In some examples, at 1130-*a* and 1130-*b*, UE 115 and base station 105 may configure a first SCS (e.g., SCS #1), respectively. At 1135, base station 105 may transmit data using SCS #1.

In some examples, at 1140, UE 115 may generate a UE feedback report (e.g., a downlink feedback report) report for the first data information and the second data information. For example, at 1140, UE 115 may determine a first location ($K_0$) corresponding to the second data information based on the received DCI and determine a second location ($K_1$) corresponding to an uplink feedback occasion associated with the second data information (e.g., where the uplink feedback report is generated based on the first SCS, or the second SCS, or both). In some cases, the first location and the second location are determined based on a slot pattern (e.g., a virtual slot pattern) defined according to the first SCS. In some cases, the first location and the second location are determined based on a slot pattern defined according to the determined second SCS (e.g., where slots configured according to the second SCS may be skipped in the slot pattern). In some cases, the uplink feedback report may include a HARQ-ACK codebook.

At 1145, UE 115 may transmit the UE feedback report (e.g., generated at 1140) to base station 105. Additional details relating to the aspects of the described techniques shown in 1140 and 1145 may be found throughout the specification, including at least at FIGS. 7-9.

Figure 12:
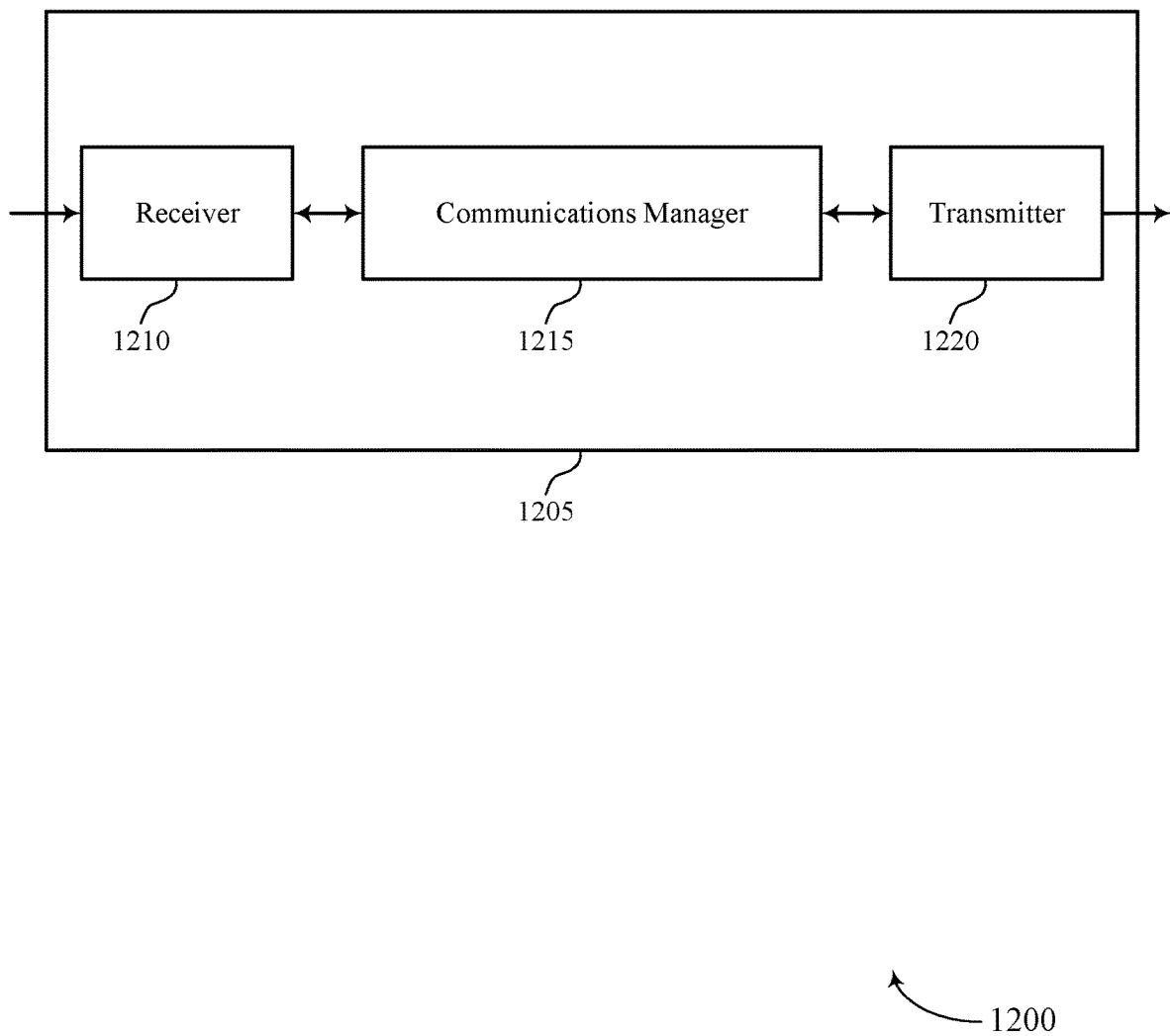
FIG. 12 shows a block diagram of a device that supports automatic adaptation of data SCS numerology based on SSB transmission in accordance with various aspects of the present disclosure.

FIG. 12 shows a block diagram of a device that supports automatic adaptation of data SCS numerology based on SSB transmission in accordance with various aspects of the present disclosure. Bock diagram 1200 of a device 1205 may be an example of a device that supports automatic adaptation of data SCS numerology based on SSB transmission. The device 1205 may be an example of aspects of a UE 115 as described herein. The device 1205 may include a receiver 1210, a communications manager 1215, and a transmitter 1220. The device 1205 may also include a processor. Each of these components may be in communication with one another (e.g., via one or more buses).

Figure 15:
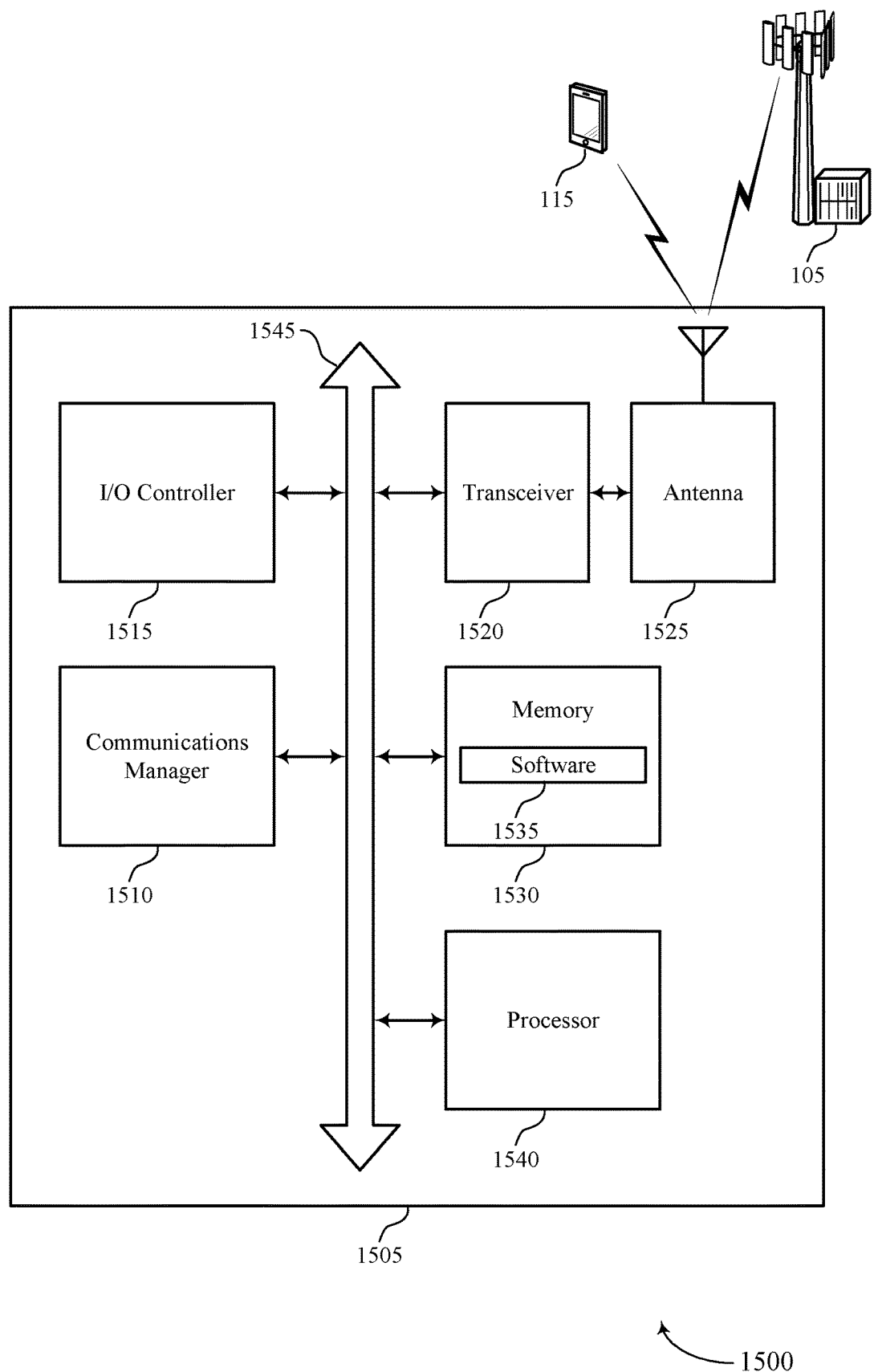
FIG. 15 shows a diagram of a system including a device that supports automatic adaptation of data SCS numerology based on SSB transmission in accordance with various aspects of the present disclosure.

The receiver 1210 may receive information such as packets, user data, or control information associated with various information channels (e.g., control channels, data channels, and information related to automatic adaptation of data SCS numerology based on SSB transmission, etc.). Information may be passed on to other components of the device 1205. The receiver 1210 may be an example of aspects of the transceiver 1520 (as shown in FIG. 15). The receiver 1210 may utilize a single antenna or a set of antennas.

The communications manager 1215 may receive first data information transmitted using a first SCS, determine a second SCS based on the indication, receive downlink signaling including an indication of a synchronization signal in a first BWP, and contemporaneously receive the synchronization signal and second data information transmitted using the determined second SCS. The communications manager 1215 may be an example of aspects of the communications manager 1510 described herein.

The communications manager 1215, or its sub-components, may be implemented in hardware, code (e.g., software or firmware) executed by a processor, or any combination thereof. If implemented in code executed by a processor, the functions of the communications manager 1215, or its sub-components may be executed by a general-purpose processor, a digital signal processor (DSP), an application-specific integrated circuit (ASIC), a field-programmable gate array (FPGA) or other programmable logic device, discrete gate or transistor logic, discrete hardware components, or any combination thereof designed to perform the functions described in the present disclosure.

The communications manager 1215, or its sub-components, may be physically located at various positions, including being distributed such that portions of functions are implemented at different physical locations by one or more physical components. In some examples, the communications manager 1215, or its sub-components, may be a separate and distinct component in accordance with various aspects of the present disclosure. In some examples, the communications manager 1215, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 1220 may transmit signals generated by other components of the device 1205. In some examples, the transmitter 1220 may be collocated with a receiver 1210 in a transceiver component. For example, the transmitter 1220 may be an example of aspects of the transceiver 1520 (as shown in FIG. 15). The transmitter 1220 may utilize a single antenna or a set of antennas.

Figure 13:
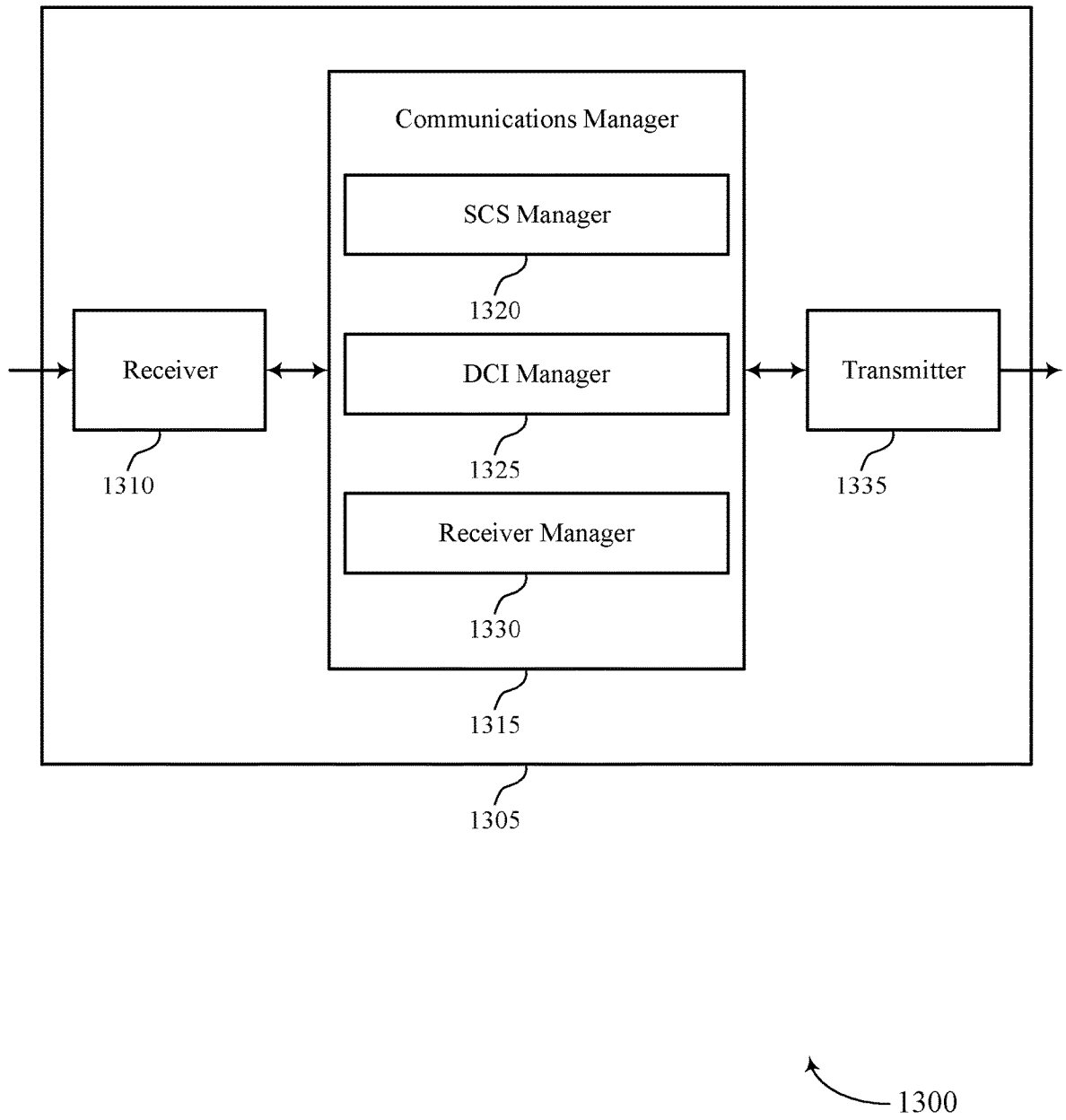
FIG. 13 shows a block diagram of a device that supports automatic adaptation of data SCS numerology based on SSB transmission in accordance with various aspects of the present disclosure.

FIG. 13 shows a block diagram of a device that supports automatic adaptation of data SCS numerology based on SSB transmission in accordance with various aspects of the present disclosure. Block diagram 1300 of a device 1305 may be an example of a device that supports SSB SCS numerology adaptation. The device 1305 may be an example of aspects of a device 1205, or a UE 115 as described herein. The device 1305 may include a receiver 1310, a communications manager 1315, and a transmitter 1335. The device 1305 may also include a processor. Each of these components may be in communication with one another (e.g., via one or more buses).

The receiver 1310 may receive information such as packets, user data, or control information associated with various information channels (e.g., control channels, data channels, and information related to automatic adaptation of data SCS numerology based on SSB transmission, etc.). Information may be passed on to other components of the device 1305. The receiver 1310 may be an example of aspects of the transceiver 1520 (as shown in FIG. 15). The receiver 1310 may utilize a single antenna or a set of antennas.

The communications manager 1315 may be an example of aspects of the communications manager 1215 as described herein. The communications manager 1315 may include a SCS manager 1320, a DCI manager 1325, and a receiver manager 1330. The communications manager 1315 may be an example of aspects of the communications manager 1510 described herein.

The SCS manager 1320 may receive first data information transmitted using a first SCS and determine a second SCS based on the indication. The DCI manager 1325 may receive downlink signaling including an indication of a synchronization signal in a first BWP. The receiver manager 1330 may contemporaneously receive the synchronization signal and second data information transmitted using the determined second SCS.

The transmitter 1335 may transmit signals generated by other components of the device 1305. In some examples, the transmitter 1335 may be collocated with a receiver 1310 in a transceiver component. For example, the transmitter 1335 may be an example of aspects of the transceiver 1520 (as shown in FIG. 15). The transmitter 1335 may utilize a single antenna or a set of antennas.

Figure 14:
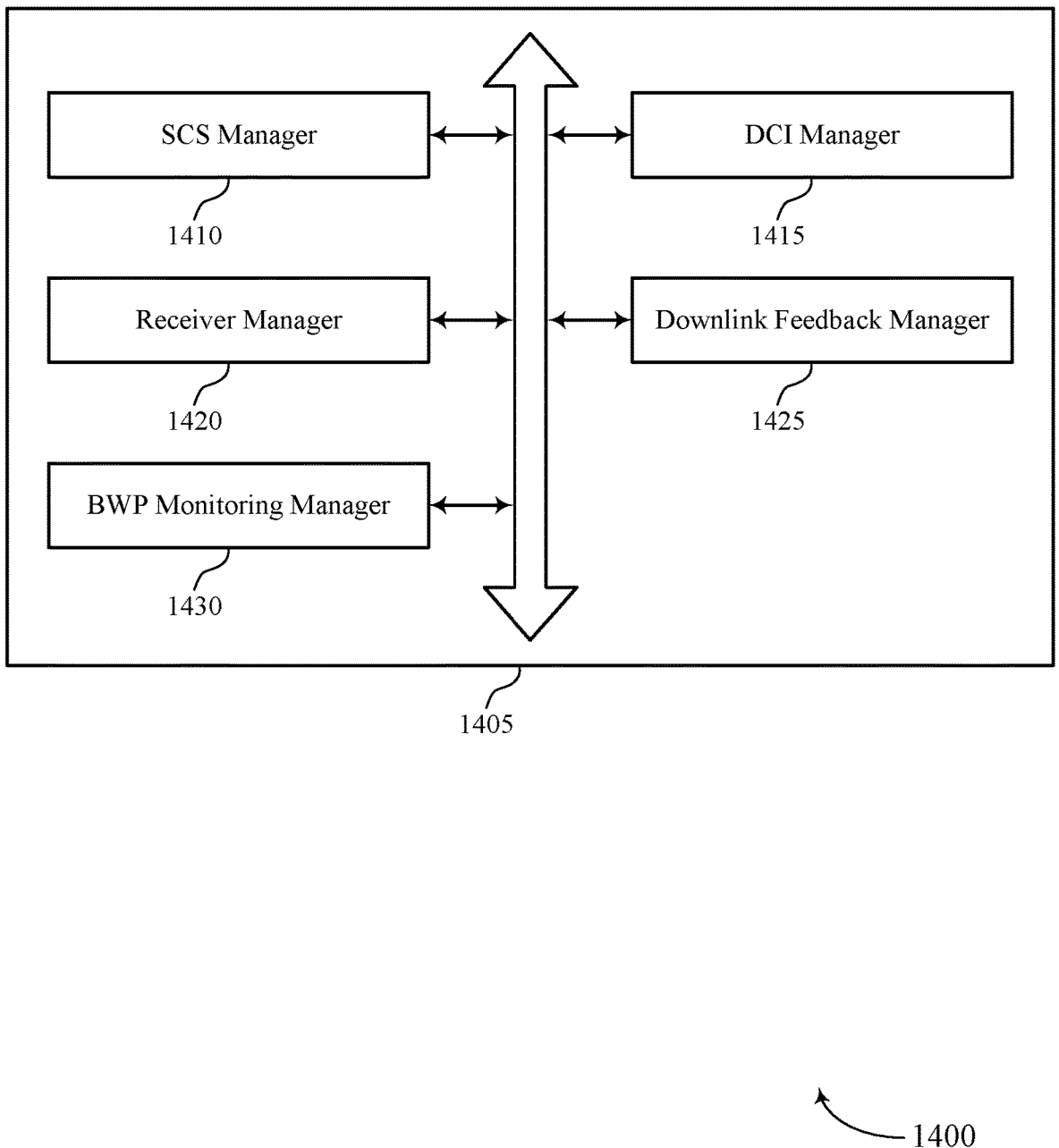
FIG. 14 shows a block diagram of a communications manager that supports automatic adaptation of data SCS numerology based on SSB transmission in accordance with various aspects of the present disclosure.

FIG. 14 shows a block diagram 1400 of a communications manager 1405 that supports automatic adaptation of data SCS numerology based on SSB transmission in accordance with various aspects of the present disclosure. The communications manager 1405 may be an example of aspects of a communications manager 1215, a communications manager 1315, or a communications manager 1510 described herein. The communications manager 1405 may include a SCS manager 1410, a DCI manager 1415, a receiver manager 1420, a downlink feedback manager 1425, and a BWP monitoring manager 1430. Each of these components may communicate, directly or indirectly, with one another (e.g., via one or more buses).

The SCS manager 1410 may receive first data information transmitted using a first SCS. In some examples, the SCS manager 1410 may determine a second SCS based on the indication. In some examples, the SCS manager 1410 may configure a modem of the UE from using the first SCS to using the determined second SCS based on the indication, where the synchronization signal and the second data information are contemporaneously received based on the configuring. In some examples, the SCS manager 1410 may configure the modem from using the first SCS to using the determined second SCS within the first BWP, where the first data information, the synchronization signal, and the second data information are received within the first BWP.

In some examples, the SCS manager 1410 may identify a symbol boundary associated with the synchronization signal based on the indication, where the configuring occurs at the identified symbol boundary. In some examples, the SCS manager 1410 may identify a slot boundary associated with the synchronization signal based on the indication, where the configuring occurs at the identified slot boundary. In some examples, the SCS manager 1410 may identify a SSB burst boundary associated with the synchronization signal based on the indication, where the configuring occurs at the identified SSB burst boundary. In some cases, the slot boundary is identified based on the determined second SCS. In some cases, the second SCS includes a default SCS associated with the synchronization signal.

The DCI manager 1415 may receive downlink signaling including an indication of a synchronization signal in a first BWP. In some cases, the synchronization signal includes a SSB.

The receiver manager 1420 may contemporaneously receive the synchronization signal and second data information transmitted using the determined second SCS. In some examples, the receiver manager 1420 may determine a temporal period to decode the synchronization signal and the second data information based on the first BWP and the determined SCS, where the synchronization signal and the data information are received based on the determined temporal period. In some cases, the synchronization signal and the second data information are received based on a FDM scheme. In some cases, the receipt of the second data information is temporally adjacent to the receipt of the first data information.

The downlink feedback manager 1425 may determine a first location corresponding to the second data information based on the received downlink signaling. In some examples, the downlink feedback manager 1425 may determine a second location corresponding to an uplink feedback occasion associated with the second data information. In some examples, the downlink feedback manager 1425 may generate an uplink feedback report for the first data information and the second data information, where the uplink feedback report is generated based on the first SCS, or the second SCS, or both.

In some examples, the downlink feedback manager 1425 may determine a third location corresponding to the first data information, where the third location is determined based on a second slot pattern defined according to the first SCS. In some cases, the first location and the second location are determined based on a first slot pattern defined according to the first SCS. In some cases, the first location and the second location are determined based on a first slot pattern defined according to the determined second SCS. In some cases, the uplink feedback report includes a HARQ-ACK codebook.

The BWP monitoring manager 1430 may configure the modem of the UE from monitoring a second BWP to monitoring the first BWP, where the first data information is received via the second BWP, and the synchronization signal and the second data information are received via the first BWP. In some examples, the BWP monitoring manager 1430 may configure the modem of the UE from monitoring the first BWP to monitoring the second BWP based on receiving the synchronization signal and the second data information, where third data information is received via the first BWP. In some examples, the BWP monitoring manager 1430 may receive a configuration for the first BWP. In some cases, the configuring is based on a time delay after the synchronization signal and the second data information are received. In some cases, the downlink signaling includes an indication of the time delay. In some cases, the configuration is received via RRC signaling or a medium access control element. In some cases, the first SCS is associated with the second BWP and the determined second SCS is associated with the first BWP.

FIG. 15 shows a diagram of a system including a device that supports automatic adaptation of data SCS numerology based on SSB transmission in accordance with various aspects of the present disclosure. System 1500 includes a device 1505 that may support automatic adaptation of data SCS numerology based on SSB transmission. The device 1505 may be an example of or include the components of device 1205, device 1305, or a UE 115 as described herein. The device 1505 may include components for bi-directional voice and data communications including components for transmitting and receiving communications, including a communications manager 1510, an I/O controller 1515, a transceiver 1520, an antenna 1525, memory 1530, and a processor 1540. These components may be in electronic communication via one or more buses (e.g., bus 1545).

The communications manager 1510 may receive first data information transmitted using a first SCS, determine a second SCS based on the indication, receive downlink signaling including an indication of a synchronization signal in a first BWP, and contemporaneously receive the synchronization signal and second data information transmitted using the determined second SCS.

The I/O controller 1515 may manage input and output signals for the device 1505. The I/O controller 1515 may also manage peripherals not integrated into the device 1505. In some cases, the I/O controller 1515 may represent a physical connection or port to an external peripheral. In some cases, the I/O controller 1515 may utilize an operating system such as iOS®, ANDROID®, MS-DOS®, MS-WINDOWS®, OS/2®, UNIX®, LINUX®, or another known operating system. In other cases, the I/O controller 1515 may represent or interact with a modem, a keyboard, a mouse, a touchscreen, or a similar device. In some cases, the I/O controller 1515 may be implemented as part of a processor. In some cases, a user may interact with the device 1505 via the I/O controller 1515 or via hardware components controlled by the I/O controller 1515.

The transceiver 1520 may communicate bi-directionally, via one or more antennas, wired, or wireless links as described herein. For example, the transceiver 1520 may represent a wireless transceiver and may communicate bi-directionally with another wireless transceiver. The transceiver 1520 may also include a modem to modulate the packets and provide the modulated packets to the antennas for transmission, and to demodulate packets received from the antennas.

In some cases, the wireless device may include a single antenna 1525. However, in some cases the device may have more than one antenna 1525, which may be capable of concurrently transmitting or receiving multiple wireless transmissions.

The memory 1530 may include random-access memory (RAM) and read-only memory (ROM). The memory 1530 may store computer-readable, computer-executable code or software 1535 including instructions that, when executed, cause the processor to perform various functions described herein. In some cases, the memory 1530 may contain, among other things, a basic I/O system (BIOS) which may control basic hardware or software operation such as the interaction with peripheral components or devices.

The processor 1540 may include an intelligent hardware device, (e.g., a general-purpose processor, a DSP, a central processing unit (CPU), a microcontroller, an ASIC, an FPGA, a programmable logic device, a discrete gate or transistor logic component, a discrete hardware component, or any combination thereof). In some cases, the processor 1540 may be configured to operate a memory array using a memory controller. In other cases, a memory controller may be integrated into the processor 1540. The processor 1540 may be configured to execute computer-readable instructions stored in a memory (e.g., the memory 1530) to cause the device 1505 to perform various functions (e.g., functions or tasks supporting automatic adaptation of data SCS numerology based on SSB transmission).

The software 1535 may include instructions to implement aspects of the present disclosure, including instructions to support wireless communications. The software 1535 may be stored in a non-transitory computer-readable medium such as system memory or other type of memory. In some cases, the software 1535 may not be directly executable by the processor 1540 but may cause a computer (e.g., when compiled and executed) to perform functions described herein.

Implementing the techniques described herein, device 1505 may realize efficient configuration of SCS for data, which may provide for improved FDM of SSB and data. For example, the techniques described herein may provide for decreased encoding complexity at base stations 105 and decreased decoding complexity at UEs 115 (e.g., at device 1505) for FDM of SSB and data using a same SCS (e.g., time-domain summation of two IFFT outputs for FDM of SSB and data, each with a different numerology, may otherwise result in increased complexity at a receiving device or a transmitting device). Such may further provide for more efficient modem operation by a device 1505 (e.g., processor 1540 may save resources otherwise used for relatively complex decoding, such that the operation of processor 1540 may be optimized in scenarios of FDM of SSB and data). For example, resources saved based on decreased decoding complexity may be used more efficient operation (e.g., for other tasks) of a device 1505. Additionally or alternatively, decreased decoding complexity may provide for power savings at the device 1505, may provide for FDM of SSB and data for device 1505 with reduced decoding/processing capabilities (e.g., as device 1505 may not necessarily have to be capable of decoding a waveform with time-domain summation of two IFFT outputs for FDM of SSB and data, each with a different numerology), etc.

Further, an alternative to using a same SCS (e.g., SSB SCS) for FDM of SSB and data may include refraining from FDM SSB and data (e.g., such that data is not sent when SSB is transmitted). However, the techniques described herein may provide for such FDM of SSB and data, which may reduce latency associated with the halted data in scenarios where data is otherwise not sent when SSB is transmitted. As such, compared to refraining from FDM SSB and data, the techniques described herein may provide for reduced latency, which may aid in urgent downlink communications, while maintaining reduced encoding/decoding complexity.

Figure 16:
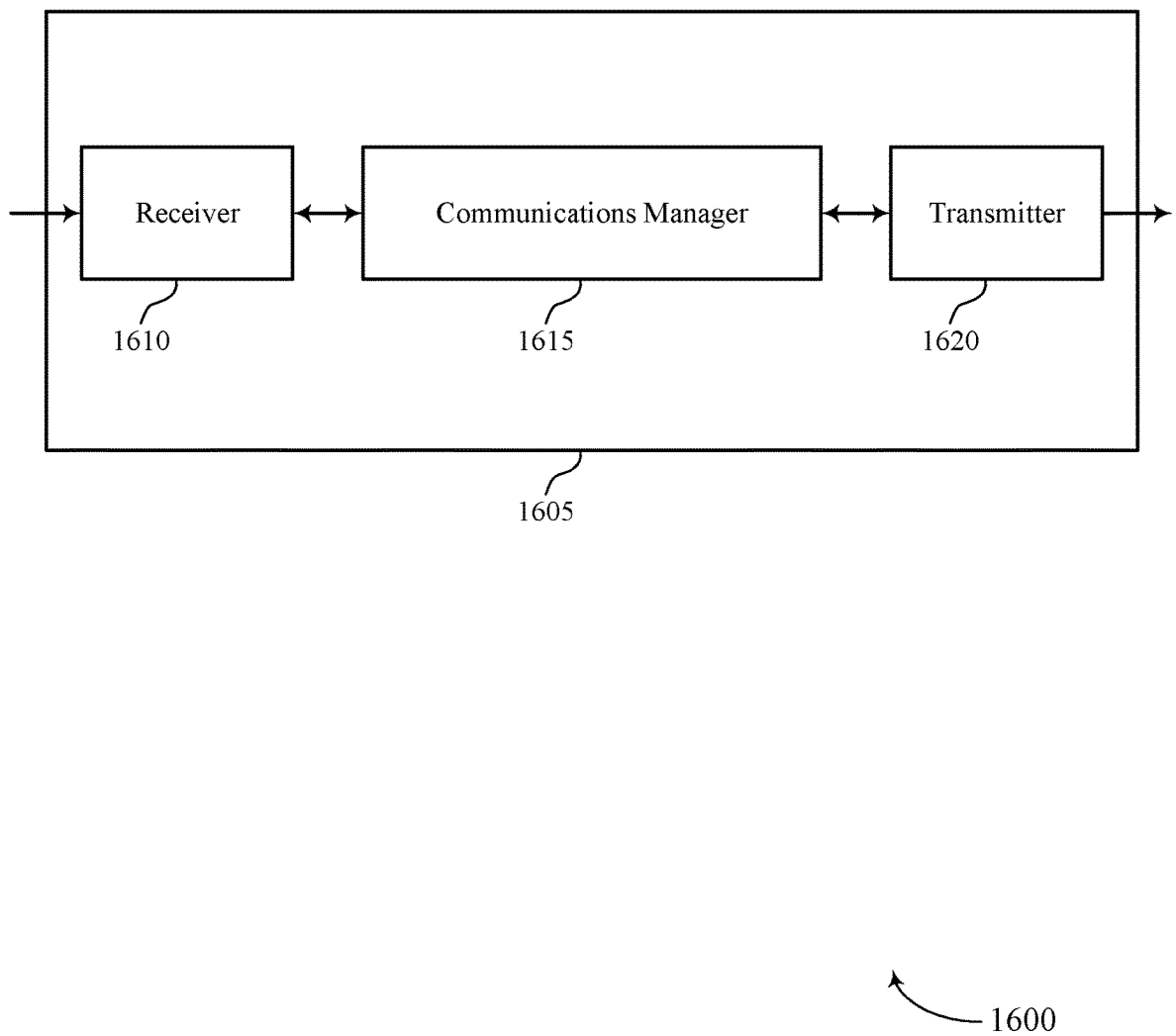
FIG. 16 shows a block diagram of a device that supports automatic adaptation of data SCS numerology based on SSB transmission in accordance with various aspects of the present disclosure.

FIG. 16 shows a block diagram of a device that supports automatic adaptation of data SCS numerology based on SSB transmission in accordance with various aspects of the present disclosure. Block diagram 1600 of a device 1605 may be an example of a device that supports automatic adaptation of data SCS numerology based on SSB transmission. The device 1605 may be an example of aspects of a base station 105 as described herein. The device 1605 may include a receiver 1610, a communications manager 1615, and a transmitter 1620. The device 1605 may also include a processor. Each of these components may be in communication with one another (e.g., via one or more buses).

Figure 19:
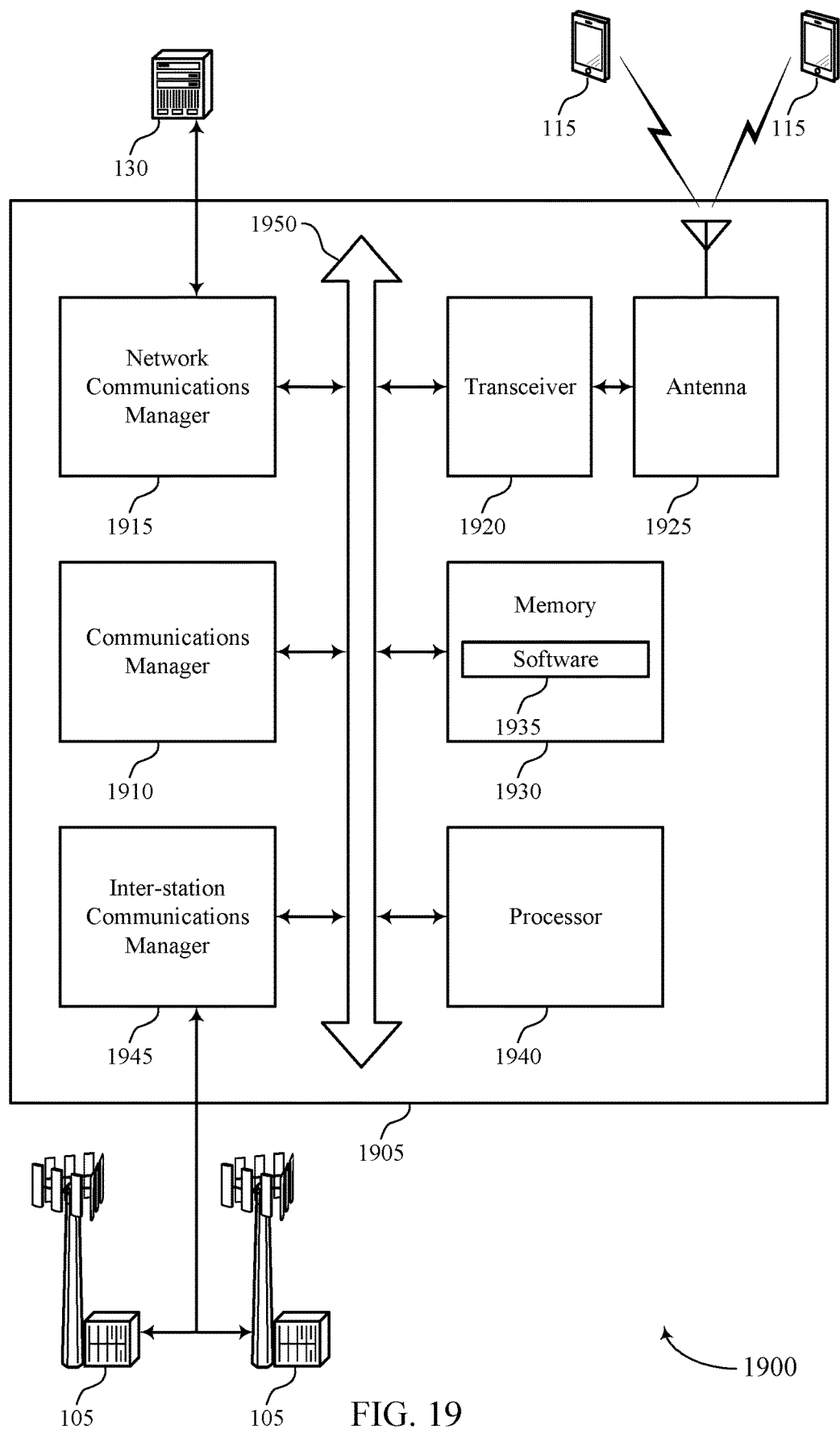
FIG. 19 shows a diagram of a system including a device that supports automatic adaptation of data SCS numerology based on SSB transmission in accordance with various aspects of the present disclosure.

The receiver 1610 may receive information such as packets, user data, or control information associated with various information channels (e.g., control channels, data channels, and information related to automatic adaptation of data SCS numerology based on SSB transmission, etc.). Information may be passed on to other components of the device 1605. The receiver 1610 may be an example of aspects of the transceiver 1920 (as shown in FIG. 19). The receiver 1610 may utilize a single antenna or a set of antennas.

The communications manager 1615 may transmit first data information using a first SCS, determine a second SCS based on the indication, transmit downlink signaling including a first indication of a synchronization signal in a first BWP, and contemporaneously transmit the synchronization signal and second data information using the determined second SCS. The communications manager 1615 may be an example of aspects of the communications manager 1910 described herein.

The communications manager 1615, or its sub-components, may be implemented in hardware, code (e.g., software or firmware) executed by a processor, or any combination thereof. If implemented in code executed by a processor, the functions of the communications manager 1615, or its sub-components may be executed by a general-purpose processor, a DSP, an ASIC, an FPGA or other programmable logic device, discrete gate or transistor logic, discrete hardware components, or any combination thereof designed to perform the functions described in the present disclosure.

The communications manager 1615, or its sub-components, may be physically located at various positions, including being distributed such that portions of functions are implemented at different physical locations by one or more physical components. In some examples, the communications manager 1615, or its sub-components, may be a separate and distinct component in accordance with various aspects of the present disclosure. In some examples, the communications manager 1615, or its sub-components, may be combined with one or more other hardware components, including but not limited to an I/O component, a transceiver, a network server, another computing device, one or more other components described in the present disclosure, or a combination thereof in accordance with various aspects of the present disclosure.

The transmitter 1620 may transmit signals generated by other components of the device 1605. In some examples, the transmitter 1620 may be collocated with a receiver 1610 in a transceiver component. For example, the transmitter 1620 may be an example of aspects of the transceiver 1920 (as shown in FIG. 19). The transmitter 1620 may utilize a single antenna or a set of antennas.

Figure 17:
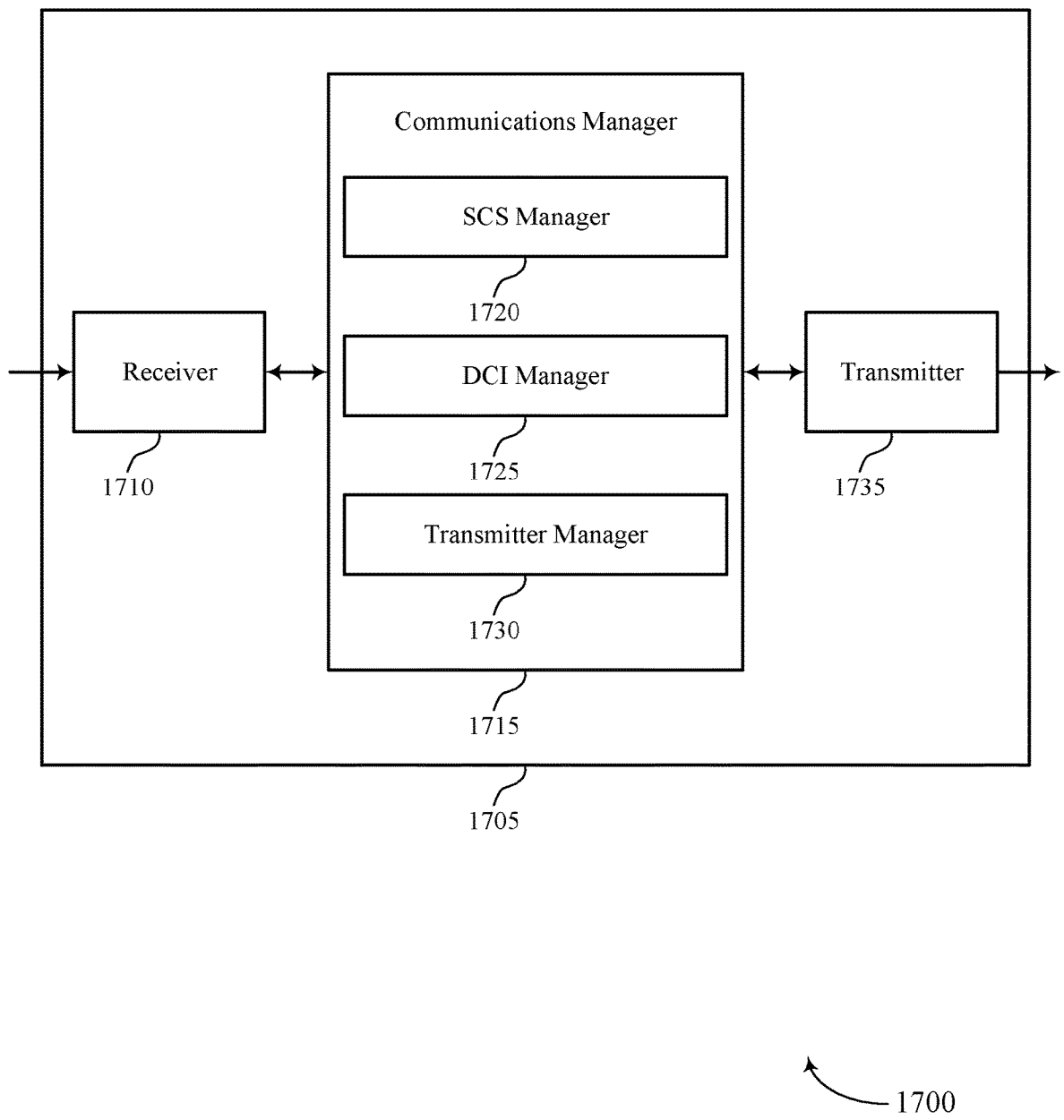
FIG. 17 shows a block diagram of a device that supports automatic adaptation of data SCS numerology based on SSB transmission in accordance with various aspects of the present disclosure.

FIG. 17 shows a block diagram of a device that supports automatic adaptation of data SCS numerology based on SSB transmission in accordance with various aspects of the present disclosure. Block diagram 1700 of a device 1705 may be an example of a device that supports SSB SCS numerology adaptation. The device 1705 may be an example of aspects of a device 1605, or a base station 105 as described herein. The device 1705 may include a receiver 1710, a communications manager 1715, and a transmitter 1735. The device 1705 may also include a processor. Each of these components may be in communication with one another (e.g., via one or more buses).

The receiver 1710 may receive information such as packets, user data, or control information associated with various information channels (e.g., control channels, data channels, and information related to automatic adaptation of data SCS numerology based on SSB transmission, etc.). Information may be passed on to other components of the device 1705. The receiver 1710 may be an example of aspects of the transceiver 1920 (as shown in FIG. 19). The receiver 1710 may utilize a single antenna or a set of antennas.

The communications manager 1715 may be an example of aspects of the communications manager 1615 as described herein. The communications manager 1715 may include a SCS manager 1720, a DCI manager 1725, and a transmitter manager 1730. The communications manager 1715 may be an example of aspects of the communications manager 1910 described herein.

The SCS manager 1720 may transmit first data information using a first SCS and determine a second SCS based on the indication. The DCI manager 1725 may transmit downlink signaling including a first indication of a synchronization signal in a first BWP. The transmitter manager 1730 may contemporaneously transmit the synchronization signal and second data information using the determined second SCS.

The transmitter 1735 may transmit signals generated by other components of the device 1705. In some examples, the transmitter 1735 may be collocated with a receiver 1710 in a transceiver component. For example, the transmitter 1735 may be an example of aspects of the transceiver 1920 (as shown in FIG. 19). The transmitter 1735 may utilize a single antenna or a set of antennas.

Figure 18:
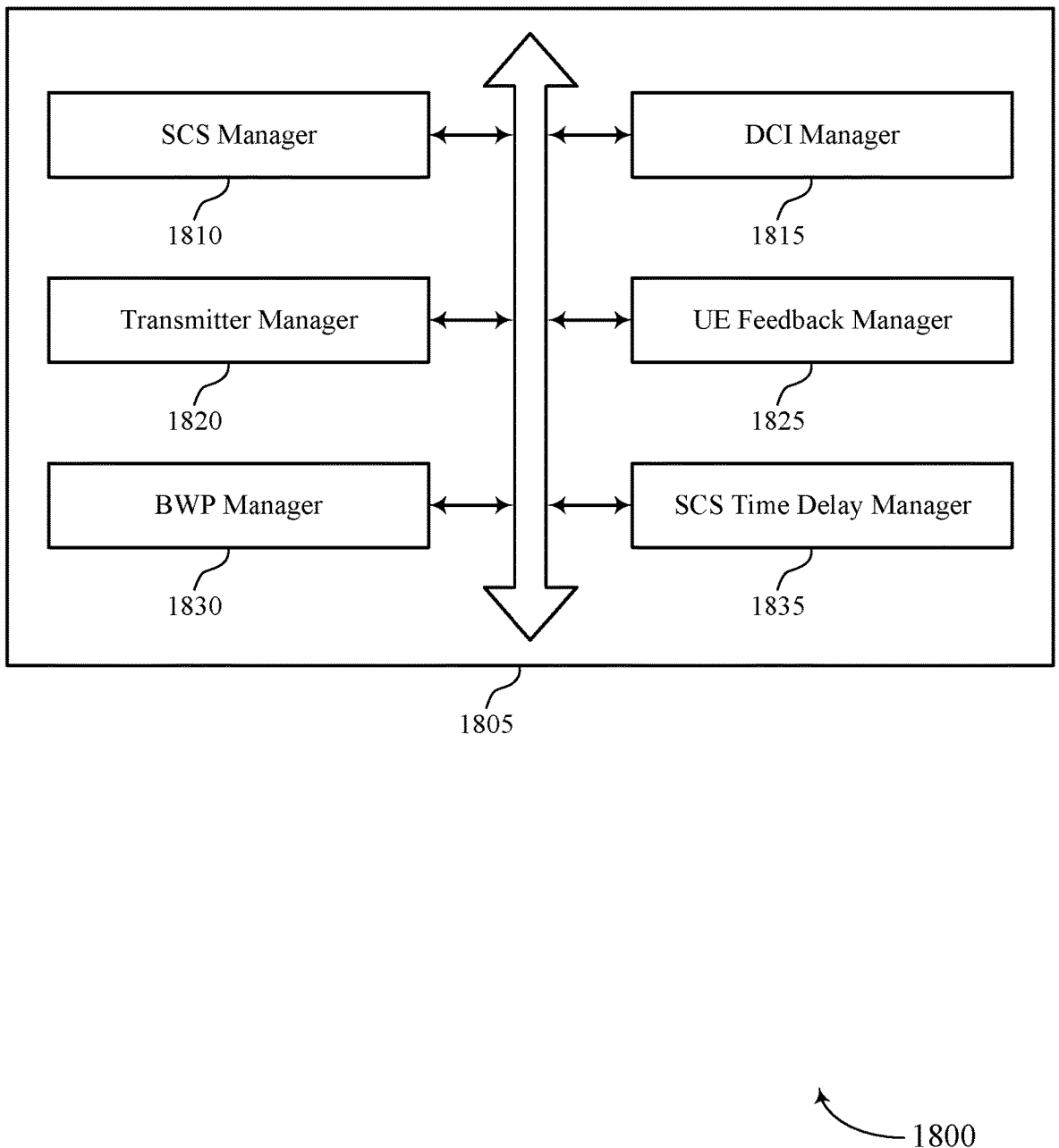
FIG. 18 shows a block diagram of a communications manager that supports automatic adaptation of data SCS numerology based on SSB transmission in accordance with various aspects of the present disclosure.

FIG. 18 shows a block diagram of a communications manager that supports automatic adaptation of data SCS numerology based on SSB transmission in accordance with various aspects of the present disclosure. Block diagram 1800 of a communications manager 1805 may be an example of a communications manager that supports automatic adaptation of data SCS numerology based on SSB transmission. The communications manager 1805 may be an example of aspects of a communications manager 1615, a communications manager 1715, or a communications manager 1910 described herein. The communications manager 1805 may include a SCS manager 1810, a DCI manager 1815, a transmitter manager 1820, a UE feedback manager 1825, a BWP manager 1830, and a SCS time delay manager 1835. Each of these components may communicate, directly or indirectly, with one another (e.g., via one or more buses).

The SCS manager 1810 may transmit first data information using a first SCS. In some examples, the SCS manager 1810 may determine a second SCS based on the indication. In some examples, the SCS manager 1810 may configure a modem of the base station from using the first SCS to using the determined second SCS based on the indication, where the synchronization signal and the second data information are contemporaneously transmitted based on the configuring. In some examples, the SCS manager 1810 may configure the modem from using the first SCS to using the determined second SCS within the first BWP, where the first data information, the synchronization signal, and the second data information are transmitted within the first BWP.

In some examples, the SCS manager 1810 may identify a symbol boundary associated with the synchronization signal based on the indication, where the configuring occurs at the identified symbol boundary. In some examples, the SCS manager 1810 may identify a slot boundary associated with the synchronization signal based on the indication, where the configuring occurs at the identified slot boundary. In some examples, the SCS manager 1810 may identify a SSB burst boundary associated with the synchronization signal based on the indication, where the configuring occurs at the identified SSB burst boundary. In some cases, the slot boundary is identified based on the determined second SCS. In some cases, the second SCS includes a default SCS associated with the synchronization signal.

The DCI manager 1815 may transmit downlink signaling including a first indication of a synchronization signal in a first BWP. In some cases, the synchronization signal includes a SSB.

The transmitter manager 1820 may contemporaneously transmit the synchronization signal and second data information using the determined second SCS. In some examples, the transmitter manager 1820 may transmit third data information via the first BWP. In some examples, the transmitter manager 1820 may determine a temporal period to transmit the synchronization signal and the second data information based on the first BWP and the determined SCS, where the synchronization signal and the data information are transmitted based on the determined temporal period. In some cases, the synchronization signal and the second data information are received based on a FDM scheme. In some cases, the transmission of the second data information is temporally adjacent to the transmission of the first data information.

The UE feedback manager 1825 may transmit a second indication of a first location corresponding to the second data information based on the transmitted downlink signaling. In some examples, the UE feedback manager 1825 may transmit a third indication of a second location corresponding to an uplink feedback occasion associated with the second data information. In some examples, the UE feedback manager 1825 may receive an uplink feedback report for the first data information and the second data information, where the uplink feedback report is received based on the first SCS, or the second SCS, or both. In some examples, the UE feedback manager 1825 may transmit a fourth indication of a third location corresponding to the first data information, where the third location is based on a second slot pattern defined according to the first SCS. In some cases, the first location and the second location are based on a first slot pattern defined according to the first SCS. In some cases, the first location and the second location are determined based on a first slot pattern defined according to the determined second SCS. In some cases, the uplink feedback report includes a HARQ-ACK codebook.

The BWP manager 1830 may configure the modem from activating a second BWP to activating the first BWP, where the first data information is transmitted via the second BWP, and the synchronization signal and the second data information are transmitted via the first BWP. In some examples, the BWP manager 1830 may configure the modem from activating the first BWP to activating the second BWP based on transmitting the synchronization signal and the second data information. In some examples, the BWP manager 1830 may transmit a configuration for the first BWP. In some cases, the configuration is transmitted via RRC signaling or a medium access control element. In some cases, the first SCS is associated with the second BWP and the determined second SCS is associated with the first BWP.

The SCS time delay manager 1835 may determine a time delay after the synchronization signal and the second data information, where the configuring is based on the time delay. In some cases, the time delay is determined based on a processing time associated with HARQ-ACK feedback. In some cases, the downlink signaling includes an indication of the time delay.

FIG. 19 shows a diagram of a system including a device that supports automatic adaptation of data SCS numerology based on SSB transmission in accordance with various aspects of the present disclosure. System 1900 may include a device 1905 that may be an example of a device that supports automatic adaptation of data SCS numerology based on SSB transmission. The device 1905 may be an example of or include the components of device 1605, device 1705, or a base station 105 as described herein. The device 1905 may include components for bi-directional voice and data communications including components for transmitting and receiving communications, including a communications manager 1910, a network communications manager 1915, a transceiver 1920, an antenna 1925, memory 1930, a processor 1940, and an inter-station communications manager 1945. These components may be in electronic communication via one or more buses (e.g., bus 1950).

The communications manager 1910 may transmit first data information using a first SCS, determine a second SCS based on the indication, transmit downlink signaling including a first indication of a synchronization signal in a first BWP, and contemporaneously transmit the synchronization signal and second data information using the determined second SCS.

The network communications manager 1915 may manage communications with the core network (e.g., via one or more wired backhaul links). For example, the network communications manager 1915 may manage the transfer of data communications for client devices, such as one or more UEs 115.

The transceiver 1920 may communicate bi-directionally, via one or more antennas, wired, or wireless links as described herein. For example, the transceiver 1920 may represent a wireless transceiver and may communicate bi-directionally with another wireless transceiver. The transceiver 1920 may also include a modem to modulate the packets and provide the modulated packets to the antennas for transmission, and to demodulate packets received from the antennas.

In some cases, the wireless device may include a single antenna 1925. However, in some cases the device may have more than one antenna 1925, which may be capable of concurrently transmitting or receiving multiple wireless transmissions.

The memory 1930 may include RAM, ROM, or a combination thereof. The memory 1930 may store computer-readable code or software 1935 including instructions that, when executed by a processor (e.g., the processor 1940) cause the device to perform various functions described herein. In some cases, the memory 1930 may contain, among other things, a BIOS which may control basic hardware or software operation such as the interaction with peripheral components or devices.

The processor 1940 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1940 may be configured to operate a memory array using a memory controller. In some cases, a memory controller may be integrated into processor 1940. The processor 1940 may be configured to execute computer-readable instructions stored in a memory (e.g., the memory 1930) to cause the device 1905 to perform various functions (e.g., functions or tasks supporting automatic adaptation of data SCS numerology based on SSB transmission).

The inter-station communications manager 1945 may manage communications with other base station 105, and may include a controller or scheduler for controlling communications with UEs 115 in cooperation with other base stations 105. For example, the inter-station communications manager 1945 may coordinate scheduling for transmissions to UEs 115 for various interference mitigation techniques such as beamforming or joint transmission. In some examples, the inter-station communications manager 1945 may provide an X2 interface within an LTE/LTE-A wireless communication network technology to provide communication between base stations 105.

The software 1935 may include instructions to implement aspects of the present disclosure, including instructions to support wireless communications. The software 1935 may be stored in a non-transitory computer-readable medium such as system memory or other type of memory. In some cases, the software 1935 may not be directly executable by the processor 1940 but may cause a computer (e.g., when compiled and executed) to perform functions described herein.

Implementing the techniques described herein, device 1905 may realize efficient configuration of SCS for data, which may provide for improved FDM of SSB and data. For example, the techniques described herein may provide for decreased encoding complexity at base stations 105 (e.g., at device 1905) and decreased decoding complexity at UEs 115 for FDM of SSB and data using a same SCS (e.g., time-domain summation of two IFFT outputs for FDM of SSB and data, each with a different numerology, may otherwise result in increased complexity at a receiving device or a transmitting device). Such may further provide for more efficient modem operation by a device 1905 (e.g., processor 1940 may save resources otherwise used for relatively complex encoding, such that the operation of processor 1940 may be optimized in scenarios of FDM of SSB and data). For example, resources saved based on decreased encoding complexity may be used more efficient operation (e.g., for other tasks) of a device 1905. Additionally or alternatively, decreased encoding complexity may provide for power savings at the device 1905, may provide for FDM of SSB and data for device 1905 with reduced encoding/processing capabilities (e.g., as device 1905 may not necessarily have to be capable of encoding a waveform with time-domain summation of two IFFT outputs for FDM of SSB and data, each with a different numerology), etc.

Further, an alternative to using a same SCS (e.g., SSB SCS) for FDM of SSB and data may include refraining from FDM SSB and data (e.g., such that data is not sent when SSB is transmitted). However, the techniques described herein may provide for such FDM of SSB and data, which may reduce latency associated with the halted data in scenarios where data is otherwise not sent when SSB is transmitted. As such, compared to refraining from FDM SSB and data, the techniques described herein may provide for reduced latency, which may aid in urgent downlink communications, while maintaining reduced encoding/decoding complexity.

Figure 20:
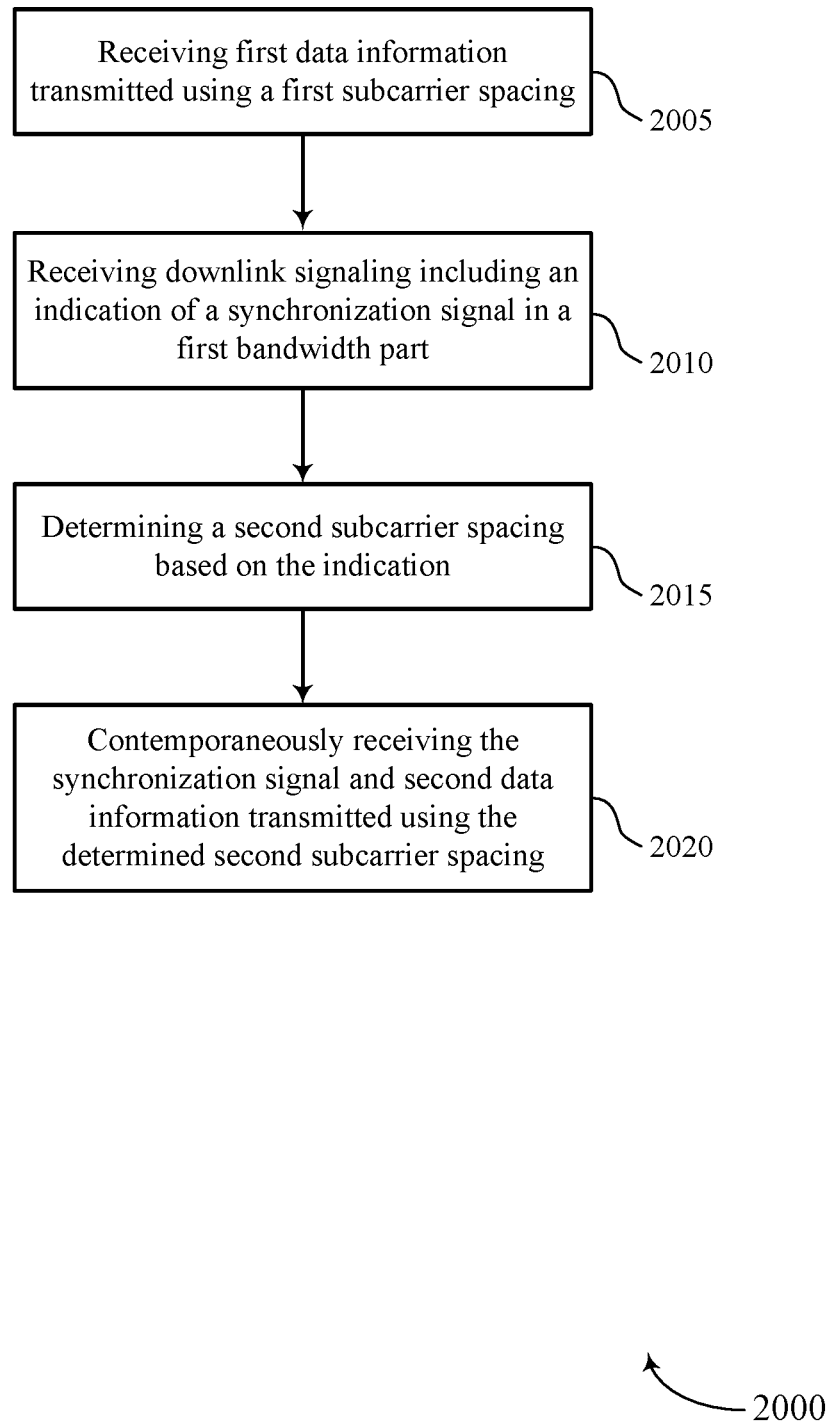
FIG. 20 shows a flowchart illustrating a method that supports automatic adaptation of data SCS numerology based on SSB transmission in accordance with various aspects of the present disclosure.

FIG. 20 shows a flowchart illustrating a method that supports automatic adaptation of data SCS numerology based on SSB transmission in accordance with various aspects of the present disclosure. The operations of method 2000 may be implemented by a UE 115 or its components as described herein. For example, the operations of method 2000 may be performed by a communications manager as described with reference to FIGS. 12 through 15. In some examples, a UE may execute a set of instructions to control the functional elements of the UE to perform the functions described herein. Additionally or alternatively, a UE may perform aspects of the functions described herein using special-purpose hardware.

At 2005, the UE may receive first data information transmitted using a first SCS. The operations of 2005 may be performed according to the methods described herein. In some examples, aspects of the operations of 2005 may be performed by a SCS manager as described with reference to FIGS. 12 through 15.

At 2010, the UE may receive downlink signaling including an indication of a synchronization signal in a first BWP. The operations of 2010 may be performed according to the methods described herein. In some examples, aspects of the operations of 2010 may be performed by a DCI manager as described with reference to FIGS. 12 through 15.

At 2015, the UE may determine a second SCS based on the indication. The operations of 2015 may be performed according to the methods described herein. In some examples, aspects of the operations of 2015 may be performed by a SCS manager as described with reference to FIGS. 12 through 15.

At 2020, the UE may contemporaneously receive the synchronization signal and second data information transmitted using the determined second SCS. The operations of 2020 may be performed according to the methods described herein. In some examples, aspects of the operations of 2020 may be performed by a receiver manager as described with reference to FIGS. 12 through 15.

Figure 21:
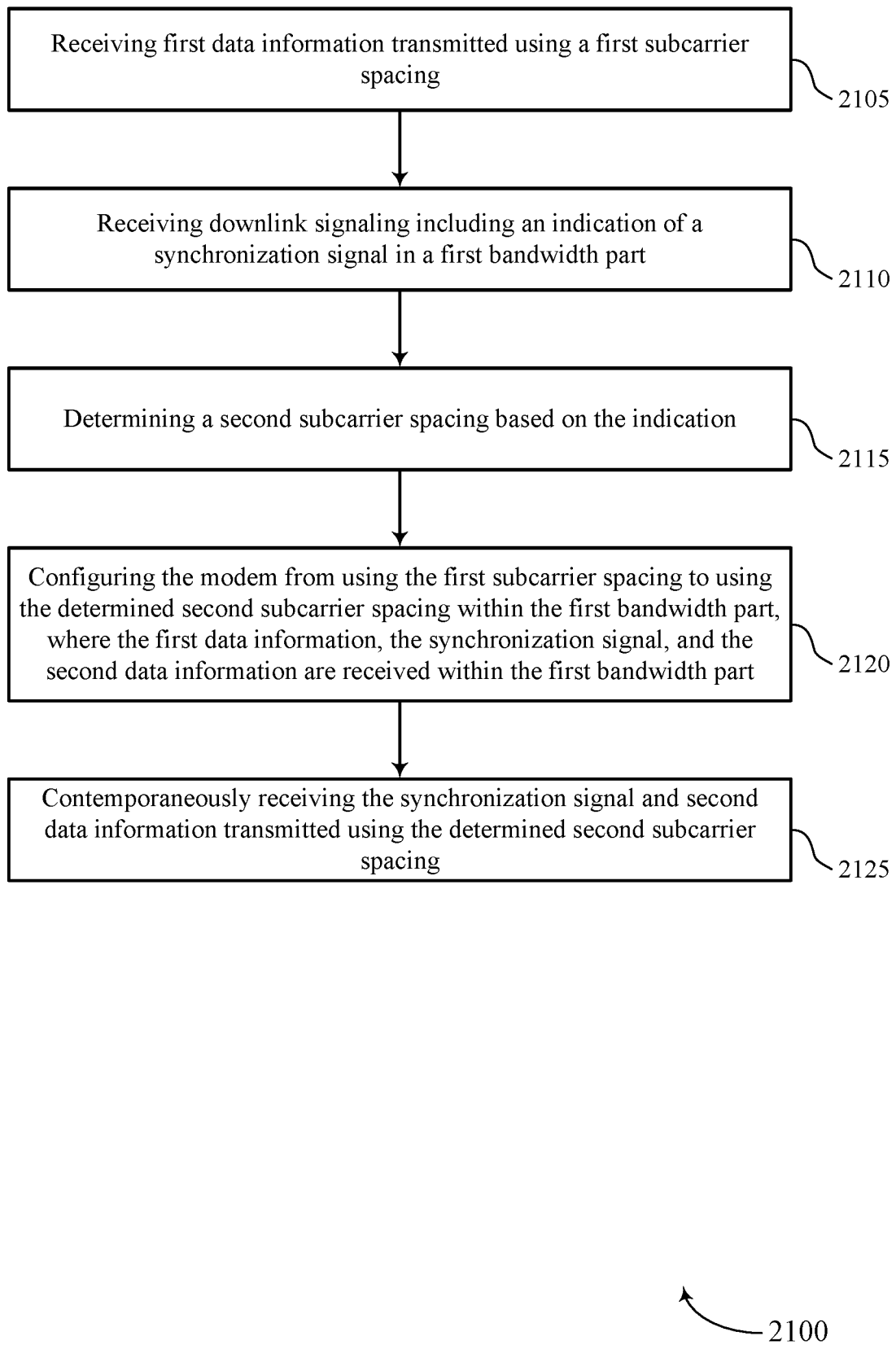
FIG. 21 shows a flowchart illustrating a method that supports automatic adaptation of data SCS numerology based on SSB transmission in accordance with various aspects of the present disclosure.

FIG. 21 shows a flowchart illustrating a method that supports automatic adaptation of data SCS numerology based on SSB transmission in accordance with various aspects of the present disclosure. The operations of method 2100 may be implemented by a UE 115 or its components as described herein. For example, the operations of method 2100 may be performed by a communications manager as described with reference to FIGS. 12 through 15. In some examples, a UE may execute a set of instructions to control the functional elements of the UE to perform the functions described herein. Additionally or alternatively, a UE may perform aspects of the functions described herein using special-purpose hardware.

At 2105, the UE may receive first data information transmitted using a first SCS. The operations of 2105 may be performed according to the methods described herein. In some examples, aspects of the operations of 2105 may be performed by a SCS manager as described with reference to FIGS. 12 through 15.

At 2110, the UE may receive downlink signaling including an indication of a synchronization signal in a first BWP. The operations of 2110 may be performed according to the methods described herein. In some examples, aspects of the operations of 2110 may be performed by a DCI manager as described with reference to FIGS. 12 through 15.

At 2115, the UE may determine a second SCS based on the indication. The operations of 2115 may be performed according to the methods described herein. In some examples, aspects of the operations of 2115 may be performed by a SCS manager as described with reference to FIGS. 12 through 15.

At 2120, the UE may configure the modem from using the first SCS to using the determined second SCS within the first BWP, where the first data information, the synchronization signal, and the second data information are received within the first BWP. The operations of 2120 may be performed according to the methods described herein. In some examples, aspects of the operations of 2120 may be performed by a SCS manager as described with reference to FIGS. 12 through 15.

At 2125, the UE may contemporaneously receive the synchronization signal and second data information transmitted using the determined second SCS. The operations of 2125 may be performed according to the methods described herein. In some examples, aspects of the operations of 2125 may be performed by a receiver manager as described with reference to FIGS. 12 through 15.

Figure 22:
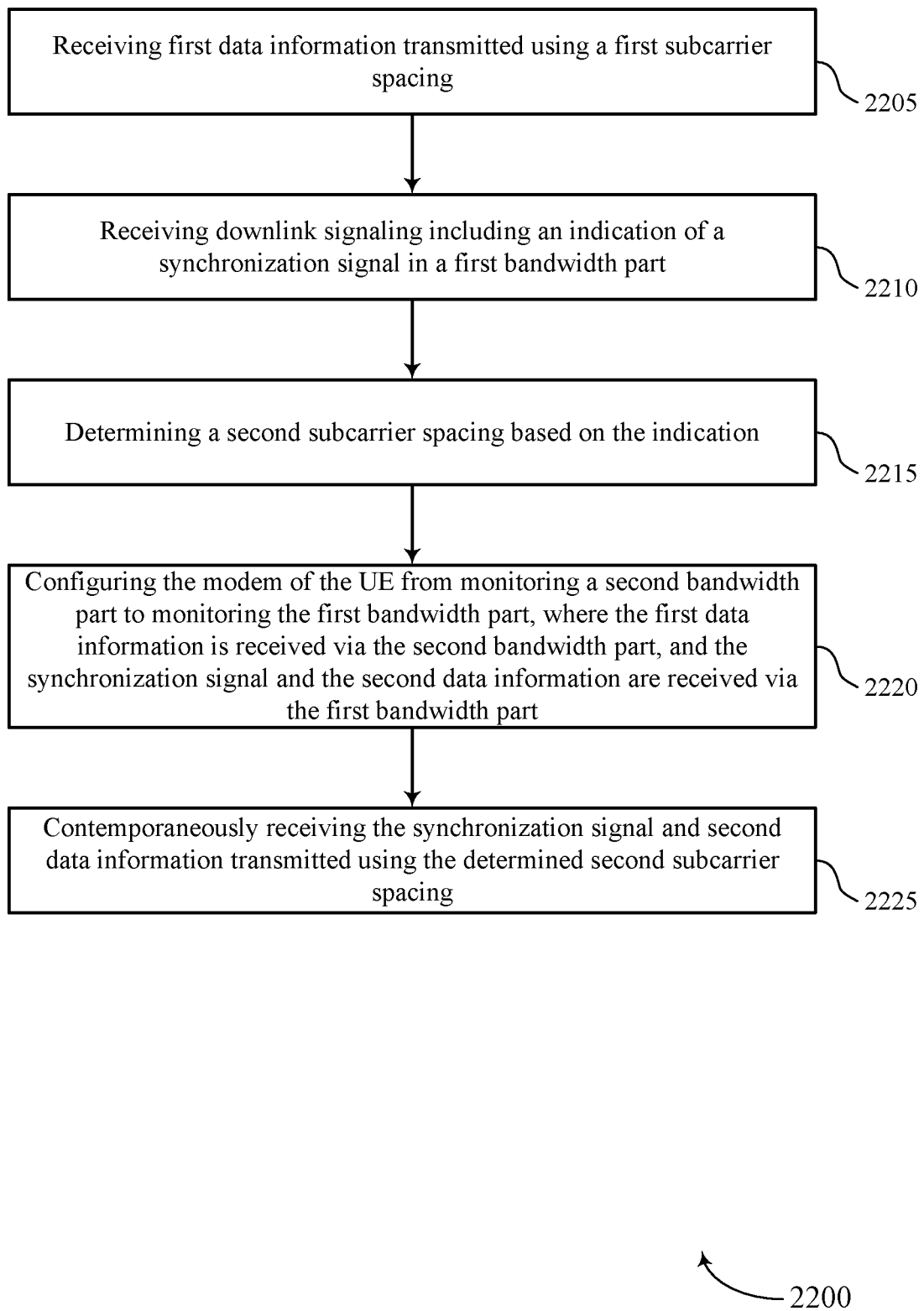
FIG. 22 shows a flowchart illustrating a method that supports automatic adaptation of data SCS numerology based on SSB transmission in accordance with various aspects of the present disclosure.

FIG. 22 shows a flowchart illustrating a method that supports automatic adaptation of data SCS numerology based on SSB transmission in accordance with various aspects of the present disclosure. The operations of method 2200 may be implemented by a UE 115 or its components as described herein. For example, the operations of method 2200 may be performed by a communications manager as described with reference to FIGS. 12 through 15. In some examples, a UE may execute a set of instructions to control the functional elements of the UE to perform the functions described herein. Additionally or alternatively, a UE may perform aspects of the functions described herein using special-purpose hardware.

At 2205, the UE may receive first data information transmitted using a first SCS. The operations of 2205 may be performed according to the methods described herein. In some examples, aspects of the operations of 2205 may be performed by a SCS manager as described with reference to FIGS. 12 through 15.

At 2210, the UE may receive downlink signaling including an indication of a synchronization signal in a first BWP. The operations of 2210 may be performed according to the methods described herein. In some examples, aspects of the operations of 2210 may be performed by a DCI manager as described with reference to FIGS. 12 through 15.

At 2215, the UE may determine a second SCS based on the indication. The operations of 2215 may be performed according to the methods described herein. In some examples, aspects of the operations of 2215 may be performed by a SCS manager as described with reference to FIGS. 12 through 15.

At 2220, the UE may configure the modem of the UE from monitoring a second BWP to monitoring the first BWP, where the first data information is received via the second BWP, and the synchronization signal and the second data information are received via the first BWP. The operations of 2220 may be performed according to the methods described herein. In some examples, aspects of the operations of 2220 may be performed by a BWP monitoring manager as described with reference to FIGS. 12 through 15.

At 2225, the UE may contemporaneously receive the synchronization signal and second data information transmitted using the determined second SCS. The operations of 2225 may be performed according to the methods described herein. In some examples, aspects of the operations of 2225 may be performed by a receiver manager as described with reference to FIGS. 12 through 15.

Figure 23:
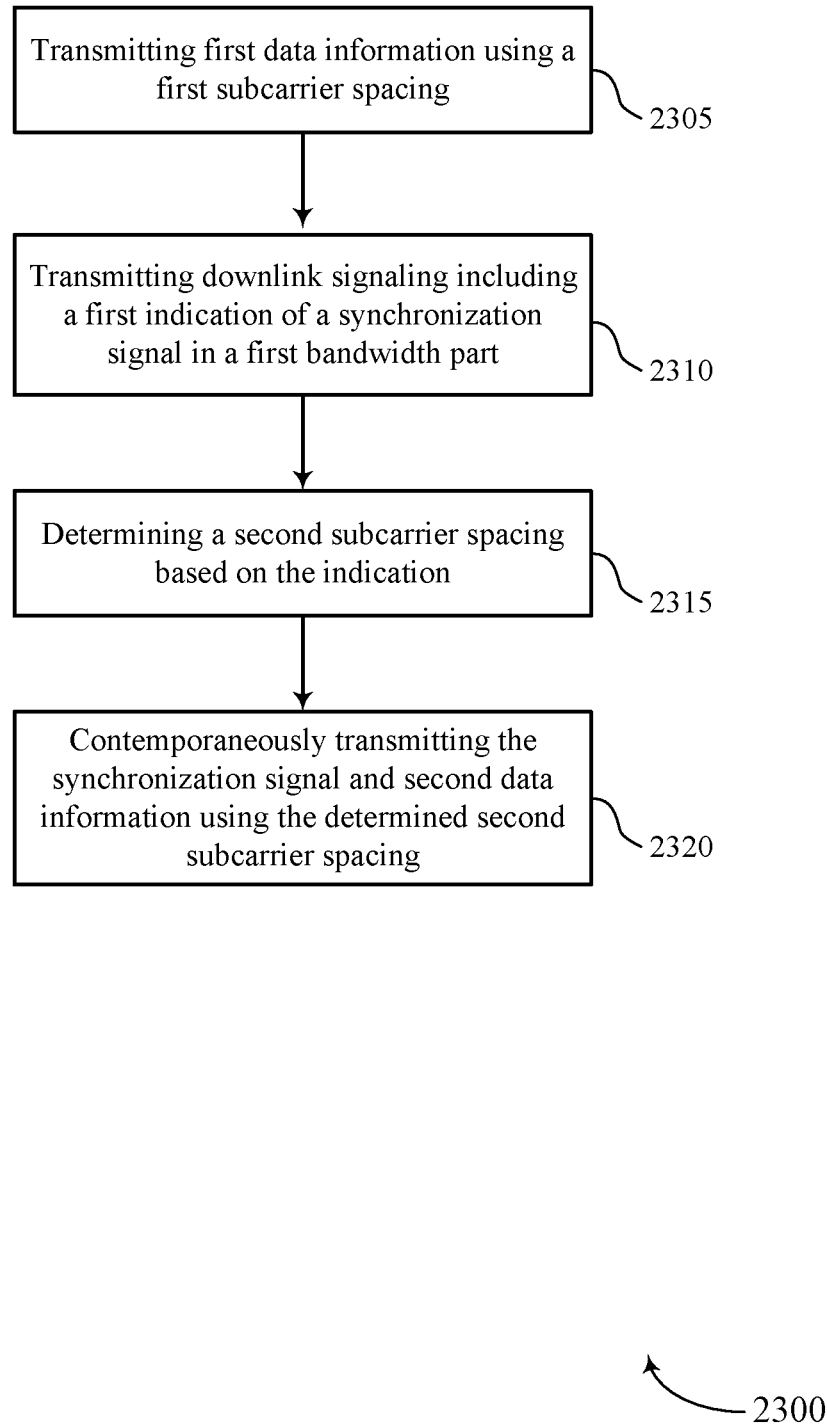
FIG. 23 shows a flowchart illustrating a method that supports automatic adaptation of data SCS numerology based on SSB transmission in accordance with various aspects of the present disclosure.

FIG. 23 shows a flowchart illustrating a method that supports automatic adaptation of data SCS numerology based on SSB transmission in accordance with various aspects of the present disclosure. The operations of method 2300 may be implemented by a base station 105 or its components as described herein. For example, the operations of method 2300 may be performed by a communications manager as described with reference to FIGS. 16 through 19. In some examples, a base station may execute a set of instructions to control the functional elements of the base station to perform the functions described herein. Additionally or alternatively, a base station may perform aspects of the functions described herein using special-purpose hardware.

At 2305, the base station may transmit first data information using a first SCS. The operations of 2305 may be performed according to the methods described herein. In some examples, aspects of the operations of 2305 may be performed by a SCS manager as described with reference to FIGS. 16 through 19.

At 2310, the base station may transmit downlink signaling including a first indication of a synchronization signal in a first BWP. The operations of 2310 may be performed according to the methods described herein. In some examples, aspects of the operations of 2310 may be performed by a DCI manager as described with reference to FIGS. 16 through 19.

At 2315, the base station may determine a second SCS based on the indication. The operations of 2315 may be performed according to the methods described herein. In some examples, aspects of the operations of 2315 may be performed by a SCS manager as described with reference to FIGS. 16 through 19.

At 2320, the base station may contemporaneously transmit the synchronization signal and second data information using the determined second SCS. The operations of 2320 may be performed according to the methods described herein. In some examples, aspects of the operations of 2320 may be performed by a transmitter manager as described with reference to FIGS. 16 through 19.

It should be noted that the methods described herein describe possible implementations, and that the operations and the steps may be rearranged or otherwise modified and that other implementations are possible. Further, aspects from two or more of the methods may be combined.

Techniques described herein may be used for various wireless communications systems such as code division multiple access (CDMA), time division multiple access (TDMA), frequency division multiple access (FDMA), orthogonal frequency division multiple access (OFDMA), single carrier frequency division multiple access (SC-FDMA), and other systems. A CDMA system may implement a radio technology such as CDMA2000, Universal Terrestrial Radio Access (UTRA), etc. CDMA2000 covers IS-2000, IS-95, and IS-856 standards. IS-2000 Releases may be commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile Communications (GSM).

An OFDMA system may implement a radio technology such as Ultra Mobile Broadband (UMB), Evolved UTRA (E-UTRA), Institute of Electrical and Electronics Engineers (IEEE) 802.11 (Wi-Fi), IEEE 802.16 (WiMAX), IEEE 802.20, Flash-OFDM, etc. UTRA and E-UTRA are part of Universal Mobile Telecommunications System (UMTS). LTE, LTE-A, and LTE-A Pro are releases of UMTS that use E-UTRA. UTRA, E-UTRA, UMTS, LTE, LTE-A, LTE-A Pro, NR, and GSM are described in documents from the organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned herein as well as other systems and radio technologies. While aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR applications.

A macro cell, for example, covers a relatively large geographic area (e.g., several kilometers in radius) and may allow unrestricted access by UEs with service subscriptions with the network provider. A small cell may be associated with a lower-powered base station, as compared with a macro cell, and a small cell may operate in the same or different (e.g., licensed, unlicensed, etc.) frequency bands as macro cells. Small cells may include pico cells, femto cells, and micro cells according to various examples. A pico cell, for example, may cover a small geographic area and may allow unrestricted access by UEs with service subscriptions with the network provider. A femto cell may also cover a small geographic area (e.g., a home) and may provide restricted access by UEs having an association with the femto cell (e.g., UEs in a closed subscriber group (CSG), UEs for users in the home, and the like). An eNB for a macro cell may be referred to as a macro eNB. An eNB for a small cell may be referred to as a small cell eNB, a pico eNB, a femto eNB, or a home eNB. An eNB may support one or multiple (e.g., two, three, four, and the like) cells, and may also support communications using one or multiple component carriers.

The wireless communications systems described herein may support synchronous or asynchronous operation. For synchronous operation, the base stations may have similar frame timing, and transmissions from different base stations may be approximately aligned in time. For asynchronous operation, the base stations may have different frame timing, and transmissions from different base stations may not be aligned in time. The techniques described herein may be used for either synchronous or asynchronous operations.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, an FPGA, or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein can be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes some examples and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communication at a user equipment (UE), comprising:
   receiving a first data information transmitted using a first subcarrier spacing;
   receiving downlink signaling comprising an indication of a synchronization signal in a first bandwidth part;
   determining a second subcarrier spacing based at least in part on the indication;
   determining a temporal period to decode the synchronization signal and a second data information based at least in part on the first bandwidth part and the determined second subcarrier spacing; and
   contemporaneously receiving the synchronization signal and the second data information transmitted using the determined second subcarrier spacing, wherein the synchronization signal and the second data information are received based at least in part on the determined temporal period.

2. The method of claim 1, further comprising:
   configuring a modem of the UE from using the first subcarrier spacing to using the determined second subcarrier spacing based at least in part on the indication, wherein the synchronization signal and the second data information are contemporaneously received based at least in part on the configuring.

3. The method of claim 2, wherein configuring the modem from using the first subcarrier spacing to using the determined second subcarrier spacing comprises:
   configuring the modem from using the first subcarrier spacing to using the determined second subcarrier spacing within the first bandwidth part, wherein the first data information, the synchronization signal, and the second data information are received within the first bandwidth part.

4. The method of claim 3, further comprising:
   determining a first location corresponding to the second data information based at least in part on the received downlink signaling;
   determining a second location corresponding to an uplink feedback occasion associated with the second data information; and
   generating an uplink feedback report for the first data information and the second data information, wherein the uplink feedback report is generated based at least in part on the first subcarrier spacing, or the second subcarrier spacing, or both.

5. The method of claim 4, wherein the first location and the second location are determined based at least in part on a first slot pattern defined according to the first subcarrier spacing or the second subcarrier spacing, the method further comprising:
   determining a third location corresponding to the first data information, wherein the third location is determined based at least in part on a second slot pattern defined according to the first subcarrier spacing.

6. The method of claim 2, further comprising:
   configuring the modem of the UE from monitoring a second bandwidth part to monitoring the first bandwidth part, wherein the first data information is received via the second bandwidth part, and the synchronization signal and the second data information are received via the first bandwidth part.

7. The method of claim 6, further comprising:
   configuring the modem of the UE from monitoring the first bandwidth part to monitoring the second bandwidth part based at least in part on receiving the synchronization signal and the second data information, wherein third data information is received via the first bandwidth part.

8. The method of claim 7, wherein the configuring is based at least in part on a time delay after the synchronization signal and the second data information are received.

9. The method of claim 6, further comprising:
receiving a configuration for the first bandwidth part, wherein the configuration is received via radio resource control signaling or a medium access control element.

10. The method of claim 6, wherein the first subcarrier spacing is associated with the second bandwidth part and the determined second subcarrier spacing is associated with the first bandwidth part.

11. The method of claim 2, further comprising:
identifying a symbol boundary associated with the synchronization signal based at least in part on the indication, wherein the configuring occurs at the identified symbol boundary; or
identifying a slot boundary associated with the synchronization signal based at least in part on the indication, wherein the configuring occurs at the identified slot boundary and the slot boundary is identified based at least in part on the determined second subcarrier spacing.

12. The method of claim 2, further comprising:
identifying a synchronization signal block burst boundary associated with the synchronization signal based at least in part on the indication, wherein the configuring occurs at the identified synchronization signal block burst boundary.

13. The method of claim 1, wherein the second subcarrier spacing comprises a default subcarrier spacing associated with the synchronization signal.

14. An apparatus for wireless communication at a user equipment (UE), comprising:
a processor,
memory coupled with the processor; and
instructions stored in the memory and executable by the processor to cause the apparatus to:
receive a first data information transmitted using a first subcarrier spacing;
receive downlink signaling comprising an indication of a synchronization signal in a first bandwidth part;
determine a second subcarrier spacing based at least in part on the indication;
determine a temporal period to decode the synchronization signal and a second data information based at least in part on the first bandwidth part and the determined second subcarrier spacing; and
contemporaneously receive the synchronization signal and the second data information transmitted using the determined second subcarrier spacing, wherein the synchronization signal and the second data information are received based at least in part on the determined temporal period.

15. The apparatus of claim 14, wherein the instructions are further executable by the processor to cause the apparatus to:
configure a modem of the UE from using the first subcarrier spacing to using the determined second subcarrier spacing based at least in part on the indication, wherein the synchronization signal and the second data information are contemporaneously received based at least in part on the configuring.

16. The apparatus of claim 15, wherein the instructions to configure the modem from using the first subcarrier spacing to using the determined second subcarrier spacing are executable by the processor to cause the apparatus to:
configure the modem from using the first subcarrier spacing to using the determined second subcarrier spacing within the first bandwidth part, wherein the first data information, the synchronization signal, and the second data information are received within the first bandwidth part.

17. The apparatus of claim 16, wherein the instructions are further executable by the processor to cause the apparatus to:
determine a first location corresponding to the second data information based at least in part on the received downlink signaling;
determine a second location corresponding to an uplink feedback occasion associated with the second data information; and
generate an uplink feedback report for the first data information and the second data information, wherein the uplink feedback report is generated based at least in part on the first subcarrier spacing, or the second subcarrier spacing, or both.

18. The apparatus of claim 17, wherein the first location and the second location are determined based at least in part on a first slot pattern defined according to the first subcarrier spacing or the second subcarrier spacing, the instructions further executable by the processor to cause the apparatus to:
determine a third location corresponding to the first data information, wherein the third location is determined based at least in part on a second slot pattern defined according to the first subcarrier spacing.

19. The apparatus of claim 15, wherein the instructions are further executable by the processor to cause the apparatus to:
configure the modem of the UE from monitoring a second bandwidth part to monitoring the first bandwidth part, wherein the first data information is received via the second bandwidth part, and the synchronization signal and the second data information are received via the first bandwidth part.

20. The apparatus of claim 19, wherein the instructions are further executable by the processor to cause the apparatus to:
configure the modem of the UE from monitoring the first bandwidth part to monitoring the second bandwidth part based at least in part on receiving the synchronization signal and the second data information, wherein third data information is received via the first bandwidth part.

21. The apparatus of claim 20, wherein the configuring is based at least in part on a time delay after the synchronization signal and the second data information are received.

22. The apparatus of claim 19, wherein the instructions are further executable by the processor to cause the apparatus to:
receive a configuration for the first bandwidth part, wherein the configuration is received via radio resource control signaling or a medium access control element.

23. The apparatus of claim 19, wherein the first subcarrier spacing is associated with the second bandwidth part and the determined second subcarrier spacing is associated with the first bandwidth part.

24. The apparatus of claim 15, wherein the instructions are further executable by the processor to cause the apparatus to:

identify a symbol boundary associated with the synchronization signal based at least in part on the indication, wherein the configuring occurs at the identified symbol boundary; or identify a slot boundary associated with the synchronization signal based at least in part on the indication, wherein the configuring occurs at the identified slot boundary and the slot boundary is identified based at least in part on the determined second subcarrier spacing.

25. The apparatus of claim 15, wherein the instructions are further executable by the processor to cause the apparatus to:

identify a synchronization signal block burst boundary associated with the synchronization signal based at least in part on the indication, wherein the configuring occurs at the identified synchronization signal block burst boundary.

26. The apparatus of claim 14, wherein the second subcarrier spacing comprises a default subcarrier spacing associated with the synchronization signal.

27. An apparatus for wireless communication at a user equipment (UE), comprising:

means for receiving first data information transmitted using a first subcarrier spacing;

means for receiving downlink signaling comprising an indication of a synchronization signal in a first bandwidth part;

means for determining a second subcarrier spacing based at least in part on the indication;

means for determining a temporal period to decode the synchronization signal and a second data information based at least in part on the first bandwidth part and the determined second subcarrier spacing; and means for contemporaneously receiving the synchronization signal and the second data information transmitted using the determined second subcarrier spacing, wherein the synchronization signal and the second data information are received based at least in part on the determined temporal period.

28. A non-transitory computer-readable medium storing code for wireless communication at a user equipment (UE), the code comprising instructions executable by a processor to:

receive a first data information transmitted using a first subcarrier spacing;

receive downlink signaling comprising an indication of a synchronization signal in a first bandwidth part;

determine a second subcarrier spacing based at least in part on the indication;

determine a temporal period to decode the synchronization signal and a second data information based at least in part on the first bandwidth part and the determined second subcarrier spacing; and contemporaneously receive the synchronization signal and the second data information transmitted using the determined second subcarrier spacing, wherein the synchronization signal and the second data information are received based at least in part on the determined temporal period.

* * * * *